US008970854B2

(12) United States Patent
Kajikawa

(10) Patent No.: US 8,970,854 B2
(45) Date of Patent: Mar. 3, 2015

(54) DOCUMENT MANAGEMENT SYSTEM, DOCUMENT MANAGEMENT APPARATUS, COMPUTER-READABLE MEDIUM AND COMPUTER DATA SIGNAL

(75) Inventor: Ken Kajikawa, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1425 days.

(21) Appl. No.: 12/359,901

(22) Filed: Jan. 26, 2009

(65) Prior Publication Data

US 2009/0316187 A1 Dec. 24, 2009

(30) Foreign Application Priority Data

Jun. 23, 2008 (JP) ................................ 2008-162826

(51) Int. Cl.
G06K 15/00 (2006.01)
H04N 1/00 (2006.01)
H04N 1/21 (2006.01)

(52) U.S. Cl.
CPC ....... H04N 1/00344 (2013.01); H04N 1/00233 (2013.01); H04N 1/00244 (2013.01); H04N 1/00413 (2013.01); H04N 1/2195 (2013.01); H04N 2201/0093 (2013.01); H04N 2201/0094 (2013.01)
USPC ........................................ 358/1.12; 715/255

(58) Field of Classification Search
CPC ..... G06F 3/0481; G06F 17/24; G06F 17/211; G06F 17/212; G06F 3/0483
USPC ................. 358/1.15, 1.1, 1.12, 1.16
See application file for complete search history.

(56) References Cited

U.S. PATENT DOCUMENTS

| 2002/0001029 A1* | 1/2002 | Abe ................................ 348/49 |
| 2002/0051207 A1* | 5/2002 | Ohkubo et al. .............. 358/1.18 |
| 2006/0285168 A1* | 12/2006 | Horino et al. ................ 358/3.28 |
| 2007/0061716 A1* | 3/2007 | Kato ............................. 715/530 |

(Continued)

FOREIGN PATENT DOCUMENTS

| JP | 06-236369 A | 8/1994 |
| JP | 7-78181 A | 3/1995 |
| JP | 07-085009 A | 3/1995 |

(Continued)

OTHER PUBLICATIONS

Notification of Reasons for Refusal in a counterpart application No. 2008-162826, dated May 17, 2010.

*Primary Examiner* — Benny Q Tieu
*Assistant Examiner* — Juan M Guillermety
(74) *Attorney, Agent, or Firm* — Sughrue Mion, PLLC

(57) ABSTRACT

A document management system includes a storage section, a reference electronic manuscript acquisition section, an edit part identification section and a document editing processing section. The storage section stores at least one of an electronic manuscript and an electronic document generated by combining plural electronic manuscripts. The reference electronic manuscript acquisition section acquires a reference electronic manuscript used for identifying a reference position of an edit part in an edit electronic document that is an electronic document to be edited and is read from the storage section. The edit part identification section identifies the edit part in the edit electronic document based on the reference electronic manuscript. The document editing processing section performs editing processing for the edit part identified by the edit part identification section, in units of electronic manuscripts.

20 Claims, 54 Drawing Sheets

(56) References Cited

U.S. PATENT DOCUMENTS

2009/0201528 A1* 8/2009 Truong .................. 358/1.15
2010/0180196 A1* 7/2010 Matsusaka ................ 715/255

FOREIGN PATENT DOCUMENTS

| JP | 08-036563 A | 2/1996 |
| JP | 09-006948 A | 1/1997 |
| JP | 09-245032 A | 9/1997 |
| JP | 2002-132755 A | 5/2002 |
| JP | 2006-178877 A | 7/2006 |
| JP | 2006-261765 A | 9/2006 |
| JP | 2007-36406 A | 2/2007 |

* cited by examiner

Document processing system 1 (including document management system 2A and document management apparatus 2B)

FIG. 4

(1)
<Manuscript Acquisition Method Setting Screen G40_1>

Please select acquisition method for manuscripts

| | | |
|---|---|---|
| Key manuscript(s) | Read | Save |
| New manuscript(s) | Read | Save |

OK | Quit (Exit)

\* Select acquisition method for key manuscript(s) → Read is selected (emphasized display)
\* Select acquisition method for new manuscript(s) → Read is selected (emphasized display)

(2)
<Manuscript Acquisition Method Setting Screen G40_2>

Please select acquisition method for manuscripts

| | | |
|---|---|---|
| Old start manuscript | Read | Save |
| Old end manuscript | Store | Store |
| New manuscript(s) | Read | Save |

OK | Quit (Exit)

\* Select acquisition method for old start manuscript → Read is selected (emphasized display)
\* Select acquisition method for end old manuscript → Save is selected (emphasized display)
\* Select acquisition method for new manuscript(s) → Read is selected (emphasized display)

FIG. 4A (1)
<Key Manuscript Selection Screen G43_1>

| Please select a manuscript at the start position. | | | OK | Quit (Exit) |

List Display | Thumbnail Display

| File Name | Registration Date | Page(s) | Page Specification |
|---|---|---|---|
| Img-x18225862 | 2006/02/16 | 1 | |
| Img-x18227873 | 2007/02/16 | 1 | |
| Img-x19237894 | 2007/02/17 | 5 | 3 |
| Img-x19237895 | 2007/02/18 | 7 | |

* Select the list display format → Emphasized display
* Select an electronic manuscript(s) to be adopted as a start position
  → The electronic manuscript at page 3 in the third document from the top is selected (emphasized display)

(2)
<Key Manuscript Selection Screen G43_2>

Please select a manuscript at the end position. | OK | Quit (Exit)

List Display | Thumbnail Display

| File Name | Registration Date | Page(s) | Page Specification |
|---|---|---|---|
| Img-x18225862 | 2006/02/16 | 1 | |
| Img-x18227873 | 2007/02/16 | 1 | |
| Img-x19237894 | 2007/02/17 | 5 | |
| Img-x19237895 | 2007/02/18 | 7 | |

* Select the list display format → Emphasized display
* Select an electronic manuscript to be adopted as the end position
  → The second electronic manuscript from the top is selected (emphasized display)

FIG. 4B

<New Manuscript Selection Screen G46_1>

| Please select a new manuscript. | Delete | Add | OK | Quit (Exit) |

List Display   Thumbnail Display

| File Name | Registration Date | Page(s) | Order of Usage |
|---|---|---|---|
| Img-x20225892 | 2006/02/16 | 1 | 1 |
| Img-x21204871 | 2007/02/16 | 7 | 3 |
| Img-x19267894 | 2007/02/17 | 1 | 2 →page 3<br>4 →page 1 |
| Img-x21234795 | 2007/02/18 | 3 | 5 →page 2 |

\* Select the list display format → Emphasized display
\* Select an electronic manuscripts to be used in editing <Case that one key electronic manuscript defines the start position of substitution processing>

(1) Case that substitution is performed in ascending order from the start position of the substitution processing (2) Case that substitution is performed in descending order from the start position of the substitution processing (1) Case that one key electronic manuscript defines the start position of a substitution range (2) Case that one key electronic manuscript defines the end position of a substitution range <Case that two key electronic manuscripts define the start position and end position of a substitution range>

(1) Case that processing is started from the start position (2) Case that processing is started from the end position

FIG. 5C

<Case that two key electronic manuscripts define the start position and end position of a substitution range>

(1) The number of sheets of old electronic manuscripts in the substitution range > The number of sheets of new electronic manuscripts

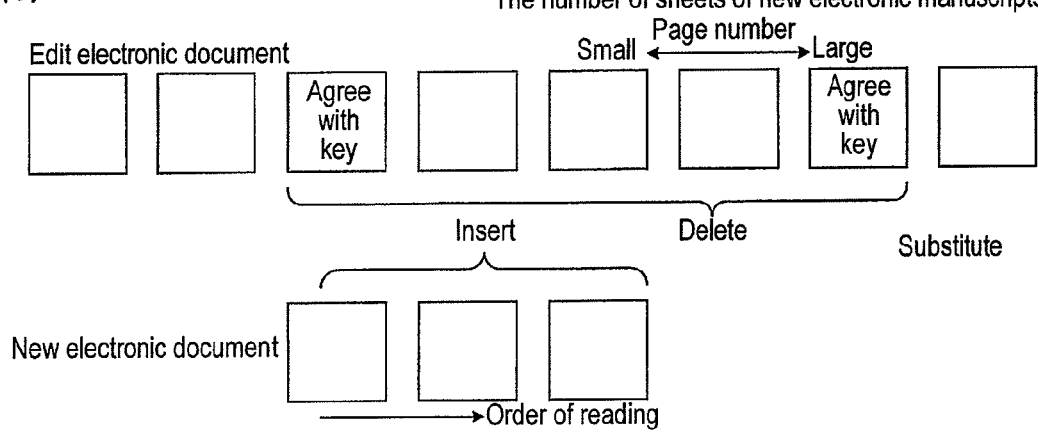

(2) The number of sheets of old electronic manuscripts in the substitution range < The number of sheets of new electronic manuscripts

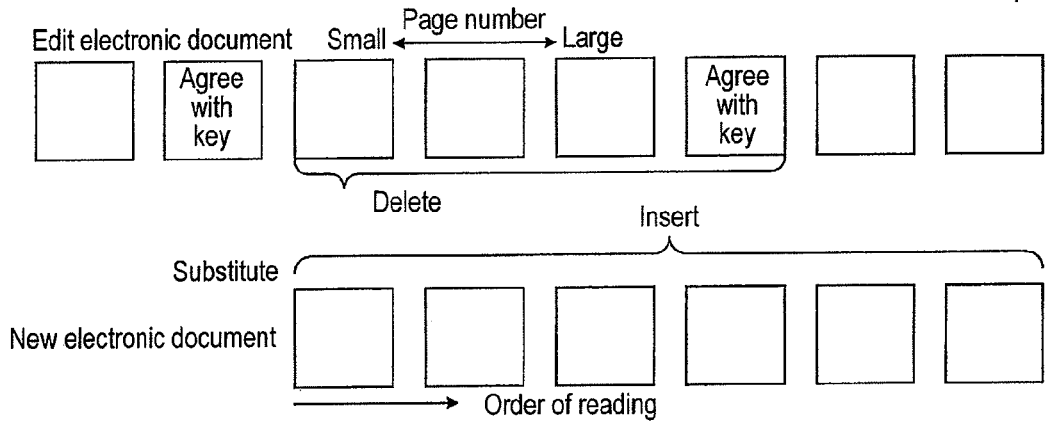

(3) The number of sheets of old electronic manuscripts in the substitution range < The number of sheets of new electronic manuscripts

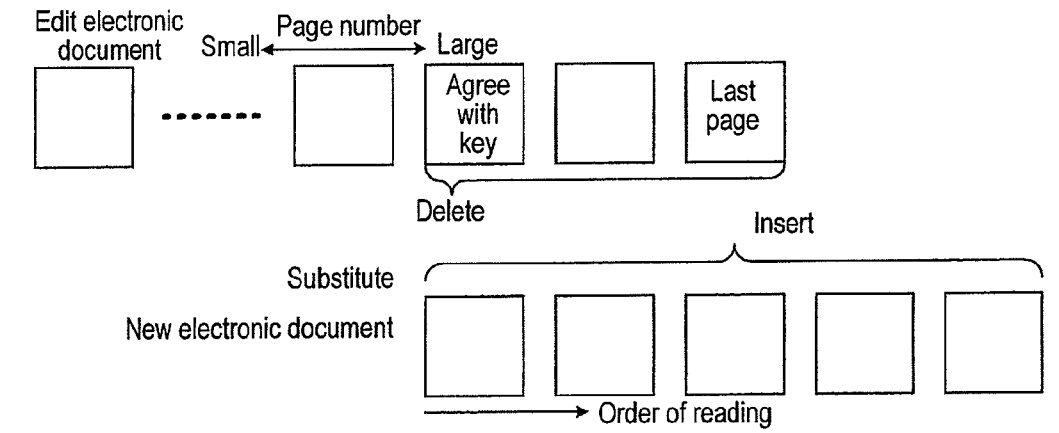

* Select the list display format → Emphasized display
* Select a document to substitute
  → The second document from the top is selected (emphasized display)

(1)
<Repetition Confirmation Screen G82_RP1>

\* A user wants to further substitute the second part
→ Select the "continuation button" (emphasized display)

(2)
<Repetition Confirmation Screen G82_RP2>

\* No other part for substitution → Select the "end button" (emphasized display)

FIG. 6E

<Edit Completion Screen G92_2>

The substitution processing is completed.

| List Display | Thumbnail Display | OK | Quit (Exit) |

| File Name | Registration Date | Page(s) |

Img-x16215892  2007/02/16   2
Img-x16217893  2007/02/16   657
Img-x16217894  2007/02/17   899
Img-x16217895  2007/02/18   777
Img-x16217896  2007/02/18   659

\* The edit electronic document is deleted (displayed in outline characters) and the new document (for which the edit and substitution have been performed) is in emphasized display
\* The number of pages after the substitution is larger than the number of pages before the substitution.

<Case that one key electronic manuscript defines the start position of adding processing>

(1) Case that addition is performed in ascending order from the start position of adding processing (2) Case that addition is performed in descending order from the start position of adding processing (1) Case that one key electronic manuscript defines the start position of an addition range (2) Case that one key electronic manuscript defines the end position of an addition range

FIG. 9

<Edit Document Selection Screen G20_AD1>

Please select a document to edit.

| List Display | Thumbnail Display | OK | Quit (Exit) |

| File Name | Registration Date | Page(s) |
|---|---|---|
| Img-x16215892 | 2006/02/16 | 4 |
| Img-x16217893 | 2007/02/16 | 657 |
| Img-x16217894 | 2007/02/17 | 899 |
| Img-x16217895 | 2007/02/18 | 777 |

* Select the list display format → Emphasized display
* Select document for addition → Select the first document from the top (emphasized display)

FIG. 9B

<Reading Condition Selection Screen G72_AD1>

Please place manuscripts in order of old start manuscript immediately before addition and addition manuscripts (ascending order), and press the "start button".

| OK | Quit (Exit) |

| Basic | Reading setting | Image quality adjustment | Output format |

Color mode
- Automatic
  Full color
  Gray scale
  Monochrome

Double-sided manuscript feed
 •Single side
  Double-sided left/right open
  Double-sided up/down open
  Manual setting Image quality of manuscript
- Character/photo
  Character
  Photo (1) <Repetition Confirmation Screen G82_AD1>

\* A user wants to further add to the second part
  → Select the "continuation button" (emphasized display)

(2) <Repetition Confirmation Screen G82_AD2>

\* No other part for addition → Select the "end button" (emphasized display)

<Edit Completion Screen G92_AD2>

* The edit electronic document is deleted (displayed in outline characters) and the new document (for which the edit and adding have been performed) is in emphasized display
* The number of pages after the adding is larger than the number of pages before the adding.

<Case that key electronic manuscripts define individual positions of deletion processing>

<Case that a key electronic manuscript defines the start position of deletion processing>

(1) The number of deletion pages is input, and a processing direction (ascending order) is specified (2) The number of deletion pages is input, and a processing direction (descending order) is specified <Case that a pair of key electronic manuscripts (two key electronic manuscripts) define the start position and end position of deletion processing>

Delete entirety from the start position to the end position

FIG. 12

<Edit Document Selection Screen G20_DL1>

Please select a document to edit.

| List Display | Thumbnail Display | OK | Quit (Exit) |

| File Name | Registration Date | Page(s) |

Img-x16215892  2006/02/16    2
Img-x16217893  2007/02/16   657
Img-x16217894  2007/02/17   899
Img-x16217895  2007/02/18   777

\* Select the list display format → Emphasized display
\* Select document for deletion → Select the first document from the top (emphasized display)

(1) <Repetition Confirmation Screen G82_DL1>

\* A user wants to further delete the second part
→ Select the "continuation button" (emphasized display)

(2) <Repetition Confirmation Screen G82_DL2>

\* No other part for deletion → Select the "end button" (emphasized display)

FIG. 12D

<Edit Completion Screen G92_DL2>

The deletion processing is completed.

| List Display | Thumbnail Display | OK | Quit (Exit) |

| File Name | Registration Date | Page(s) |
|---|---|---|
| Img-x16215892 | 2007/02/16 | 2 |
| Img-x16217893 | 2007/02/16 | 657 |
| Img-x16217894 | 2007/02/17 | 899 |
| Img-x16217895 | 2007/02/18 | 777 |
| Img-x16217896 | 2007/02/18 | 457 |

\* The edit electronic document is deleted (displayed in outline characters) and the new document (for which the edit and deletion have been performed) is in emphasized display
\* The number of pages after the deletion is less than the number of pages before the deletion.

<Case that a key electronic manuscript specifies only the start position of one exchange range, while another key electronic manuscript specifies a range of the other exchange range>

(1) Ascending order is specified for the one substitution range (2) Descending order is specified for the one substitution

FIG. 14A

<Case that a key electronic manuscript specifies only the start position of one exchange range, while another key electronic manuscript specifies a range of the other exchange range>

(1) Case that one substitution range and the other substitution range have the same number of pages

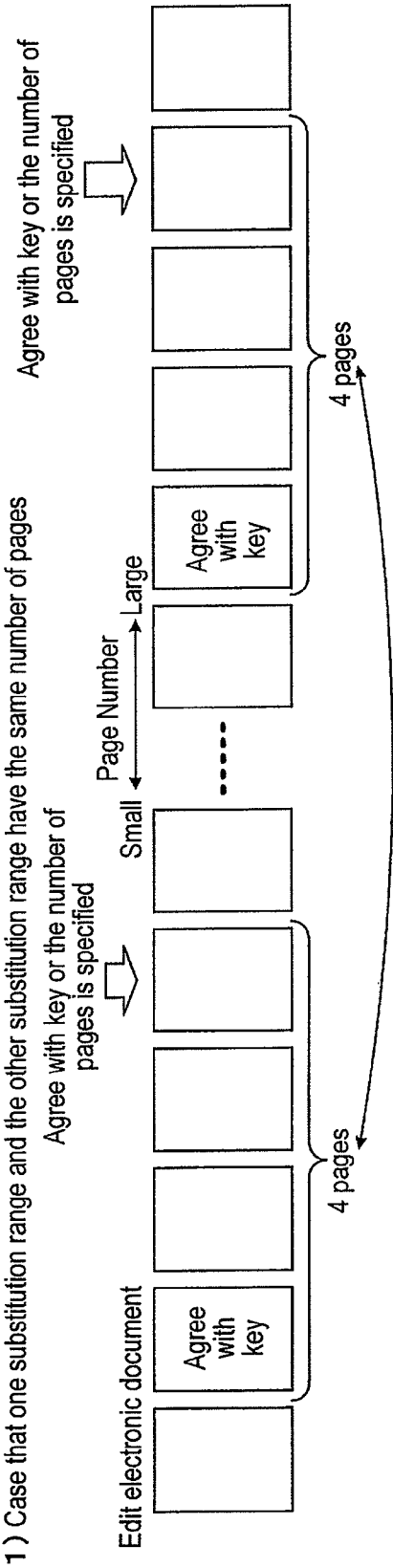

(2) Case that one substitution range and the other substitution range have different numbers of pages

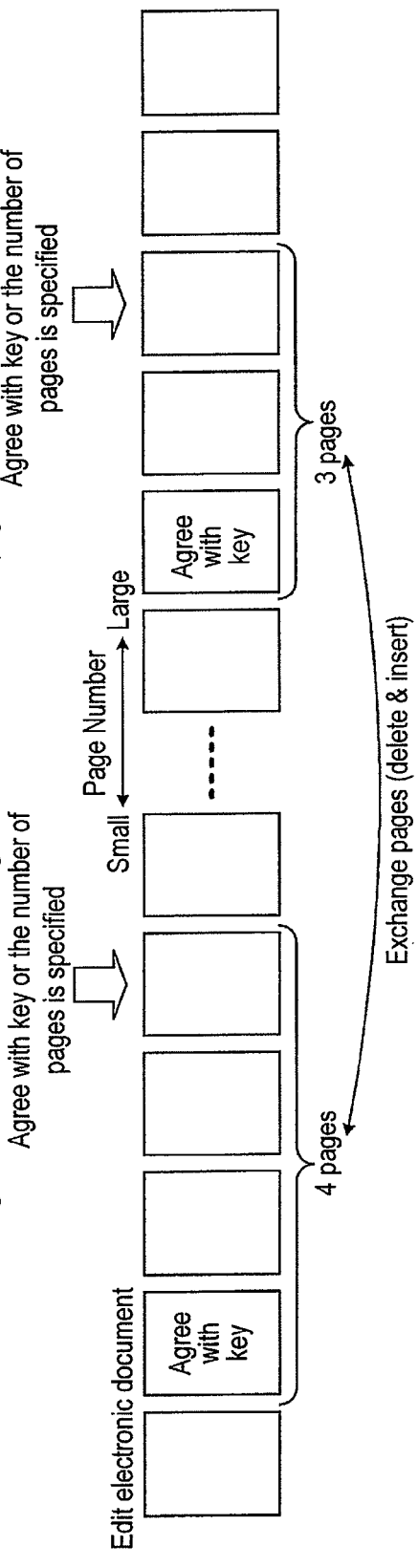

<Case that a key electronic manuscript specifies only the start position of one exchange range, while another key electronic manuscript specifies a range of the other exchange range>
(1) Case that one substitution range and the other substitution range have the same number of pages

FIG. 15

<Edit Document Selection Screen G20_CH1>

Please select a document to edit.

| List Display | Thumbnail Display | OK | Quit (Exit) |

| File Name | Registration Date | Page(s) |

Img-x16215892  2006/02/16    2
   Img-x16217893  2007/02/16  657
   Img-x16217894  2007/02/17  899
   Img-x16217895  2007/02/18  777

\* Select the list display format → Emphasized display
\* Select document for exchange → Select the second document from the top (emphasized display)

(1)
<Repetition Confirmation Screen G82_CH1>

* A user wants to further exchange other parts
  → Select the "continuation button" (emphasized display)

(2)
<Repetition Confirmation Screen G82_CH2>

* No other part for exchange → Select the "end button" (emphasized display)

FIG. 15D

<Exchange Part Setting Screen G83_CH1>

Please specify exchange target(s).    OK    Quit (Exit)

Exchange Source          Exchange Destination

| 1 | st part | → | | th part |

| 2 | nd part | → | | th part |

| 3 | rd part | → | | th part |

Input value(s) into exchange destination field(s)

FIG. 15E

<Edit Completion Screen G92_CH2>

The adding processing is completed.

| List Display | Thumbnail Display | OK | Quit (Exit) |

| File Name | Registration Date | Page(s) |

Img-x16215892  2007/02/16  2
Img-x16217893  2007/02/16  657
Img-x16217894  2007/02/17  899
Img-x16217895  2007/02/18  777
Img-x16217896  2007/02/18  657

* The edit electronic document is deleted (displayed in outline characters), and new document for which the edit and exchange have been performed is in emphasized display
* The number of pages after the exchange is equal to the number of pages before exchange

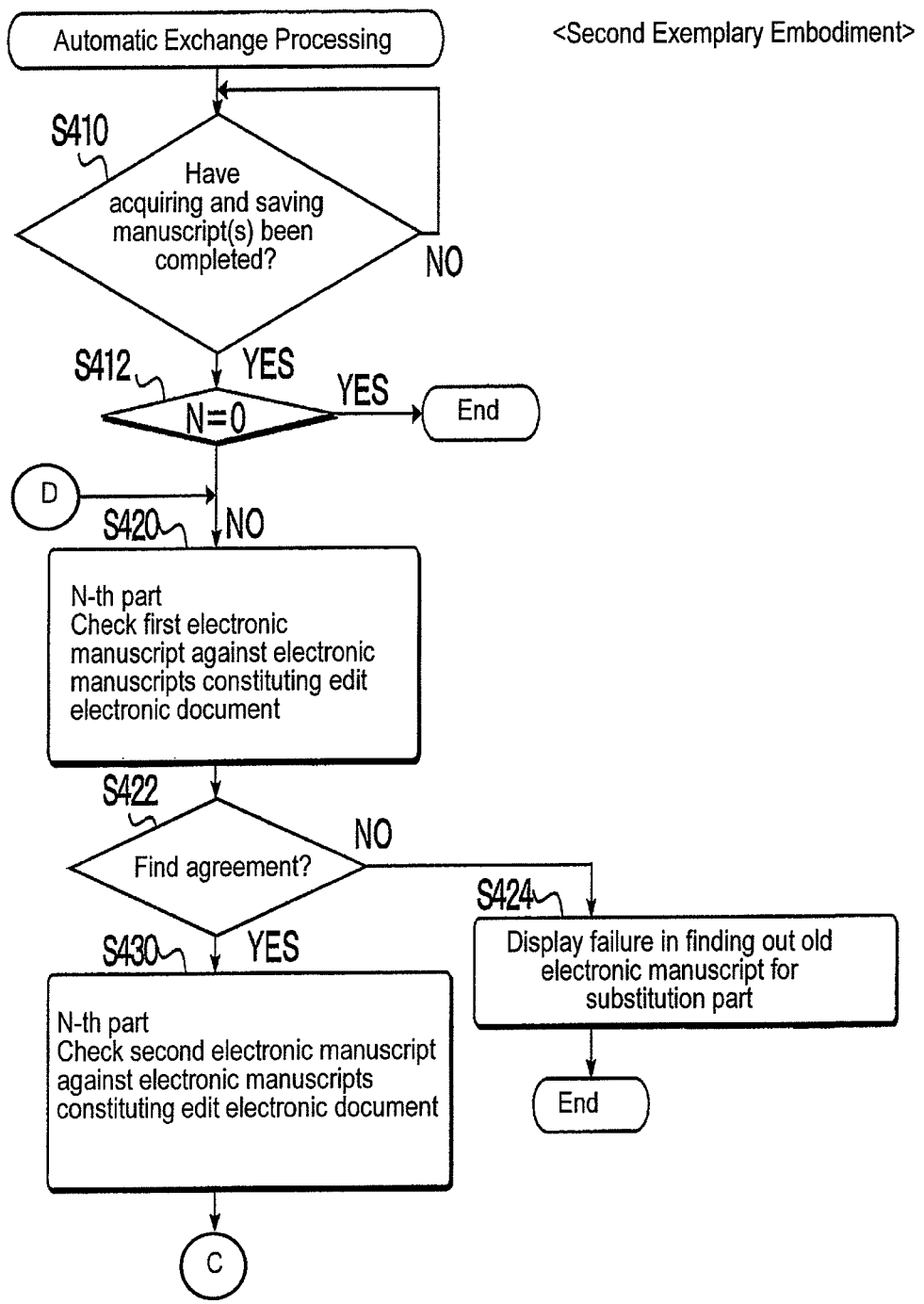

DOCUMENT MANAGEMENT SYSTEM, DOCUMENT MANAGEMENT APPARATUS, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-162826 filed on Jun. 23, 2008.

BACKGROUND

1. Field of the Invention

The invention relates to a document management system, a document management apparatus, a computer-readable medium and a computer data signal.

2. Related Art

In an example of processing that uses an information processing apparatus, a stored document (may be referred to as an "electronic document", hereinafter) that are saved as electronic data in a storage device is edited by in units of pages on a terminal device. Such document editing functions include a page substitution function, a page addition function, a page deletion function, and a page exchange function.

In this apparatus, when an electronic document is to be edited in units of pages, a user needs to find out individual pages to be edited (may be referred to as "edit pages" in some cases) one by one. For example, in the work of reading and digitizing a large amount of documents using an image reading device, let consider the works of substituting only particular pages in a digitized read-out document, inserting another manuscript to the document, adding a manuscript before or after a particular page of the document, and the like.

When a particular page is to be deleted, the user needs to find out the page to be deleted while checking pages of the saved read-out document and then, issues an operation instruction for deletion. Alternatively, in a case that substitution is to be performed in units of pages, a page to be substituted needs to be found out in the document which has not been subjected to the substitution processing (i.e., an already digitized and saved document) and then be deleted. After that, a paper document (manuscript) to be newly digitized in substitution needs to be read and digitized. Then, the newly digitized read-out manuscript needs to be inserted into a particular page position in the already saved electronic document (i.e., the position where the page to be substituted has been deleted).

In page addition processing, a page where addition is to be performed is found out in a saved read-out document, its page position is specified, and then a manuscript to be added is read. Thereby, a document can be added.

In page exchange processing, both of one page and another page which are exchange targets are found out in a saved read-out document, these page positions are specified, and then instruction for exchange is issued. Thereby, the page positions can be exchanged.

In the editing processing such as deletion, substitution, addition, and exchange performed for a saved document in units of pages, time and effort are required for finding out from the saved document a page (pages) to be edited (a page to be deleted, a page to be substituted, a page where addition is to be performed, or pages to be exchanged).

SUMMARY

According to an aspect of the invention, a document management system includes a storage section, a reference electronic manuscript acquisition section, an edit part identification section and a document editing processing section. The storage section stores at least one of an electronic manuscript and an electronic document generated by combining plural electronic manuscripts. The reference electronic manuscript acquisition section acquires a reference electronic manuscript used for identifying a reference position of an edit part in an edit electronic document that is an electronic document to be edited and is read from the storage section. The edit part identification section identifies the edit part in the edit electronic document based on the reference electronic manuscript. The document editing processing section performs editing processing for the edit part identified by the edit part identification section, in units of electronic manuscripts.

BRIEF DESCRIPTION OF THE DRAWINGS

Exemplary embodiments of the invention will be described in detail based on the following figures, wherein:

FIG. 4 is a diagram showing an example of a manuscript acquisition method setting screen G40;

FIG. 4A is a diagram showing an example of a key manuscript selection screen G43;

FIG. 4B is a diagram showing an example of a new manuscript selection screen G46;

FIG. 5C is a diagram (part 4) describing an outline of manuscript substitution processing performed by the edit part identification section and by the substitution processing section of the document editing processing section;

FIG. 6E is a diagram showing an example of an edit completion screen G92_RP2 used in performing the manuscript substitution function;

FIG. 9 is a diagram showing an example of an edit document selection screen G20_AD1 used in performing a manuscript addition function;

FIG. 9B is a diagram showing an example of a read condition selection screen G72_AD1 used in performing the manuscript addition function;

FIG. 12 is a diagram showing an example of an edit document selection screen G20_DL1 used in performing a manuscript deletion function;

FIG. 12D is a diagram showing an example of an edit completion screen G92_DL2 used in performing the manuscript deletion function;

FIG. 14A is a diagram (part 2) describing an outline of manuscript exchange processing performed by the edit part identification section and by the exchange processing section of a document editing processing section;

FIG. 15 is a diagram showing an example of an edit document selection screen G20_CH1 used in performing a manuscript exchange function;

FIG. 15D is a diagram showing an example of an exchange part setting screen G83_CH1 used in performing the manuscript exchange function;

FIG. 15E is a diagram showing an example of an edit completion screen G92_CH2 used in performing the manuscript exchange function;

FIGS. 21A and 21B are a flow chart showing an example of a procedure of automatic exchange processing in the configuration of the second exemplary embodiment.

DETAILED DESCRIPTION

Exemplary embodiments of the invention will be described below in detail with reference to the accompanying drawings.
<System Configuration>

Figure 1:
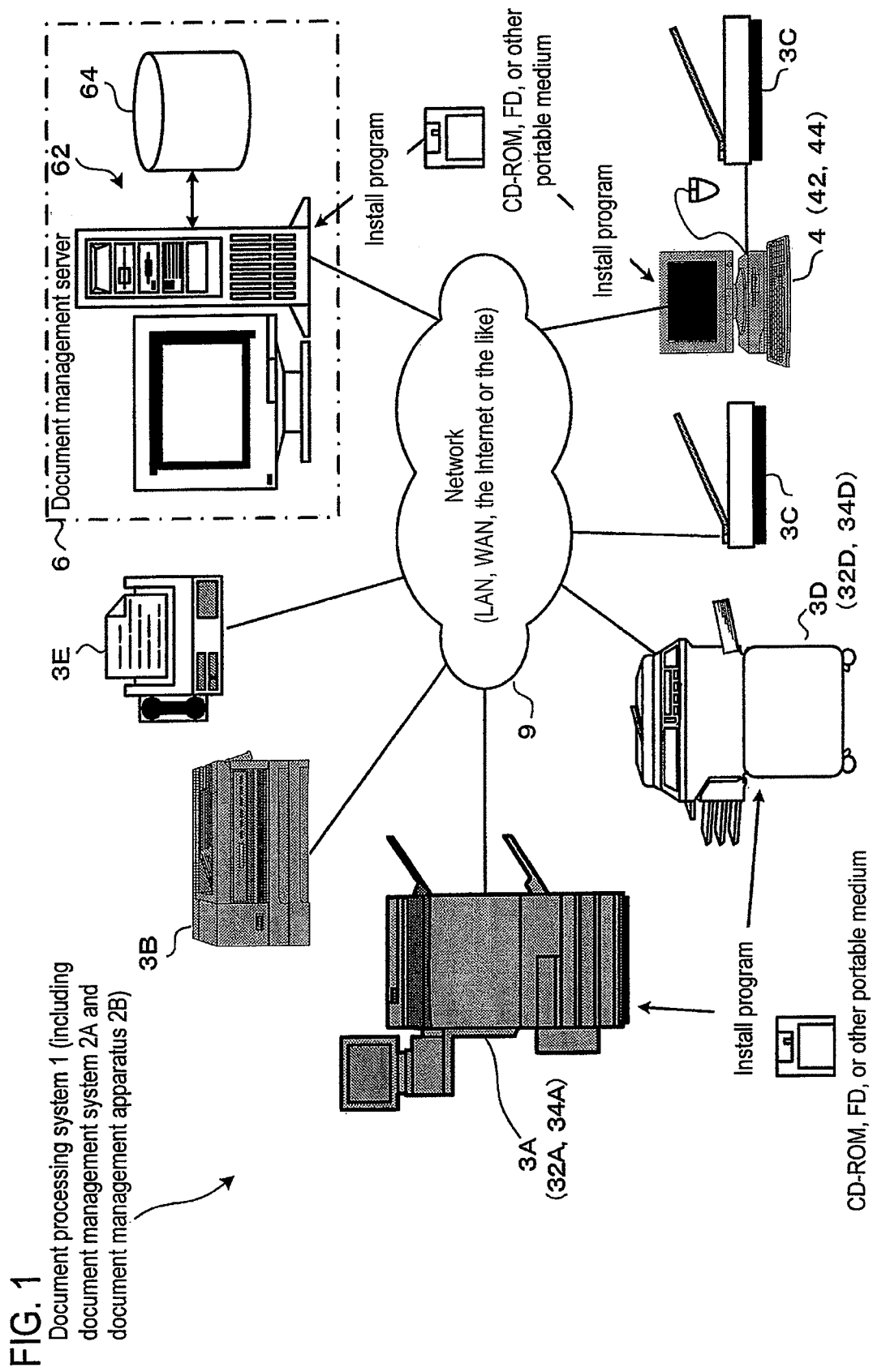
FIG. 1 is a diagram showing an exemplary configuration of a document processing system in which an exemplary embodiment of the invention is implemented.

FIG. 1 is a diagram showing an exemplary configuration of a document processing system in which an exemplary embodiment of the invention is implemented. As shown in the figure, in the document processing system 1 of this exemplary embodiment, a network 9 serving an example of communication means links: various kinds of imaging devices 3 having an image output function of outputting an image onto an output medium such as paper and an image acquisition function of reading an image on an output medium so as to acquire its electronic data (image data); a processing instruction device 4 such as a personal computer (referred to as a PC in some cases, hereinafter) that instructs the various kinds of imaging devices 3 to perform image acquisition processing and image output processing; and a document management server 6 having a server function of saving and managing processed documents and images.

The network 9 is implemented by a LAN (Local Area Network), a WAN (Wide Area Network), the Internet, or the like.

Examples of the imaging devices 3 are: a copying machine 3A having an image acquisition function and an image output function (collectively referred to as a copying function); a printing device 3B referred to as a printer having a single function (only a printing function serving an example of an image output function); an image reading device 3C referred to as a scanner having an image acquisition function (referred to as a scanner function, in particular); a multifunction device 3D having a printing function, a copying function, and a scanner function; and a facsimile machine 3E. These devices are connected to the document management server 6 via the network 9 or via a predetermined connection interface. In the figure, one or two imaging devices 3 alone are shown for each kind. However, the number of devices of each kind may be arbitrary. Further, devices of certain kinds may be omitted.

For example, the copying machine 3A is connected to the document management server 6 via the network 9. When a user operates an operation panel (not shown) of the copying machine 3A so as to issue instruction for copying, the copying machine 3A transmits to the document management server 6 an image read out in response to the copying instruction (specifically, image data including electronic data; this situation is similar also in the following description). At that time, the copying machine 3A may authenticate the user who has issued the copying instruction, based on input of a user name and a password. Then, the copying machine 3A may transmit the information that is obtained by the authentication and includes the user name for identifying the user, to the document management server 6 together with the image.

Further, the copying machine 3A does not perform direct formation processing for the read-out image onto printing paper. Instead, the copying machine 3A receives from the document management server 6 an image serving as the object of formation processing and then, based on the received image, forms a corresponding image onto printing paper. That is, the copying machine 3A once transmits to the document management server 61 the image obtained by reading a manuscript to be copied, and then performs subsequent processing based on the image received from the document management server 6.

The printing device 3B is connected to the document management server 6 via the network 9 or the like, and forms an image onto an output medium such as printing paper based on an image input from the document management server 6.

Each image reading device 3C is connected to the processing instruction device 4 via a serial bus interface or the like, or alternatively connected to the document management server 6 via the network 9. When a user operates an operation panel (not shown) or the processing instruction device 4 of the image reading device 3C so as to issue instruction for reading, then in response to the read instruction, the image reading device 3C transmits to the processing instruction device 4 or the document management server 6 an electronic manuscript (image data) obtained by reading and digitizing a manuscript. At the time of transmitting the electronic manuscript to the document management server 6, the image reading device 3C may authenticate the user who has issued the read instruction, based on input of a user name and a password. Then, the image reading device 3C may transmit the information that is obtained by this authentication and includes the user name for identifying the user, to the document management server 6 together with the electronic manuscript (image data).

The multifunction device 3D is connected to the document management server 6 via the network 9, and executes the functions of a copying machine 3A, a printing device 3B, and an image reading device 3C.

The facsimile machine 3E is connected to the document management server 6 via the network 9 or the like, and performs FAX transmission of a read-out image. Alternatively, based on a received image, the facsimile machine 3E outputs a FAX image onto an output medium such as printing paper and, at the same time, outputs to the document management server 6 a processed image obtained at the time of transmission or reception.

The processing instruction device 4 is connected to the document management server 6 via the network 9, and transmits to the document management server 6 an image to be processed by the printing device 3B, the image reading device 3C, or the like and associated information such as the user name of a user who will issue processing instruction. The processing instruction device 4 has: a control section 42A for performing such control; and a data hold section 44 such as a hard disk drive for storing a digitized electronic manuscript or an electronic document generated by combining plural sheets of electronic manuscripts. The data hold section 44 may be including a built-in storage device or alternatively a storage device connected to the outside through a USB (Universal Serial Bus) or the like.

Each of the copying machine 3A and the multifunction device 3D has: a control section 32A or 32D corresponding to each; and a respectively corresponding data hold section 34A or 34D provided with a storage device including a hard disk drive, an optical disk unit, or the like for storing an electronic document generated by combining plural sheets of electronic manuscripts generated by reading and digitizing manuscripts by using its own image reading function.

The document management server 6 has a server function, and controls image acquisition processing and image output processing performed in the imaging device 3 in response to a request from the processing instruction device 4 serving as a client system. Further, the document management server 6 records and saves a processing image into a predetermined storage device. For this purpose, the document management server 6 has: a control section 62; and a data hold section 64 provided with a storage device including a hard disk drive, an optical disk unit, or the like for storing an electronic document generated by combining plural sheets of electronic manuscripts.

Each of the data hold sections 34A, 34D, 44, and 64 serves as a manuscript/document storage section for storing an electronic manuscript or an electronic document generated by combining plural sheets of electronic manuscripts.

Here, a document management system 2A and/or a document management apparatus 2B are installed in the document processing system 1 of this exemplary embodiment. The document management system 2A and the document management apparatus 2B can perform editing processing for an electronic document saved in the data hold section 34A of the copying machine 3A or the data hold section 34A of the multifunction device 3D or alternatively saved in the data hold section 64 of the document management server 6 using, as a searching key manuscript (reference manuscript), (i) an electronic manuscript obtained by reading and digitizing a manuscript with an image reading function provided in the copying machine 3A, the image reading device 3C, the multifunction device 3D, or the like or (ii) an already saved electronic manuscript (including electronic manuscript that was saved in the past by reading a manuscript).

For example, the processing instruction device 4 such as a PC and the various kinds of imaging devices 3 (the copying machine 3A, the image reading device 3C, and the multifunction device 3D) having an image reading function constitute the document management system 2A. In this case, a document storage section for storing an electronic document generated by combining plural sheets of electronic manuscripts is implemented by a storage device such as a hard disk drive built into the processing instruction device 4. Alternatively, the processing instruction device 4 such as a PC, the various kinds of imaging devices 3 (the copying machine 3A, the image reading device 3C, and the multifunction device 3D) having an image reading function, and the document management server 6 (in particular, the data hold section 64 serving as a document storage section) may constitute the document management system 2A.

Alternatively, the copying machine 3A and the multifunction device 3D having a network communication function may be provided with the document management apparatus 2B. Yet alternatively, the document management server 6 may be provided with the document management apparatus 2B, and then the various kinds of imaging devices 3 (the copying machine 3A, the image reading device 3C, and the multifunction device 3D) having an image reading function provides the function of acquiring an electronic manuscript at a reference position of editing processing and/or an electronic manuscript to be edited (an edit target).

As such, the individual sections may be arranged at arbitrary locations in the system. Thus, it is sufficient that the individual sections necessary for the processing are organically linked to each other such that the entire processing should be complete. Particular means for implementing the individual sections (including functional blocks) of this exemplary embodiment may be including hardware, software, a network, a combination of these, or another arbitrary means. This fact itself is obvious to a person skilled in the art. Further, arbitrary functional blocks may be combined into one functional block.

Each of the document management system 2A and the document management apparatus 2B checks, against each of the electronic manuscripts constituting the edit electronic document (may be referred to as "old electronic manuscripts"), a key electronic manuscript (an electronic manuscript of a reference manuscript) used for identifying an edit part in a saved edit electronic document to be edited, thereby extracting an old electronic manuscript that identifies the edit part such as a start position of editing processing, a start position of an edit part, and an end position of the edit part. Then, each of the document management system 2A and the document management apparatus 2B performs given editing processing for respective edit parts, which are determined based on the respective positions of the extracted old electronic manuscripts for identifying the edit parts in the edit electronic document. At that time, when a new manuscript is necessary in the editing processing, the new manuscript necessary in the editing processing and the old manuscript of the source of the key electronic manuscript are read collectively. Here, in a case that the editing processing to be performed is deletion processing or manuscript exchange processing, such a new manuscript is unnecessary.

The acquisition of the key electronic manuscript used for identifying the edit part in the edit electronic document may be achieved, for example, by reading a old start manuscript corresponding to the electronic manuscript at the start position or an old end manuscript corresponding to the electronic manuscript at the end position in the edit electronic document. Alternatively, among the electronic manuscripts saved in the document storage section (such as the data hold sections 34A, 34D, 44, and 64), an electronic manuscript or an electronic manuscript in the electronic document that can more easily be found out than those in the edit electronic document may be used. As typical cases, the old start manuscript and the old end manuscript are read out when the user has these manuscripts at hand and hence need not to look for them. In contrast, an electronic manuscript is to be used when an electronic manuscript or an electronic manuscript in the electronic document can more easily be found out by using a file search mechanism than by searching the edit electronic document held in the document storage section.

For example, an edit electronic document is specified among the stored documents saved in the confidential box on the device side. Then, an old manuscript at the edit start position and an old manuscript at the edit end position are read as the key manuscripts. Further, if necessary, new manuscripts required in the editing work may be read. Then, an edited new electronic document is automatically generated in which (i) unnecessary old electronic manuscripts are deleted from the edit electronic document, (ii) arrangement positions of the old electronic manuscripts are exchanged, or (iii) addition or substitution are performed for the old electronic manuscripts using the new electronic manuscripts. Then, this document is automatically saved into the data hold section 34A, 34D, 44, or 64.

Document Management Apparatus; Functional Blocks: First Exemplary Embodiment

Figure 2:
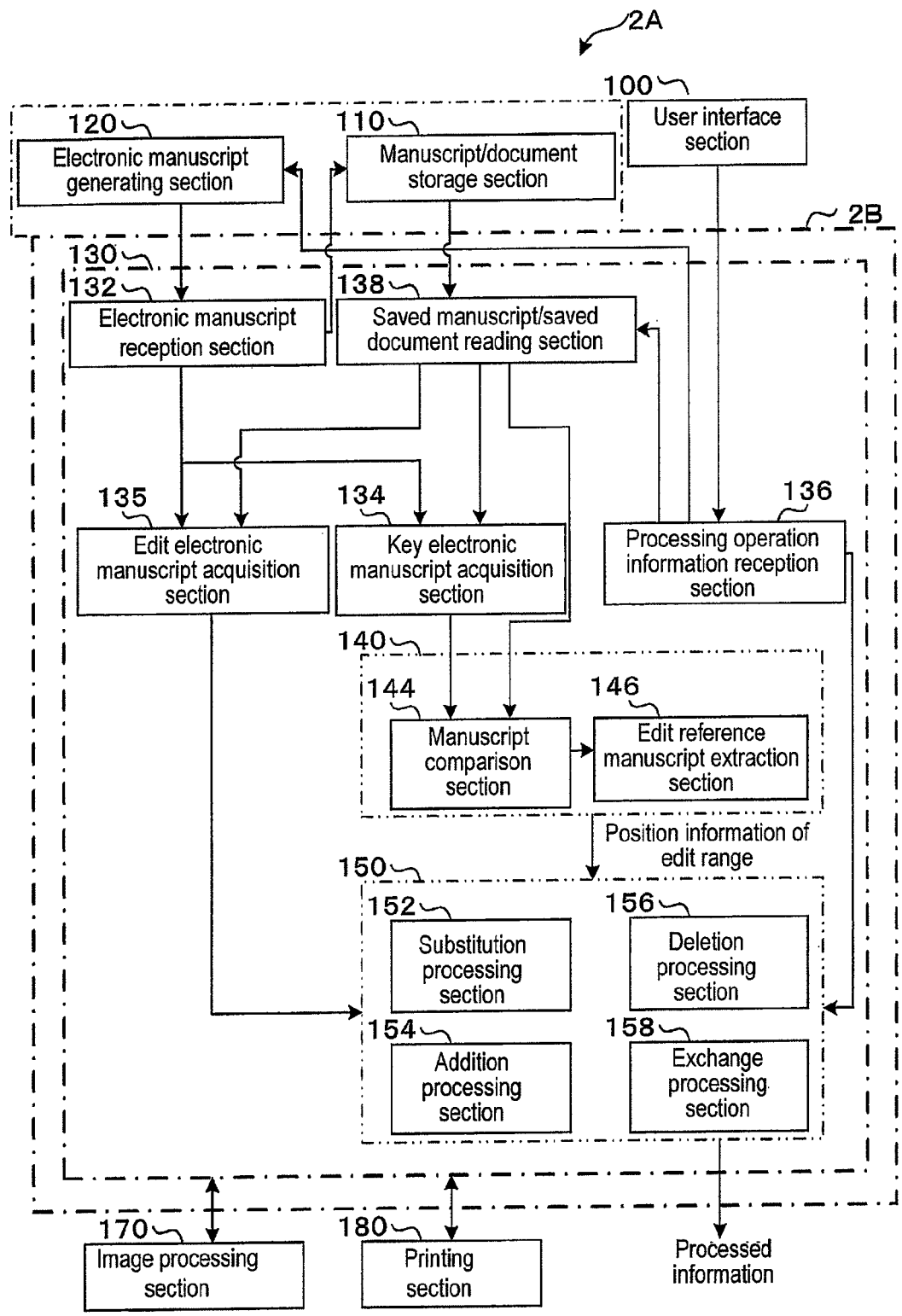
FIG. 2 is a block diagram showing a functional outline of a document management system and the document management apparatus, which constitutes main parts of a document editing function in a document processing system, according to a first exemplary embodiment.

FIG. 2 is a block diagram showing the functional outline of the document management system 2A and the document management apparatus 2B according to the first exemplary embodiment that constitutes main parts of the document editing function in the document processing system 1.

As shown in the figure, the document management system 2A of the first exemplary embodiment includes: a user interface section 100 for presenting an operation screen and receiving an operation instruction from a user; a manuscript/document storage section 110 for storing an electronic manuscript and/or an electronic document generated by combining plural sheets of electronic manuscripts; and an electronic manuscript generating section 120 for generating an electronic manuscript (key electronic manuscript) obtained by reading and converting a manuscript into image data.

Further, the document management system 2A includes: an edit part identification section 140 for acquiring a key electronic manuscript used for identifying an edit part in an edit electronic document stored in the manuscript/document storage section 110 and then identifying the edit part based on the key electronic manuscript; and a document editing processing section 150 for performing given editing processing for the old electronic manuscript in the edit part identified by the edit part identification section 140.

The document editing processing section 150 performs editing processing specified by the user, using the new electronic manuscripts (unnecessary in some cases, depending on contents of the editing processing). Then, the document editing processing section 150 generates an edited new electronic document in which (i) substitution or addition has been performed using the new electronic manuscript, (ii) unnecessary old electronic manuscripts have been deleted from the edit electronic document, or (iii) page positions have been exchanged. Then, the document editing processing section 150 saves the obtained document into the manuscript/document storage section 110.

Further, the document management system 2A includes: an image processing section 170 for performing given image processing such as color conversion, color correction, gray level correction, scaling, image rotation, and screen generation for an electronic manuscript generated by the electronic manuscript generating section 120, an old electronic manuscript that is read from the manuscript/document storage section 110 and constitutes an edit electronic document, and a new electronic manuscript that is edited by the document editing processing section 150 and constitutes a new electronic document; and a printing section 180 for performing printout onto a given output medium (e.g., printing paper) based on an electronic manuscript generated by the electronic manuscript generating section 120, an edit electronic document read-out from the manuscript/document storage section 110, and an electronic manuscript that is edited by the document editing processing section 150 and constitutes a new electronic document.

The user interface section 100 displays various kinds of information to a user using the document management system 2A or the document management apparatus 2B, and receives various kinds of information input from the user. For example, the user interface section 100 is implemented by a display section having a display unit with touch panel and an input section having various kinds of buttons, switches, keys, and the like. For example, this display section corresponds to the operation panel of the imaging device 3 shown in FIG. 1 or a pointing member and a display device such as a keyboard and a mouse of the processing instruction device 4.

The electronic manuscript generating section 120 optically reads the image of a manuscript, and corresponds to the image reading function section of the copying machine 3A, the image reading device 3C, the multifunction device 3D, or the like shown in FIG. 1. For example, the electronic manuscript generating section 120 is implemented by: a light source unit for projecting line-shaped light for image reading onto a manuscript surface; a plurality of mirrors each for reflecting the reflected light from the manuscript surface in a predetermined direction; an image formation lens for forming at a predetermined position an image of the light reflected by the mirrors; and a photoelectric conversion element (e.g., a line sensor employing a CCD, CMOS, or the like) for receiving the light image-formed by the image formation lens and then performing photoelectric conversion. Preferably, the electronic manuscript generating section 120 has an auto document feeder ADF for sequentially conveying manuscripts sheet by sheet toward a manuscript reading position. Further, the electronic manuscript generating section 120 generates image data, as one sheet of electronic manuscript, by reading one sheet of manuscript.

The manuscript/document storage section 110 combines plural sheets of electronic manuscripts into one electronic document, and then saves (stores or accumulates, in another terminology) the electronic document into a mass storage medium such as a hard disk drive and an optical disk unit. The manuscript/document storage section 110 corresponds to the data hold section 34A, 34D, 44, or 64 shown in FIG. 1. Examples of the electronic document stored in the manuscript/document storage section 110 include an electronic document including electronic manuscripts obtained by reading manuscripts through the electronic manuscript generating section 120 and an electronic document including electronic manuscripts generated through a terminal unit such as a PC.

The printing section 180 corresponds to the copying machine 3A, the printing function section of the printing device 3B, or the multifunction device 3D shown in FIG. 1.

The edit part identification section 140 and the document editing processing section 150 form the core of the document management system 2A and the document management apparatus 2B, and are included in each of the control sections 32A, 32D, 42, and 62 shown in FIG. 1. In the following description, a control section provided with the edit part identification section 140 and the document editing processing section 150 may be referred also to as an "edit control section" 130.

The hardware configuration of the edit control section 130 may be implemented by a mechanism similar to a common computer having: a CPU (Central Processing Unit: central arithmetic control section) for performing the core operation of control processing and arithmetic processing; and memory apparatuses such as a RAM (Random Access Memory) and a ROM (Read Only Memory) for storing processed data and program data. Examples of such a hardware configuration are common knowledge and include the configurations of computers such as a personal computer provided with a microprocessor that executes software for predetermined processing (an example is given later).

The edit control section 130 has: an electronic manuscript reception section 132 for receiving an electronic manuscript processed from the electronic manuscript generating section 120 (e.g., a manuscript reading function section provided in the copying machine 3A, the image reading device 3C, the multifunction device 3D, or the like); a key electronic manuscript acquisition section 134 for acquiring a key electronic manuscript used for automatically identifying an edit part (including a reference position of an editing processing range) in an edit electronic document; and an edit electronic manuscript acquisition section 135 for acquiring an edit electronic manuscript necessary in editing processing.

The key electronic manuscript acquisition section 134 adopts, as searching key electronic manuscript(s), one sheet or plural sheets of electronic manuscripts that are generated by the electronic manuscript generating section 120 and received by the electronic manuscript reception section 132 as identifying edit parts. Alternatively, the key electronic manuscript acquisition section 134 adopts, as searching key electronic manuscript(s), one sheet or plural sheets of electronic manuscripts in an electronic document already registered separately (having a different file name) from the one sheet or plural sheets of electronic manuscripts or the edit electronic document already registered in the document storage section (such as the data hold sections 34A, 34D, 44, and 64) for storing electronic documents.

When an edit mode is a mode that requires editing electronic manuscripts, the edit electronic manuscript acquisition section 135 adopts, as edit electronic manuscript(s), one sheet or plural sheets of electronic manuscripts that are generated by the electronic manuscript generating section 120 and received as an edit target by the electronic manuscript reception section 132. Alternatively, the edit electronic manuscript acquisition section 135 adopts, as edit electronic manuscript(s), one sheet or plural sheets of electronic manuscripts in an electronic document already registered separately (having a different file name) from the one sheet or plural sheets of electronic manuscripts or the edit electronic document already registered in the document storage section (such as the data hold sections 34A, 34D, 44, and 64) for storing electronic documents.

Here, a user places manuscripts at a given position of the manuscript reading section of the electronic manuscript generating section 120, and then inputs an operation instruction such as copying, fax transmission, scanning, or deletion by shredder through the user interface section 100 such as an operation panel provided in the imaging device 3 (or the processing instruction device 4). From the manuscripts, the manuscript reading section generates image data (may be referred to as "electronic manuscripts", in particular) of the manuscripts, and then transmits the generated image data to the electronic manuscript reception section 132 together with manuscript identification information for uniquely identifying the electronic manuscripts.

In addition to the edit part identification section 140 and the document editing processing section 150, the edit control section 130 has: a processing operation information reception section 136 for receiving information concerning processing operation to be performed for an electronic document saved in the manuscript/document storage section 110, through an operation device such as the operation panel provided in the imaging device 3; and a saved manuscript/saved document reading section 138 for reading a key electronic manuscript (may be an electronic document containing a key electronic manuscript), an edit electronic manuscript (may be an electronic document containing an edit electronic manuscript), or an edit electronic document of an editing processing target from among various kinds of electronic documents saved in the manuscript/document storage section 110.

The edit part identification section 140 has: a manuscript comparison section 144 that compares (checks) one sheet or plural sheets of key electronic manuscripts, which are received from the key electronic manuscript acquisition section 134 as defining an edit part(s), and the old electronic manuscripts constituting the edit electronic document read by the saved manuscript/saved document reading section 138, to thereby calculate difference information Diff between the electronic manuscripts; and an edit reference manuscript extraction section 146 that, based on the difference information Diff for each old electronic manuscript constituting the edit electronic document, extracts an electronic manuscript defining a reference position of editing processing in the edit electronic document (e.g., at least one of an electronic manuscript that defines a start position of editing processing in the electronic document, an electronic manuscript that defines a start position of an edit part, and an electronic manuscript that defines an end position of the edit part).

In the image comparison (image check) function provided in the manuscript comparison section 144, a general image searching function is available. For example, the manuscript comparison section 144 may search (i) electronic manuscripts constituting an electronic document to be edited and (ii) information, which are saved in the manuscript/document storage section 110, using as a key image an electronic manuscript, which is received by the electronic manuscript reception section 132 as defining a reference position of editing processing, for an electronic manuscript that is the same as or similar to the key image. Thus, each of the electronic manuscripts constituting the electronic document to be edited is compared one by one with the electronic manuscript of the old manuscript adopted as the key image, so that difference information Diff between the images is calculated. The technique of image check may be any one of various kinds of publicly known techniques such as comparison of feature quantities of the images. Here, in the image check performed by the manuscript comparison section 144, in place of the use of the image data itself of the key electronic manuscript and each of the electronic manuscript constituting the edit electronic document, data of thumbnail images generated by reducing the original data may be used.

The manuscript comparison section 144 performs image check so as to generate a score of the search result. Here, the score of search result is an index that indicates a level (degree) of identicalness between two images (the key electronic manuscript and each old electronic manuscript that constitutes the edit electronic document) to be checked. This score is determined based on the difference information Diff.

Based on the difference information Diff for each old electronic manuscript that constitutes the edit electronic document, the edit reference manuscript extraction section 146 extracts an old electronic manuscript determined as identical or best similar to the old manuscript that defines the reference position of editing processing, as an electronic manuscript at a start position of editing processing, a start position of an edit part, or an end position of the edit part.

Based on the position (so-called page position) of the electronic manuscript at the reference position (e.g., at least one of an electronic manuscript that defines a start position of editing processing to be performed for the electronic document, an electronic manuscript that defines a start position of an edit part, and an electronic manuscript that defines an end position of the edit part) in the edit electronic document extracted by the edit reference manuscript extraction section 146, the edit part identification section 140 automatically identifies position information (at least one of the start position of the editing processing, the start position of the edit part, and the end position of the edit part) that defines the edit part, and then notifies the identified information to the document editing processing section 150.

Based on the position information that defines the edit part identified by the edit reference manuscript extraction section 146, that is, with adopting as a reference at least one of the start position of the editing processing, the start position of the edit part, and the end position of the edit part, the document editing processing section 150 performs given editing processing for the old electronic manuscripts in the edit part of the edit electronic document read by the saved manuscript/saved document reading section 138 from among the plurality of electronic documents stored in the manuscript/document storage section 110, using one sheet or plural sheets of new electronic manuscripts, which are generated by the electronic manuscript generating section 120 and then received as the edit target by the electronic manuscript reception section 132 (such new electronic manuscripts are unnecessary in some cases, depending on contents of the editing processing).

For example, the document editing processing section 150 edits the electronic document saved in the manuscript/document storage section 110 in units of electronic manuscripts. The document editing functions provided in the document editing processing section 150 include a manuscript substitution function, a manuscript addition (insertion) function, a manuscript deletion function, and a manuscript exchange function. In correspondence to these functions, the document editing processing section 150 has a substitution processing section 152 for performing manuscript substitution processing, an addition processing section 154 for performing manuscript addition processing, a deletion processing section 156 for performing manuscript deletion processing, and an exchange processing section 158 for performing manuscript exchange processing.

The processing mode of document editing (such as a manuscript substitution mode, a manuscript addition mode, a manuscript deletion mode, and a manuscript exchange mode) activated in the document editing processing section 150 is selected by the user through the operation panel or the like of the user interface section 100. Further, processing conditions of the document editing (e.g., the read sequence of the key manuscripts defining the reference positions or the new manuscripts of the edit target) applied to each processing mode are specified by the user through the operation panel, or alternatively set up in advance by the apparatus and presented to the user.

For example, by using the various kinds of apparatuses (the copying machine 3A, the image reading device 3C, and the multifunction device 3D) having an image reading function, an old manuscript defining a start position of editing processing, a start position of an edit part, or an end position of an edit part in a saved electronic document of the edit target is read as a key manuscript. The electronic manuscript reception section 132 receives the key electronic manuscript including image data of the key manuscript, and then transfers the key electronic manuscript to the manuscript comparison section 144 of the edit part identification section 140. In accordance with the user operation information received by the processing operation information reception section 136, the saved manuscript/saved document reading section 138 reads a saved electronic document of the edit target, and then transfers it as an edit electronic document to the manuscript comparison section 144. The manuscript comparison section 144 checks the key electronic manuscript received by the electronic manuscript reception section 132 against each of old electronic manuscripts constituting the edit electronic document read by the saved manuscript/saved document reading section 138, then calculates difference information Diff indicating the check result, and then transfers the calculated difference information Diff to the edit reference manuscript extraction section 146.

Based on the difference information Diff for each of the old electronic manuscript constituting the edit electronic document, the edit reference manuscript extraction section 146 extracts an old electronic manuscript that agrees with (is determined as identical or best similar to) the key electronic manuscript that defines a reference position of editing processing in the edit electronic document, as an electronic manuscript at a start position of editing processing, at a start position of an edit part, or at an end position of the edit part. Then, based on the arrangement position (page position), in the edit electronic document, of the electronic manuscript located at each reference position in the edit electronic document, the edit reference manuscript extraction section 146 identifies position information that defines the edit part, and then notifies this position information to the document editing processing section 150.

In accordance with the position information that is notified from the edit part identification section 140 and defines the edit part, the document editing processing section 150 performs given editing processing for the edit part, which is determined based on each position information identified by the edit reference manuscript extraction section 146. At that time, when manuscript substitution processing or manuscript addition processing is to be performed, an electronic manuscript of a new manuscript is necessary. Thus, the electronic manuscript (new electronic manuscript) of the new manuscript necessary in the editing processing is acquired through the electronic manuscript reception section 132, and then used in the editing processing.

Here, the electronic manuscript in the edit electronic document agrees with the key electronic manuscript is adopted as the start position or the end position. Then, the electronic manuscript at the start position or the end position may be included in the editing processing target. However, this definition is not essential. That is, the key electronic manuscript is a manuscript at the reference position of the editing range, and hence the range (editing range) to be actually edited may be sets up arbitrarily relative to the reference position. For example, a range extending from a position immediately after an electronic manuscript that agrees with one of two key electronic manuscript sheets to a position immediately before an electronic manuscript that agrees with the other of the two key electronic manuscript sheets may be adopted as the editing range. Alternatively, a range extending from M sheets after an electronic manuscript that agrees with one of two key electronic manuscript sheets to N sheets before an electronic manuscript that agrees with the other of the two key electronic manuscript sheets may be adopted as the editing range. The information concerning the actual setup of the editing range relative to the reference position of editing range may be notified to the user. Alternatively, the setup may be performed by the user.

However, from the perspective of general editing processing, the following setup rules are preferable because of easiness in the intuitive understanding of the relation between the reference position and the editing range. That is, in the case of substitution processing, the key electronic manuscript is treated as defining the start position of substitution processing, the start position of substitution range, or the end position of substitution range. Then, a given number of sheets of new electronic manuscripts are substituted starting at the start position. Alternatively, new electronic manuscripts are substituted into the range from the start position to the end position. In the case of addition processing, the key electronic manuscript is treated as defining the start position of addition processing, the start position of addition range, or the end position of addition range. Then, a given number of sheets of new electronic manuscripts are added immediately before or immediately after the start position. Alternatively, the part extending from a position immediately after the start position to a position immediately before the end position is deleted, and then new electronic manuscripts are inserted into that part. The exchange processing indicates exchanging of the page positions within the same edit electronic document, and hence is processed by a combination of deletion processing and insertion processing.

Here, as seen from description on FIG. 1, the difference between the document management system 2A and the document management apparatus 2B is whether the edit control section 130 is integrated with or separated from the manuscript/document storage section 110 and the electronic manuscript generating section 120. For example, as shown in the figure, it is sufficient that the document management apparatus 2B has at least the edit control section 130, the key electronic manuscript acquisition section 134, the edit part identification section 140, and the document editing processing section 150. Then, it is preferable that the manuscript/document storage section 110 and the electronic manuscript generating section 120 are installed in the apparatus same in a manner integrated with the edit control section 130 (these sections are surrounded together by a dash-dotted line in the figure). Then, in a case that the edit control section 130 is separated from the manuscript/document storage section 110 and the electronic manuscript generating section 120, these sections are connected through interconnection cables, the network 9, or the like so that the document management system 2A is constructed.

<Outline of Processing Procedure>

Figure 3:
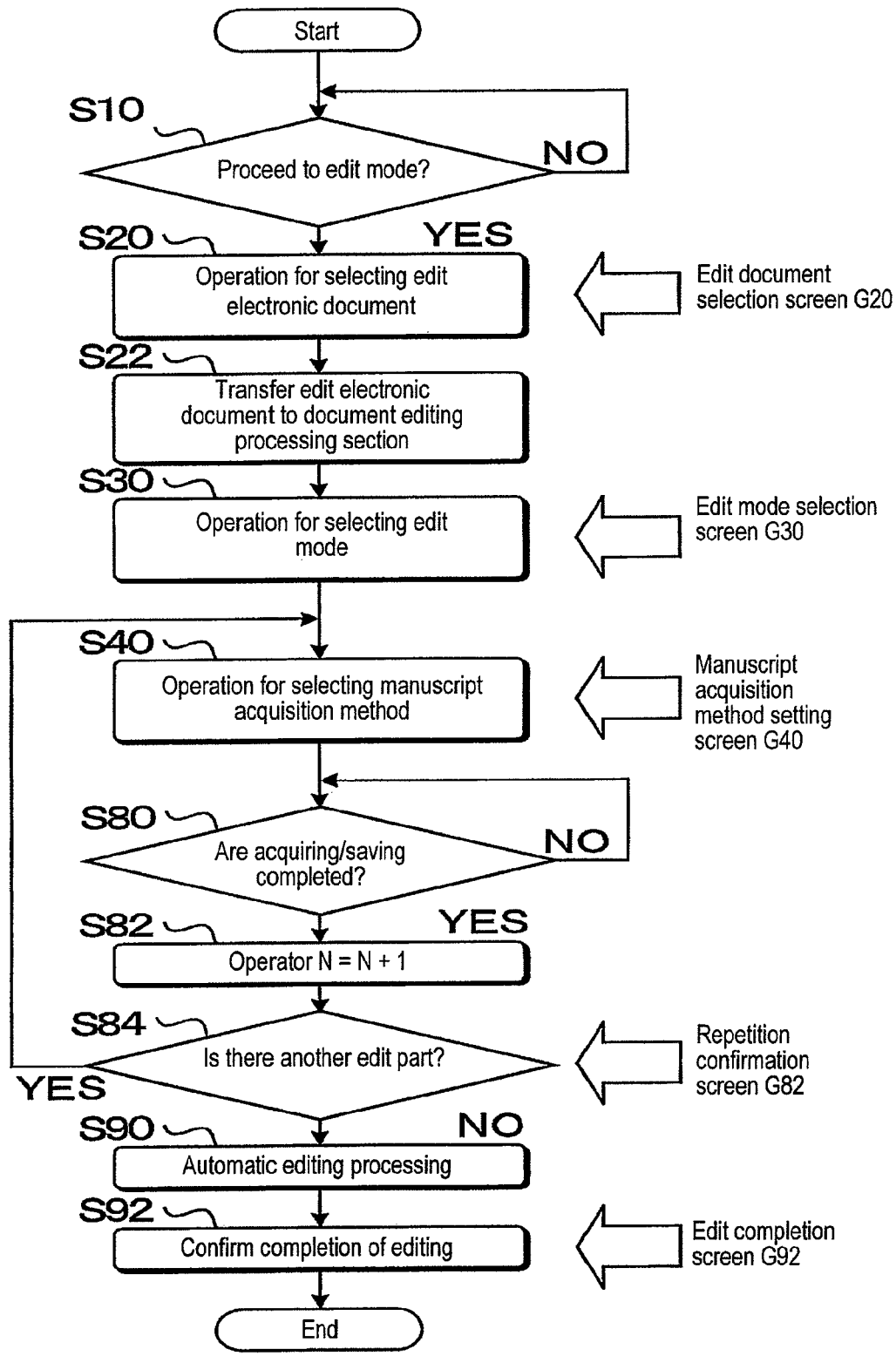
FIG. 3 is a flow chart showing an outline of an operating procedure and a processing procedure from read-out of an edit electronic document to automatic editing processing.

FIG. 3 is a flow chart showing the outline of the operating procedure and the processing procedure from read-out of an edit electronic document to automatic editing processing.

When the processing operation information reception section 136 receives information concerning the situation that the user has specified an edit mode through the operation panel or the like of the user interface section 100, the main control section of the document management apparatus 2B goes into this edit mode (S10—YES). After the transition to an edit mode, first, the document management apparatus 2B presents (e.g., displays) an operation screen (referred to as an edit document selection screen G20) for receiving user's specification of an edit electronic document, on the operation panel of the user interface section 100 or another display device, and then receives selection operation for an edit electronic document from the user (S20). Here, an example of the edit document selection screen G20 is described below with reference to particular cases of edit modes.

On the edit document selection screen G20, file names of all electronic documents registered in the manuscript/document storage section 110 are presented (e.g., displayed) in accordance with a given rule such as a box browsing format or a list browsing format. The user finds out a file name of an electronic document that he/she wants to edit in the browsing display on the edit document selection screen G20. When the user selects the file name and then performs confirmation (e.g., double-clicks the file name), the main control section of the document management apparatus 2B determines the electronic document having the file name selected at that time as an edit electronic document to be edited (target of document editing). When the processing operation information reception section 136 receives the determination instruction, the saved manuscript/saved document reading section 138 reads the data of the selected edit electronic document from the manuscript/document storage section 110, and then transfers the read data to the edit control section 130 (S22).

When the edit electronic document is determined, the main control section of the document management apparatus 2B presents (e.g., displays) an operation screen (referred to as an "edit mode selection screen G30") for receiving user's specification of an edit mode, onto the operation panel of the user interface section 100 or another display device, and then receives selection operation for the edit mode from the user (S30). Here, an example of the edit mode selection screen G30 is described below with reference to particular cases of edit modes.

On the edit mode selection screen G30, the file name of the edit electronic document determined at step S20 and mode selection buttons for specifying contents of document editing processing to be performed for the edit electronic document are displayed. In this example, the presented mode selection buttons include: a deletion button for selecting a manuscript deletion mode; a substitution button for selecting a manuscript substitution mode; an addition button for selecting a manuscript addition mode; and an exchange button for selecting a manuscript exchange mode. The user selects a button corresponding to the desired editing content from among the selection buttons displayed on the edit mode selection screen G30. When the user selects any one of the edit mode selection buttons and then performs confirmation (e.g., double-clicks the button), the main control section of the document management apparatus 2B determines that the button selected at that time indicates the mode (editing contents) of document editing.

When the selection operation for the document edit mode is completed, if a new electronic manuscript is necessary in the key electronic manuscript acquisition method or in the editing processing, the main control section of the document management apparatus 2B presents (e.g., displays) an operation screen (referred to as a "manuscript acquisition method setting screen G40") for receiving selection specification of an acquisition method for the new electronic manuscripts, on the operation panel of the user interface section 100 or another display device, and then receives selection operation from the user (S40). When the user select a button for acquisition method selection and then performs confirmation (e.g., clicks the OK button), the main control section of the document management apparatus 2B displays the next screen corresponding to the selected acquisition method.

Then, when detecting the completion of acquisition of the key electronic manuscript(s) and the new electronic manuscript(s) and the completion of save of these manuscripts into the manuscript/document storage section 110 that are performed in accordance with the screen display corresponding to the selected acquisition method (S80—YES), the main control section of the document management apparatus 2B increments by "1" an operator N for monitoring the edit part(s) (S82). Then, the main control section of the document management apparatus 2B presents (e.g. displays) a confirmation screen (referred to as a "repetition confirmation screen G82") for confirming as to whether another edit part in the same edit mode is present, on the operation panel of the user interface section 100 or another display device, and then receives an instruction operation from the user (S84). Here, the processing at steps S82 and S84 may be omitted so that specifying plural edit parts in the same edit mode may be not accepted.

The repetition confirmation screen G82 displays: a continuation button for selecting continuation of processing in the same edit mode; and an end button for selecting termination of processing in the present edit mode. The user selects any one of the selection buttons on the repetition confirmation screen G82. When the user selects the continuation button and then performs confirmation (e.g., double-clicks the continuation button) (S84—YES), the main control section of the document management apparatus 2B returns to step S40 so as to perform processing similar to the above-mentioned one.

Here, when the procedure returns to step S40, an advantage is obtained that the acquisition method for the key electronic manuscripts or the new electronic manuscripts can be specified into a different one from the preceding one. At that time, the previously selected buttons of acquisition method are made active. Then, in order that the state can easily be recognized, emphasized displaying may be employed such as highlighted (high luminance) displaying or displaying in another color. When the acquiring condition is to be changed, a desired button is made active, and then the OK button is clicked. There may be a case that when plural edit parts are to be processed, the same acquisition method for the key electronic manuscripts and the new electronic manuscripts is set up for all the edit parts. In this case, if the previously selected button of acquisition method is made active at the time of returning to step S40, clicking of the OK button would be only required.

On the other hand, when the user selects the end button and then performs confirmation (e.g., double-clicks the end button) (S84—NO), the document management apparatus 2B goes to automatic editing processing, which is in the edit mode selected at step S30 and is performed by the edit control section 130 based on the electronic manuscripts of the key manuscripts and the new manuscripts necessary in the editing that are acquired at step S40 (S90).

When the automatic editing processing performed by the edit control section 130 is completed, the main control section of the document management apparatus 2B presents (e.g., displays) a screen (referred to as an "edit completion screen G92") for presenting a user that the edited electronic document has been saved into the manuscript/document storage section 110, onto the operation panel of the user interface section 100 or another display device (S92).

<Procedure of Acquiring Key Manuscript(s) and New Manuscript(s)>

Figure 3A:
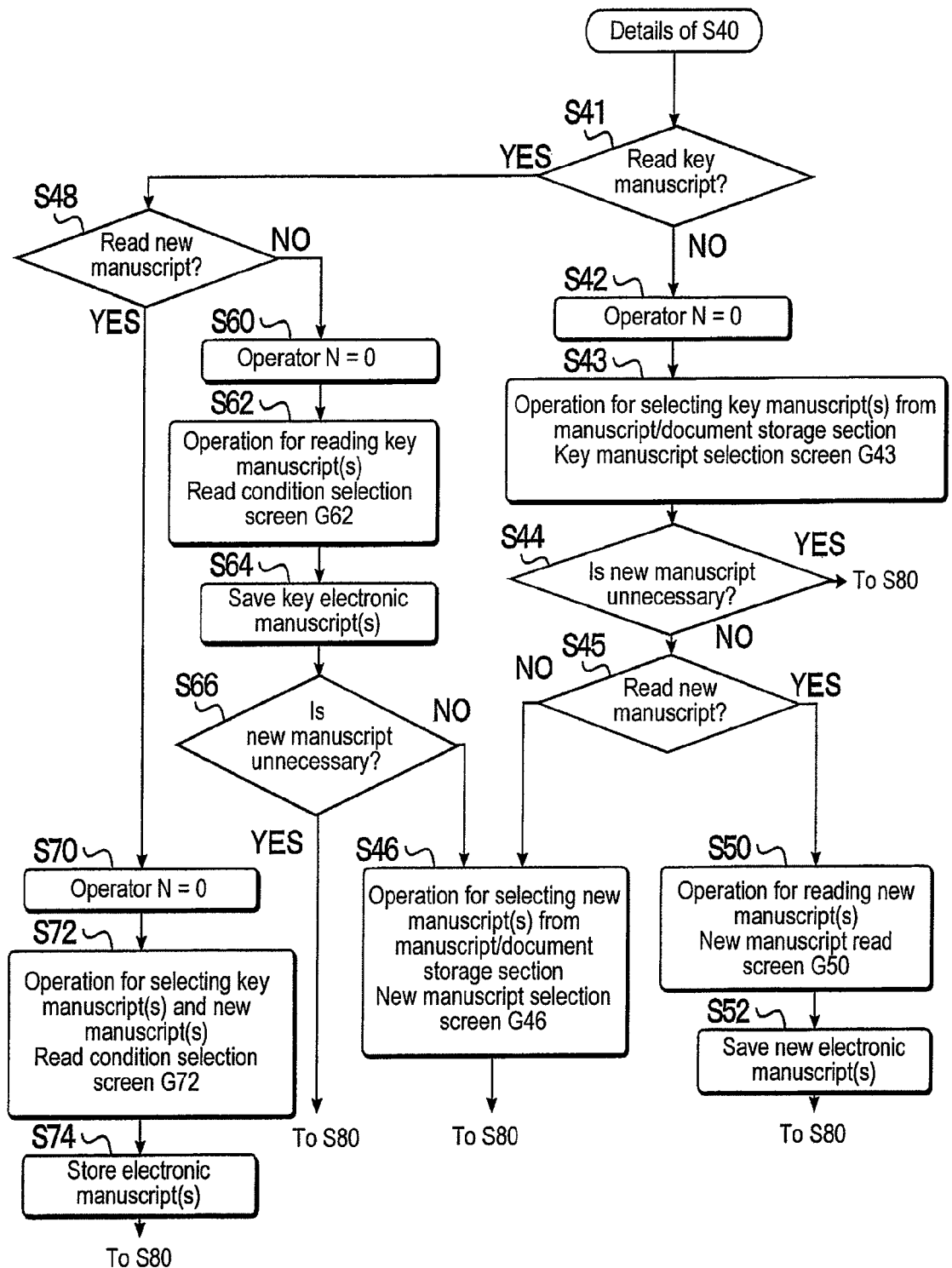
FIG. 3A is a flow chart describing a detailed procedure at step S40.

FIG. 3A is a flow chart describing the detailed procedure at step S40. First, when an edit mode in which new manuscript(s) is unnecessary in editing processing is selected, the main control section of the document management apparatus 2B inhibits selection of the new manuscript read button or the new manuscript save button on the manuscript acquisition method setting screen G40.

When the key manuscript save button is selected on the manuscript acquisition method setting screen G40, the main control section of the document management apparatus 2B determines that reading of key manuscript(s) is unnecessary (S41—NO), and then initializes the operator N for monitoring the edit part to "0" (S42). Further, the main control section presents (e.g., displays) an operation screen (referred to as a "key manuscript selection screen" G43) for receiving selection of key manuscript(s) from the saved electronic manuscripts, on the operation panel of the user interface section 100 or another display device. Then, the main control section receives selection operation for key electronic manuscript(s) from the manuscript/document storage section 110 performed by the user (S43).

On the key manuscript selection screen G43, file names of all electronic manuscripts and electronic documents registered in the manuscript/document storage section 110 are presented in accordance with a given rule such as a box browsing format and a list browsing format. In the browsing display on the key manuscript selection screen G43, the user finds out a file name of an electronic manuscript located at a start position of editing processing, at a start position of an edit part or at an end position of the edit part, or alternatively an electronic document containing such an electronic manuscript. When the user selects a file name and a page position and then performs confirmation, the main control section of the document management apparatus 2B determines that the electronic manuscript having the file name selected at that time or the electronic manuscript at the specified page position in the electronic document is a key electronic manuscript. When receiving the determination instruction, the processing operation information reception section 136 notifies the information to the document editing processing section 150.

When the processing operation information reception section 136 receives the completion of selection operation for key electronic manuscript(s), it is determined as to whether or not it is unnecessary to acquire a new manuscript because only the key manuscript save button is selected on the manuscript acquisition method setting screen G40 (S44). When only the key manuscript save button is selected, that is, when it is unnecessary to acquire a new manuscript (S44—YES), the procedure goes to step S80. Otherwise, the procedure goes to step S45.

When the procedure enters step S45, the main control section of the document management apparatus 2B determines which is selected between the new manuscript read button and the new manuscript save button on the manuscript acquisition method setting screen G40 (S45). When the new manuscript read button is not selected, that is, when the new manuscript save button is selected (S45—NO), the main control section of the document management apparatus 2B presents an operation screen (referred to as a "new manuscript selection screen" G46) for receiving user's specification for a new manuscript, on the operation panel of the user interface section 100 or another display device, and then receives selection operation for a new manuscript from the user (S46).

On the old manuscript selection screen G46, the file names of all electronic manuscripts (each including a single sheet) and electronic documents registered in the manuscript/document storage section 110 are presented in accordance with a predetermined rule such as a box browsing format and a list browsing format. When an electronic document is selected, in response to the selection operation, a field is automatically displayed where the page position is to be specified and input. In the browsing display on new manuscript selection screen G46, the user finds out the file names of a new electronic manuscript necessary in editing processing and an electronic document containing a new electronic manuscript. When the user selects and specifies a file name and a page position and then performs confirmation, the main control section of the document management apparatus 2B determines that the electronic manuscript of the file name selected at that time or the electronic manuscript at the specified page position in the electronic document is a new electronic manuscript specified first. When receiving the determination instruction, the processing operation information reception section 136 notifies the information to the document editing processing section 150. Then, the procedure goes to step S80.

On the manuscript acquisition method setting screen G40, when the new manuscript read button is selected (S45—YES), the main control section of the document management apparatus 2B presents an operation screen (referred to as a new manuscript read screen G50) for receiving read operation for a new manuscript, onto the operation panel of the user interface section 100 or another display device, and then receives read operation for a new manuscript from the user (S50). On the new manuscript read screen G50, an operation menu is also presented for receiving specification for various kinds of read conditions such as a color mode, a manuscript feed mode, and a manuscript image quality.

After various kinds of setting is performed on the new manuscript read screen G50, when the start button is pressed, the main control section of the document management apparatus 2B instructs a manuscript reading section to start reading operation, and issues instruction for save of the new electronic manuscript read by the manuscript reading section into the manuscript/document storage section 110 (S52). Then, the procedure goes to step S80.

On the manuscript acquisition method setting screen G40, when the key manuscript read button is selected (S41—YES) but the new manuscript read button is not selected (S48—NO), first, the main control section of the document management apparatus 2B initializes the operator N for monitoring the edit part to "0" (S60). Further, an operation screen (referred to as a "read condition selection screen G62") for presenting to the user the procedure of reading a key manuscript and for receiving specification of various kinds of read conditions such as a color mode, a manuscript feed mode, and a manuscript image quality is presented onto the operation panel of the user interface section 100 or another display device so that selection operation is received from the user (S62).

The "procedure of reading manuscripts" presented on the read condition selection screen G62 is the procedure of reading key manuscript(s) (old manuscript(s)) to be used by the edit part identification section 140 for automatically determining the position (the start position of editing processing, the start position of the edit part, or the end position of the edit part) serving as the reference in the editing processing for the edit electronic document.

After various kinds of setting is performed on the read condition selection screen G62, when the start button is pressed, the main control section of the document management apparatus 2B instructs a predetermined manuscript reading section to start reading operation, and issues instruction for save of the key electronic manuscript read by the manuscript reading section into the manuscript/document storage section 110 (S64).

After that, when the processing operation information reception section 136 is notified that read of a key manuscript and save of the key manuscript as a key electronic manuscript have been completed, the main control section of the document management apparatus 2B determines as to whether or not the new manuscript save button is selected (S66). That is, it is determined as to whether or not it is unnecessary to acquire a new manuscript because only the key manuscript read button is selected on the manuscript acquisition method setting screen G40. When the new manuscript save button is not selected, it is determined that it is unnecessary to acquire a new manuscript, and then the procedure goes to step S80 (S66—YES). When the new manuscript save button is selected, the procedure goes to step S46, and then selection operation for a new manuscript(s) from the saved ones is received (S46).

On the manuscript acquisition method setting screen G40, when the key manuscript read button is selected (S41—YES) and the new manuscript read button is also selected (S48—YES), first, the main control section of the document management apparatus 2B initializes the operator N for monitoring the edit part to "0" (S70). Further, an operation screen (referred to as a "read condition selection screen G72") for presenting to the user the procedure of reading a key manuscript and a new manuscript and for receiving specification of various kinds of read conditions such as a color mode, a manuscript feed mode, and a manuscript image quality is presented onto the operation panel of the user interface section 100 or another display device so that selection operation is received from the user (S72). Here, the read condition selection screen G72 is described below with reference to particular cases of edit modes.

The "procedure of reading manuscripts" presented on the read condition selection screen G72 is the procedure of reading a key manuscript (an old manuscript) to be used by the edit part identification section 140 for automatically determining the position (the start position of editing processing or the start position and the end position of edit part) serving as the reference in editing processing in the edit electronic document, or alternatively the procedure of reading new manuscripts in a case that new electronic manuscript are necessary in editing processing.

After various kinds of setting is performed on the read condition selection screen G72, when the start button is pressed, the main control section of the document management apparatus 2B instructs a predetermined manuscript reading section to start reading operation, and issues instruction for save of the electronic manuscript read by the manuscript reading section into the manuscript/document storage section 110 (S74). Then, the procedure goes to step S80.

Here, in the read and save processing for the key manuscript (S62, S64), it is not necessary to read all of the key manuscript that defines the start position of editing processing, the key manuscript that defines the start position of edit part, and the key manuscript that defines the end position of edit part. Thus, the main control section of the document management apparatus 2B presents a message suitable for the specified edit mode. Further, in a case that read of a key manuscript that defines the end position of edit part having been instructed but that the user does not perform read of a key manuscript that defines the end position of edit part and hence a corresponding old electronic manuscript cannot be found in the edit electronic document, the main control section of the document management apparatus 2B performs processing in accordance with this situation.

<Examples of Operation Screens>

Figure 4C:
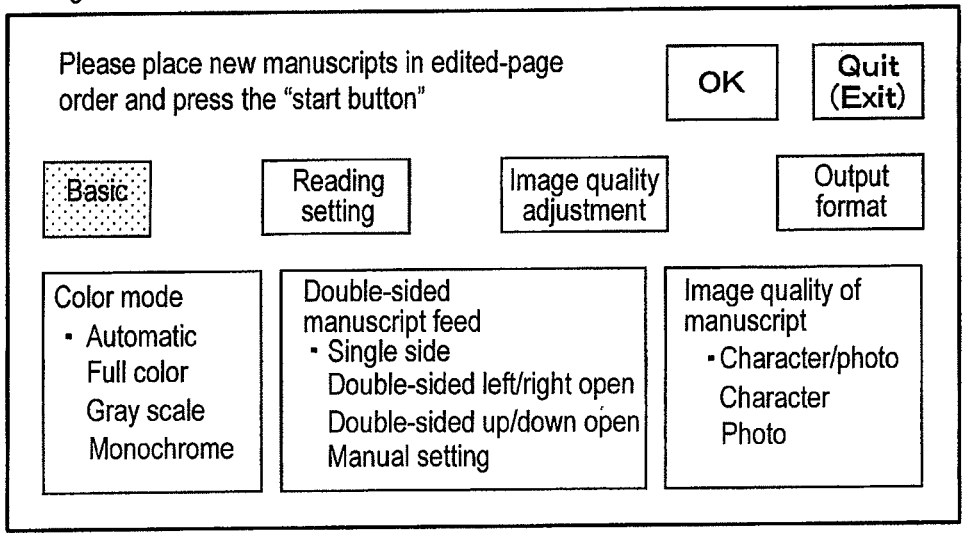
FIG. 4C is a diagram showing an example of a read condition selection screen G62.

FIGS. 4 to 4C are diagrams showing examples of screens presented at step S40 (more specifically, at steps S41 to S74).

At step S40, the main control section of the document management apparatus 2B presents the manuscript acquisition method setting screen G40_1 shown in FIG. 4 (1) for receiving selection specification of an acquisition method for the new electronic manuscript from the user in a case that a new electronic manuscript is necessary in the key electronic manuscript acquisition method or in the editing processing. On the manuscript acquisition method setting screen G40_1, selection buttons used for acquisition of a key electronic manuscript are presented that include a key manuscript read button for specifying read operation and a key manuscript save button for specifying selection operation from saved files are presented.

Further, when the edit mode selected at step S30 requires a new electronic manuscript for editing processing, selection buttons used for acquisition of a new electronic manuscript are presented that include a new manuscript read button for specifying read operation and a new manuscript save button for specifying selection operation from saved files.

In order that the user can easily recognize a selected acquisition method and a not-selected acquisition method, it is preferable that emphasized displaying is employed like highlighted (high luminance) displaying and displaying in another color. In the setting shown in the figure, both of the key manuscript and the editing manuscript are to be acquired by the read method. Thus, the key manuscript read button and the new manuscript read button are shaded with a halftone dot pattern.

Here, in the example shown in FIG. 4 (1), the same read method is selected for both of the key electronic manuscript (the old start manuscript) that defines the start position of editing processing or the edit part and the key electronic manuscript (the old end manuscript) that defines the end position of edit part. However, for example, the manuscript acquisition method setting screen G40_2 shown in FIG. 4 (2) may be presented, and then acquisition methods may be selected independently for the old start manuscript and the old end manuscript. In this case, processing steps and operation screens are prepared in accordance with this situation also in the processing described later.

At step S43, the main control section of the document management apparatus 2B first presents the key manuscript selection screen G43_1 for selecting the old start manuscript. Through the user interface (such as an operation panel) of the apparatus to be operated, the user issues instruction for displaying of electronic manuscripts and electronic documents in the user's own confidential box. Then, the key manuscript selection screen G43_1 shown in FIG. 4A (1) is displayed. Buttons are prepared such that any of list displaying and thumbnail displaying can be selected as a mode of browsing display. Here, in this exemplary embodiment, displaying is performed in ascending order of the number of pages of each electronic document. However, the displaying order for the electronic documents may be otherwise like the order of the save date of each electronic document and the order of the file name of each electronic document. That is, the user may set up arbitrarily.

On the key manuscript selection screen G43_1 for selecting the old start manuscript shown in the figure, the file name, the registration date and time, and the total number of pages are displayed for each of four electronic documents. Here, when some other electronic manuscripts and electronic documents cannot be displayed on the same single display screen, a publicly known mechanism such as a screen switching function and a scrolling function may be employed so that all electronic manuscripts and electronic documents serving as displaying objects may be displayed.

In the browsing display on the key manuscript selection screen G43_1, the user finds out one to be set up as the old start manuscript. For example, when an electronic manuscript itself to be set up as the old start manuscript is found out, its file name is selected and double-clicked. Further, when an electronic manuscript to be set up as the old start manuscript is to be found out in an electronic document, this electronic document is selected first. Then, a page input field is displayed. Thus, the page position, in the electronic document, of the electronic manuscript to be set up as the old start manuscript is input numerically. At that time, when the page position, in the electronic document, of the electronic manuscript to be set up as the old start manuscript is unknown, the user may double-click the file name of the electronic document so as to open the file, and then check the page position.

For example, the electronic manuscript at page 3 in the document "Img-x19237894" is to be set up as the old start manuscript, this file name is selected and then "3" is input into the page input field displayed in the horizontal vicinity. Then, the OK button is clicked. In order that, among the browsing-displayed electronic manuscripts and electronic documents, the user can easily recognize a manuscript or document selected by the user and not-selected ones, it is preferable that emphasized displaying is employed like highlighted (high luminance) displaying and displaying in another color. In the figure, the selected document is shown in a state shaded with a halftone dot pattern.

When the user selects the electronic manuscript to be set up as the old start manuscript and then performs confirmation (clicks the OK button), the main control section of the document management apparatus 2B notifies to the document editing processing section 150 the information concerning the file name of the electronic manuscript having been selected at that time or the file name of the electronic document and the page position. Further, the main control section of the document management apparatus 2B presents the key manuscript selection screen G43_2 for selecting an old end manuscript as shown in FIG. 4A (2). The mode of browsing display is similar to that of the key manuscript selection screen G43_1.

Similarly to the case of the old start manuscript, on the key manuscript selection screen G43_2, the user selects the electronic manuscript to be set up as the old end manuscript. Here, setting of the old end manuscript is to be omitted (intrinsically unnecessary depending on the editing contents or the like), the exit button is clicked. For example, the electronic manuscript "Img-x18227873" is to be set up as the old end manuscript, this file name is selected and then the OK button is clicked. In the figure, the selected electronic manuscript is shown in a state shaded with a halftone dot pattern.

At step S46, the main control section of the document management apparatus 2B presents the new manuscript selection screen G46_1 for selecting a new electronic manuscript necessary in editing processing as shown in FIG. 4B. The mode of browsing display is similar to that of the key manuscript selection screens G43_1 and G43_2. Similarly to the case of the old start manuscript or the old end manuscript, on the new manuscript selection screen G46_1, the user selects the electronic manuscript necessary in editing processing.

On this new manuscript selection screen G46_1, plural specification for the electronic manuscripts is available. Necessary manuscripts may be clicked in the order of usage (ascending order of the page number after the editing). Then, in accordance with this situation, a display mode is implemented such that the selected ones and their order of usage are explicitly shown. For example, as shown in the figure, the displaying is rearranged such that ones having younger order of usage are displayed at upper positions. Here, plural sheets of electronic manuscripts may be specified within the same electronic document. In this case, page positions are input in the order of usage. When this new manuscript selection screen G46_1 is used, the order of usage can be checked simultaneously to the selection operation.

The illustrated example indicates that the electronic manuscript "Img-x20225892", page 3 of the electronic document "Img-x19267894", the electronic manuscript "Img-x21204871", page 1 of the electronic document "Img-x19267894", and the electronic manuscript "Img-x21234795" are selected in this order.

Here, when already selected one is to be deleted, in the order-of-usage display, to-be-deleted one is clicked and then the deletion button is clicked. Further, when another one is to be added to the next of a particular part of the selected one, in the order-of-usage display, one at the reference position of addition is clicked and then the addition button is clicked. After that, an electronic manuscript (or a page in the electronic document) to be added is selected and specified. When the selection is completed, the exit button is clicked.

At step S62, the main control section of the document management apparatus 2B presents to the user the read condition selection screen G62_1 for reading a new electronic manuscript necessary in editing processing as shown in FIG. 4C. In this display example, it is premised that the electronic manuscript generating section 120 has an auto document feeder ADF. Then, the procedure of reading a new manuscript (editing manuscript) necessary in editing processing is presented. Further, it is presented that reading is to be performed in edited-page order (in ascending order).

In accordance with the "procedure of reading manuscripts" presented on the read condition selection screen G62_1, the user places one sheet or plural sheets of new manuscripts (editing manuscripts) to be used in the editing onto the auto document feeder ADF, and then presses the start button so as to start reading. When read of the editing manuscripts and save of the corresponding electronic manuscripts are completed, the main control section of the document management apparatus 2B goes to step S82.

Next, the automatic editing processing performed at step S90 is described below for each edit mode. At the same time, examples are also shown for the edit document selection screen G20 and the edit mode selection screen G30 as well as the read condition selection screen G72 corresponding to the individual edit modes.

<Manuscript Substitution Function>

Figure 5:
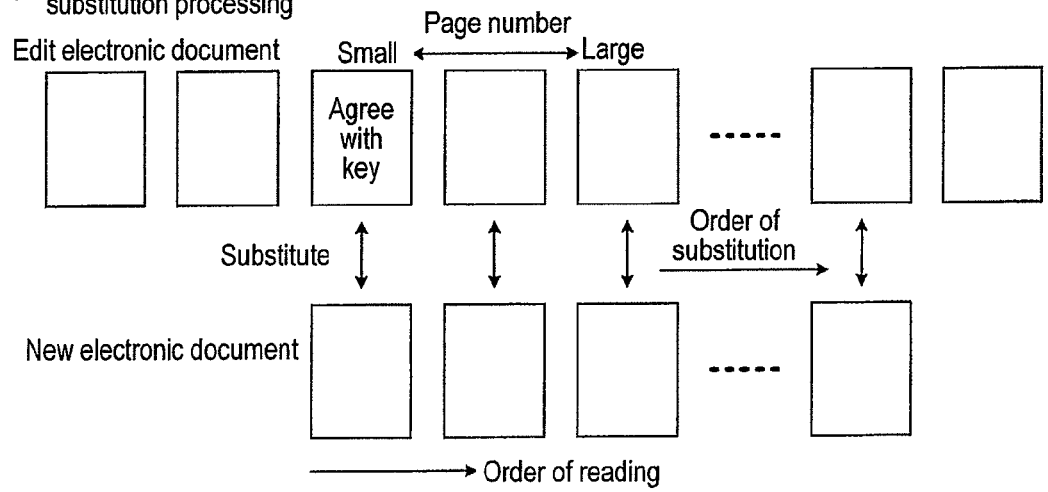
FIG. 5 is a diagram (part 1) describing an outline of manuscript substitution processing performed by an edit part identification section and by a substitution processing section of a document editing processing section.
Figure 5:
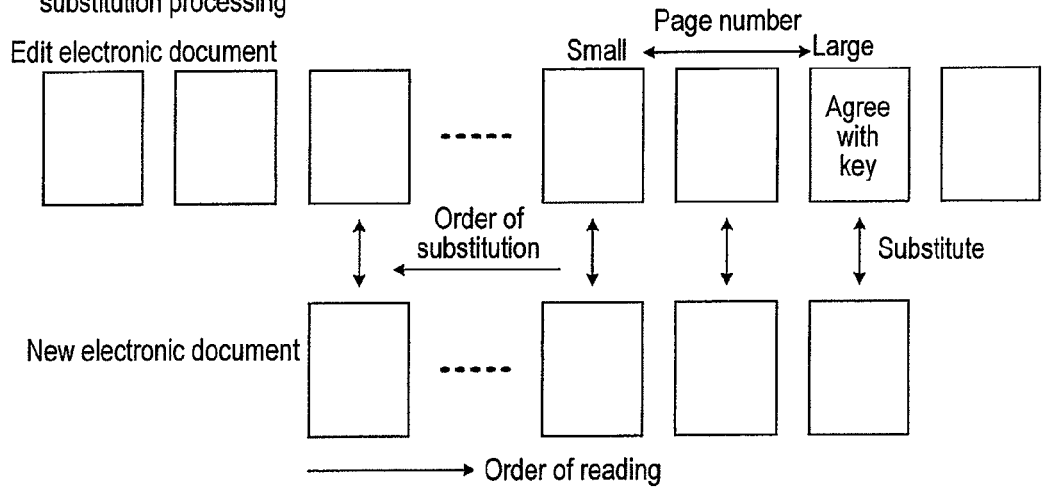

FIGS. 5 to 5C are diagrams describing the outline of manuscript substitution processing performed by the edit part identification section 140 and by the substitution processing section 152 of the document editing processing section 150. The manuscript substitution function is a document editing function of substituting an old electronic manuscript at a predetermined position in the edit electronic document with another electronic manuscript. This function is started when the user selects a manuscript substitution mode on the operation panel or the like. This function according to this exemplary embodiment is characterized in that an old electronic manuscript at a predetermined position in the edit electronic document is substituted by a new electronic manuscript generated by the electronic manuscript generating section 120.

Specifically, in this manuscript substitution function, in a manuscript substitution mode, for the edit electronic document, based on one sheet or plural sheets of key electronic manuscripts that are generated by the electronic manuscript generating section 120 and then received as a manuscript defining the reference position of editing processing range by the electronic manuscript reception section 132, the edit part identification section 140 identifies the electronic manuscript at the reference position of substitution (the substitution start position or the substitution end position). Then, for the substitution range identified based on the reference position, the old electronic manuscripts are deleted. After that, one sheet or plural sheets of new electronic manuscripts that are generated by the electronic manuscript generating section 120 and then received as the edit target by the electronic manuscript reception section 132 are inserted. As would be understood from this explanation, the substitution processing is recognized as processing implemented by a combination of deletion processing and addition processing.

For example, the edit part identification section 140 identifies position information that defines the substitution range based on the page position, in the edit electronic document, of the electronic manuscript at the reference position extracted by the edit reference manuscript extraction section 146, and then notifies the information to the document editing processing section 150. Based on reference position identified by the edit reference manuscript extraction section 146 (that is, with adopting as a reference at least one of the start position of substitution processing, the start position of substitution range, and the end position of substitution range), the substitution processing section 152 of the document editing processing section 150 performs substitution processing for the old electronic manuscripts in the edit part of the edit electronic document read by the saved manuscript/saved document reading section 138 from among the electronic documents stored in the manuscript/document storage section 110, by using one sheet or plural sheets of new electronic manuscripts that are generated by the electronic manuscript generating section 120 and then received as the edit target by the electronic manuscript reception section 132.

That is, from among the electronic documents registered in the manuscript/document storage section 110, an electronic document in which substitution is to be performed is selected in response to user instruction so as to be adopted as the edit electronic document. Then, key manuscripts (an old manuscript at a position where substitution is to be started and an old manuscript at a position where substitution is to be stopped) that define the substitution range and new manuscripts serving as the substitution object are collectively read by an apparatus (such as the copying machine 3A, the image reading device 3C, and the multifunction device 3D) having an image reading function. Then, the read-out key manuscripts are recognized and compared with each old electronic manuscript that constitutes the edit electronic document that is registered in the manuscript/document storage section 110 and serves as the substitution object. In this way, old electronic manuscripts are found out that define the start position of substitution processing or the start position and the end position of substitution range. Then, the individual electronic manuscripts within the substitution range identified by these manuscripts are substituted by the new electronic manuscripts of the newly read-out manuscripts.

When an electronic document (referred also to as a saved document) saved in the manuscript/document storage section 110 is specified as the substitution object and then a paper manuscript before substitution (the old manuscript) and an paper manuscript after substitution (new manuscript) are read, an old electronic manuscript that agrees with the paper manuscript before substitution in the edit electronic document serving as the substitution object is found out in the saved document. Then, this old electronic manuscript is deleted. After that, the scan image (new electronic manuscript) of the paper manuscript after substitution (new manuscript) is added into that deletion position.

The reference position indicated by the key electronic manuscript for substitution processing can be any one of three consisting of the start position of substitution processing, the start position of substitution range, and the end position of substitution range. The meaning of the reference position is specified by the user through the operation panel, or alternatively set up in advance by the apparatus and presented to the user.

FIG. 5 shows a situation that under the condition that one key electronic manuscript indicating the reference position of substitution is to be provided, a key electronic manuscript defines the start position of substitution processing. The edit part identification section 140 determines that an old electronic manuscript in the edit electronic document determined as identical or best similar to the key electronic manuscript indicating the reference position indicates the start position of substitution processing. In the figure, the old electronic manuscript indicated as "agreeing with key" in the edit electronic document indicates the start position of substitution processing.

When the edit part identification section 140 determines the start position of substitution processing, for example, as shown in FIG. 5 (1), with starting at the start position toward the backside (in the direction of increasing page number), the document editing processing section 150 substitutes the one sheet or plural sheets of new electronic manuscripts that are received as the edit target by the electronic manuscript reception section 132 and that are arranged in the order of having been read (in ascending order). Alternatively, when the edit part identification section 140 determines the start position of substitution processing, for example, as shown in FIG. 5 (2), with starting at the start position toward the front side (in the direction of decreasing page number), the substitution processing section 152 of the document editing processing section 150 substitutes the one sheet or plural sheets of new electronic manuscripts that are received as the edit target by the electronic manuscript reception section 132 and that are arranged in the order opposite to the order of having been read (in descending order).

Figure 5A:
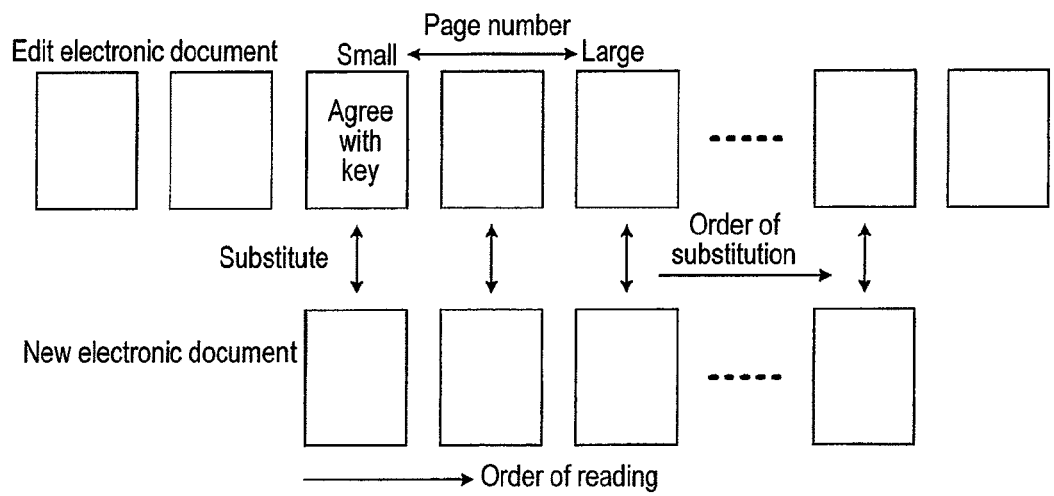
FIG. 5A is a diagram (part 2) describing an outline of manuscript substitution processing performed by the edit part identification section and by the substitution processing section of the document editing processing section.
Figure 5A:
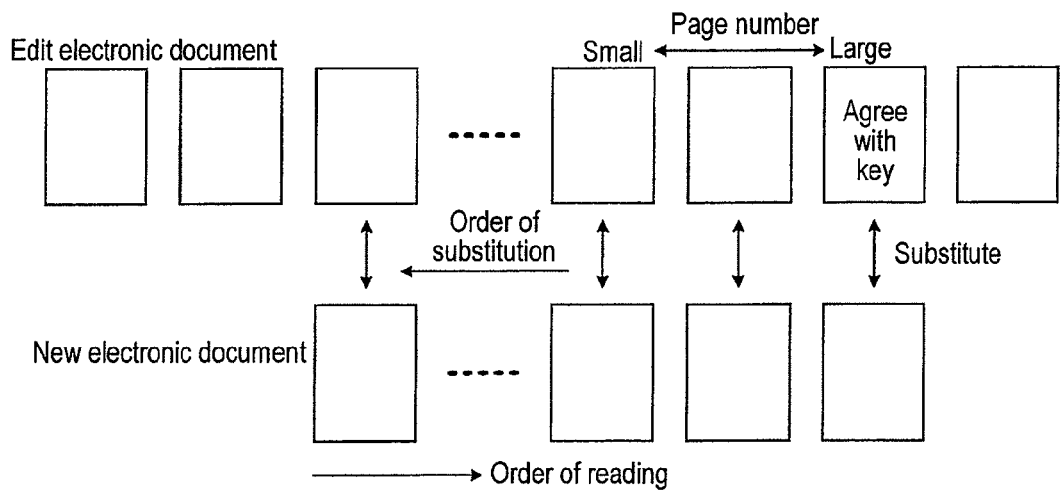

FIG. 5A (1) shows a situation that under the condition that two key electronic manuscripts indicating the reference positions of substitution are to be provided (i.e., two old manuscripts indicating the start position and the end position of substitution range are to be acquired), only one sheet is acquired and the key electronic manuscript defines the start position of substitution range. The edit part identification section 140 determines that an old electronic manuscript in the edit electronic document determined as identical or best similar to the key electronic manuscript indicating the reference position indicates the start position of substitution range. In practice, this situation is the same as the case that intrinsically one key electronic manuscript indicating the reference position of substitution is to be provided as shown in FIG. 5 (1).

In the figure, the old electronic manuscript indicated as "agreeing with key" in the edit electronic document indicates the start position of substitution range. When the edit part identification section 140 determines the start position of substitution range, with starting at the start position toward the backside (in the direction of increasing page number), the document editing processing section 150 substitutes the one sheet or plural sheets of new electronic manuscripts that are received as the edit target by the electronic manuscript reception section 132 and that are arranged in the order of having been read (in ascending order).

FIG. 5A (2) shows a situation that under the condition that two key electronic manuscripts indicating the reference positions of substitution are to be provided (i.e., two old manuscripts indicating the start position and the end position of substitution range are to be acquired), only one sheet is acquired and the key electronic manuscript defines the end position of substitution range. The edit part identification section 140 determines that an old electronic manuscript in the edit electronic document determined as identical or best similar to the key electronic manuscript indicating the reference position indicates the end position of substitution range. In practice, this situation is the same as the case that intrinsically one key electronic manuscript indicating the reference position of substitution is to be provided as shown in FIG. 5 (2).

In the figure, the old electronic manuscript indicated as "agreeing with key" in the edit electronic document indicates the end position of substitution range. When the edit part identification section 140 determines the end position, with starting at the end position toward the front side (in the direction of decreasing page number), the substitution processing section 152 of the document editing processing section 150 substitutes the one sheet or plural sheets of new electronic manuscripts that are received as the edit target by the electronic manuscript reception section 132 and that are arranged in the order opposite to the order of having been read (in descending order). In substitution, the old electronic manuscripts are deleted. Then, the new electronic manuscripts are inserted into that part.

In each case, in substitution, old electronic manuscripts are deleted and new electronic manuscripts are inserted into that part. Here, as for a substantive processing procedure, the edit part identification section 140 may count the number of sheets of new electronic manuscripts received as the edit target by the electronic manuscript reception section 132, then identify the substitution range relative to the start position or the end position based on the start position or the end position and the counted number of sheets, and then notify the information concerning the substitution range to the document editing processing section 150. In this way, the document editing processing section 150 may execute a procedure similarly to the case that two key electronic manuscripts indicating the reference positions of substitution are provided as described later.

Figure 5B:
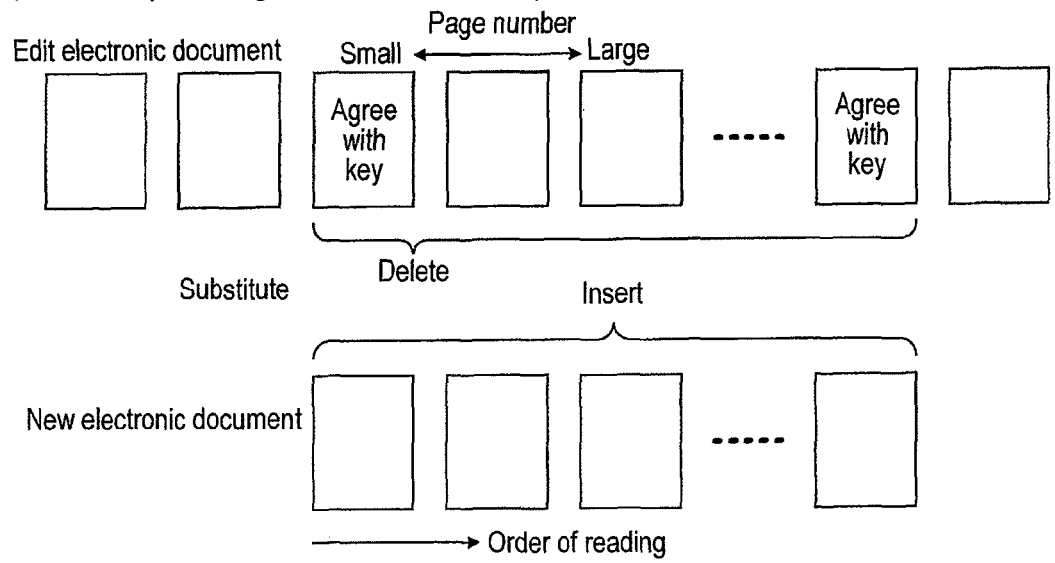
FIG. 5B is a diagram (part 3) describing an outline of manuscript substitution processing performed by the edit part identification section and by the substitution processing section of the document editing processing section.
Figure 5B:
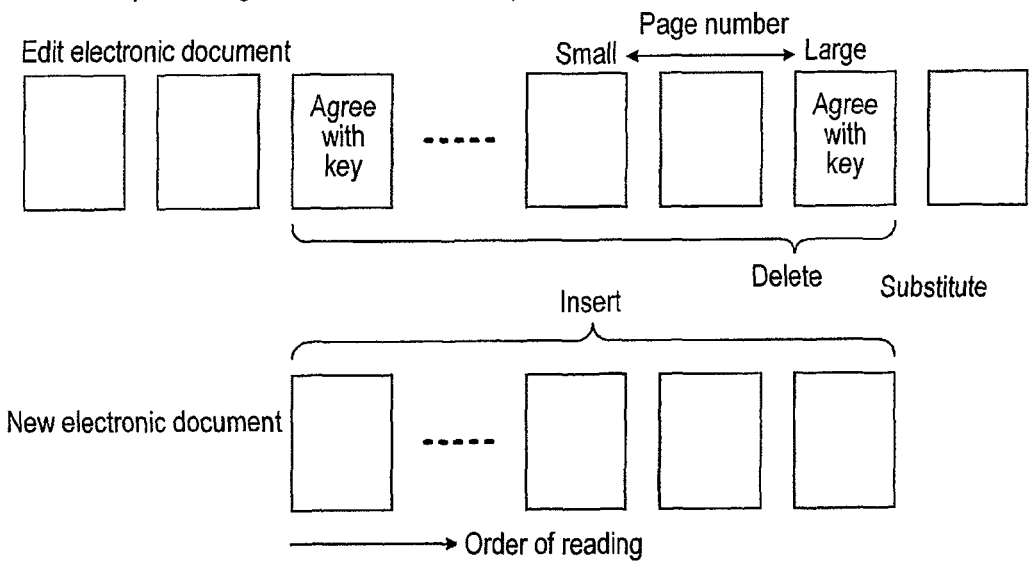

FIGS. 5B and 5C show a situation that under the condition that two key electronic manuscripts indicating the reference positions of substitution are to be provided (i.e., two old manuscripts indicating the start position and the end position of substitution range are to be acquired), two sheets of key electronic manuscripts are acquired normally and one of the two defines the start position of substitution range while the other defines the end position of substitution range. For example, among the two old electronic manuscripts in the edit electronic document determined as identical or best similar to the key electronic manuscripts indicating the reference positions, the edit part identification section 140 determines that one (e.g., the first sheet) of the two indicates the start position of substitution range and that the other one (e.g., the second sheet) indicates the end position of substitution range, then identify the substitution range as being from the start position to the end position, and then notifies the information concerning the substitution range to the document editing processing section 150.

In the figure, the two old electronic manuscripts indicated as "agreeing with key" in the edit electronic document indicate the start position and the end position of substitution range. Here, in relation with the description given later, it is premised that the page position of the start position is smaller than the page position of the end position. In a case that the page position of the start position is greater than the page position of the end position, in the description given later, the start position and the end position should be exchanged.

When the information concerning the substitution range is notified, the document editing processing section 150 deletes the old electronic manuscripts within the substitution range (from the substitution start position to the substitution end position) in the edit electronic document, and then inserts one sheet or plural sheets of new electronic manuscripts received as the edit target by the electronic manuscript reception section 132, into the substitution range (from the substitution start position to the substitution end position) in the edit electronic document in the order of having been read (in ascending order) or alternatively in the order opposite to the order of having been read (in descending order). Here, in the actual processing, it is sufficient that inconformity is not present in the arrangement positions of the electronic manuscripts after substitution in the electronic document obtained as the substitution processing result. That is, the order of processing may be reversed for the deletion and the insertion.

Here, when the start position of substitution range is adopted as the start point of substitution processing, as shown in FIG. 5B (1), with starting at the start position toward the backside (in the direction of increasing page number), the one sheet or plural sheets of new electronic manuscripts are inserted that are received as the edit target by the electronic manuscript reception section 132 and that are arranged in the order of having been read (in ascending order). Further, when the end position of substitution range is adopted as the start point of substitution processing, as shown in FIG. 5B (2), with starting at the end position toward the front side (in the direction of decreasing page number), the one sheet or plural sheets of new electronic manuscripts are inserted that are received as the edit target by the electronic manuscript reception section 132 and that are arranged in the order opposite to the order of having been read (in descending order). Such order of processing is specified by the user through the operation panel, or alternatively set up in advance by the apparatus and presented to the user.

Here, in the case that two key electronic manuscripts indicating the reference positions of substitution are provided, all old electronic manuscripts located from the start position to the end position of substitution range are deleted. Then, electronic manuscripts received as the edit target by the electronic manuscript reception section 132 are inserted into that part. Thus, as shown in FIG. 5B, the number of sheets of manuscripts in the substituted part is not necessarily equal to the original number of sheets of the old electronic manuscripts located from the substitution start position to the substitution end position. For example, as shown in FIG. 5C (1), the number of sheets of old electronic manuscripts is greater than the number of sheets of new electronic manuscripts in some cases. Alternatively, as shown in FIG. 5C (2) and (3), the number of sheets of old electronic manuscripts is smaller than the number of sheets of new electronic manuscripts in some cases. Here, FIG. 5C (3) shows a case that only the start position is specified and that the number of sheets of new electronic manuscripts is greater than the number of sheets of old electronic manuscripts located from the start position to the last page of the edit electronic document.

<Manuscript Substitution Function: Operating Procedure in Case that Plural Specification is Not Available>

Figure 6:
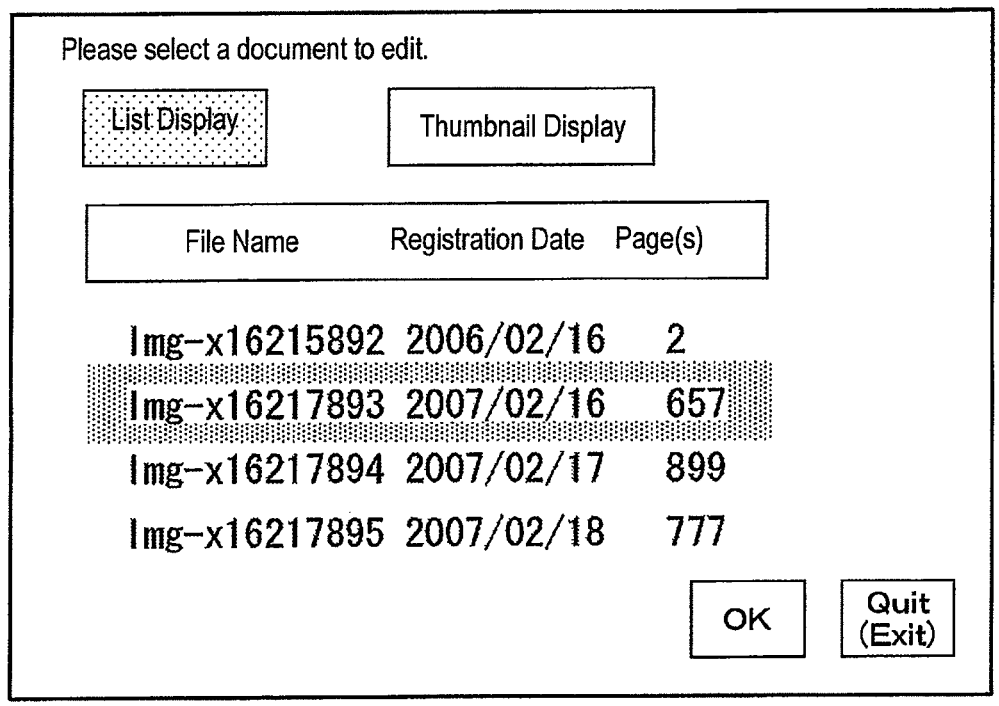
FIG. 6 is a diagram showing an example of an edit document selection screen G20_RP1 used in performing a manuscript substitution function.
Figure 6A:
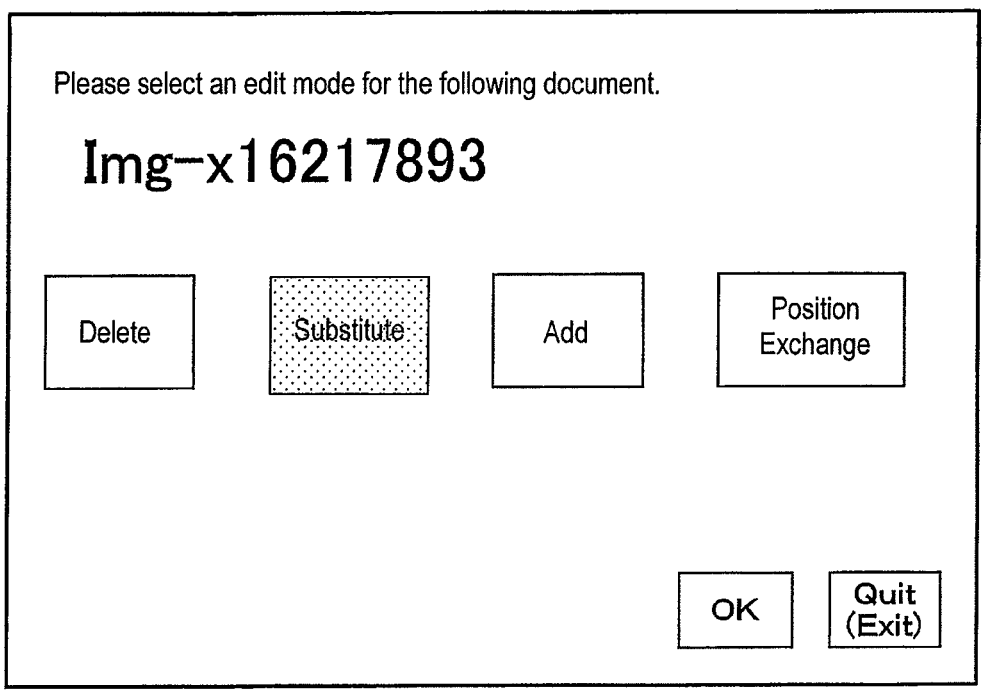
FIG. 6A is a diagram showing an example of an edit mode selection screen G30_RP1 used in performing the manuscript substitution function.
Figure 6B:
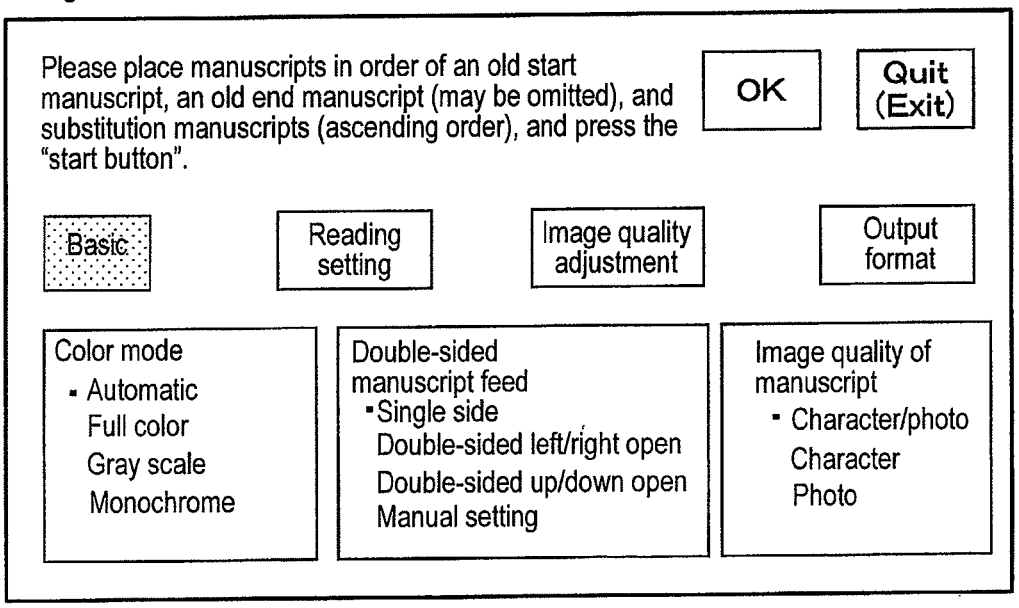
FIG. 6B is a diagram showing an example of a read condition selection screen G72_RP1 used in performing the manuscript substitution function.
Figure 6C:
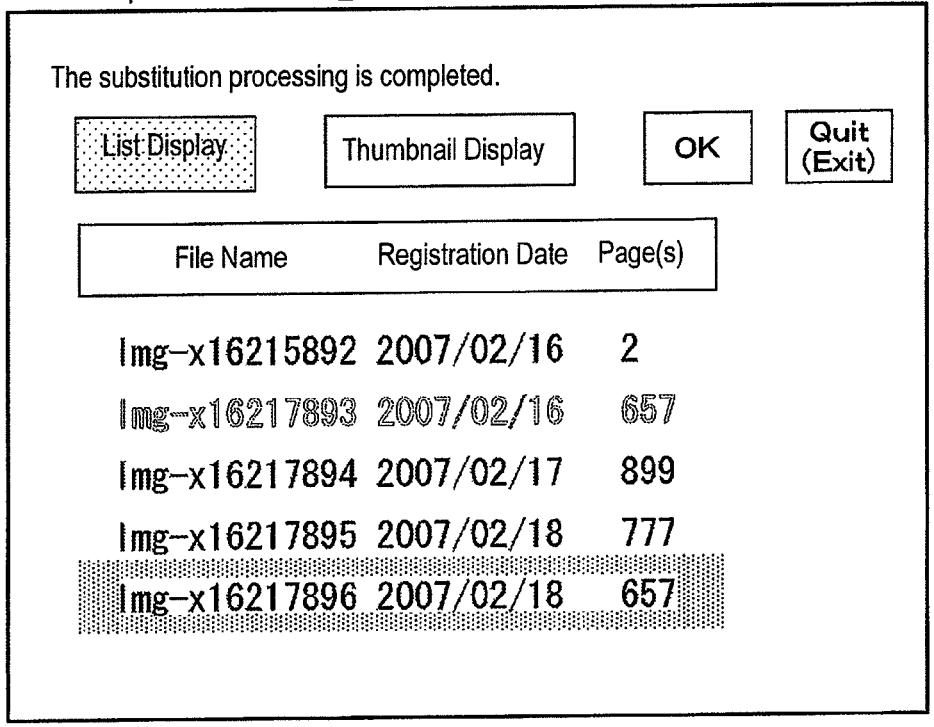
FIG. 6C is a diagram showing an example of an edit completion screen G92_RP1 used in performing the manuscript substitution function.

FIGS. 6 to 6C are diagrams describing the operating procedure and the processing procedure of executing a manuscript substitution function, and show examples of screens in a case that plural specification for substitution parts is not available.

At step S20, the main control section of the document management apparatus 2B presents the edit mode selection screen G30 to the user. Through the user interface (such as an operation panel) of the apparatus to be operated, the user issues instruction for displaying of stored documents in the user's own confidential box. Then, the edit document selection screen G20_RP1 shown in FIG. 6 is displayed. Buttons are prepared such that any of list displaying and thumbnail displaying can be selected as a mode of browsing display. In order that, between list displaying and thumbnail displaying, the user can easily recognize list displaying selected by the user and thumbnail displaying not selected, it is preferable that emphasized displaying is employed like highlighted (high luminance) displaying and displaying in another color. In the figure, the selected list displaying is shown in a state shaded with a halftone dot pattern.

On the illustrated edit document selection screen G20_RP1 for the document list, the file name, the registration date and time, and the total number of pages are displayed for each of four electronic documents. Here, when some other documents cannot be displayed on the same single display screen for document browsing display, a publicly known mechanism such as a screen switching function and a scrolling function may be employed so that all electronic documents serving as displaying objects may be displayed.

In the browsing display on the edit document selection screen G20_RP1, the user finds out the file name of a document in which a part or all of manuscripts are to be substituted. For example, "Img-x16217893" is selected and double-clicked. In this example, in order that, among the browsing-displayed documents, the user can easily recognize a document selected by the user and not-selected other documents, it is preferable that emphasized displaying is employed like highlighted (high luminance) displaying and displaying in another color. In the figure, the selected document is shown in a state shaded with a halftone dot pattern. Here, it is assumed that the selected document has a total number of pages of 657 and hence is a document having an extremely large number of pages. Thus, it is difficult for the user to find out the substitution part immediately.

Then, at step S30, the main control section of the document management apparatus 2B presents to the user the edit mode selection screen G30_RP1 shown in FIG. 6A. On the edit mode selection screen G30_RP1, the file name "Img-x16217893" of the edit electronic document selected at step S20 and four mode selection buttons for specifying the contents of editing processing to be performed on the edit electronic document are displayed. In this example, the user double-clicks the substitution button on the edit mode selection screen G30_RP1 so as to select the "substitution mode". In this example, in order that, among the four kinds of mode selection buttons, the user can easily recognize the mode selection button (substitution button) selected by the user and not-selected other mode selection buttons, it is preferable that emphasized displaying is employed like highlighted (high luminance) displaying and displaying in another color. In the figure, the selected substitution button is shaded with a halftone dot pattern.

Then, at step S72, the main control section of the document management apparatus 2B presents to the user the read condition selection screen G72_RP1 suitable for a substitution mode as shown in FIG. 6B. In this display example, it is premised that the electronic manuscript generating section 120 has an auto document feeder ADF. Then, the presented "procedure of reading manuscripts" is the procedure of reading: a key manuscript that defines the start position of substitution range serving as the reference of substitution processing in the edit electronic document (the old start manuscript); a key manuscript that defines the end position of substitution range (the old end manuscript); and new manuscripts (substitution manuscripts) necessary in substitution processing. Here, as for the key manuscript (the old end manuscript) for determining the end position of substitution range, its reading may be skipped as presented as "may be omitted". As for the substitution manuscripts, it is presented that reading is to be performed in order of pages after substitution.

In accordance with the "procedure of reading manuscripts" presented on the read condition selection screen G72_RP1, the user places onto the auto document feeder ADF the old manuscript at the start position of substitution range (the old start manuscript) and the old manuscript at the end position of substitution range (the old end manuscript) among the electronic manuscripts that constitute the edit electronic document, as well as one sheet or plural sheets of new manuscripts (substitution manuscripts) for substituting that part. Then, the user presses the start button so as to start reading. When read of the old manuscripts and the substitution manuscripts is completed, the corresponding electronic manuscripts are saved into the manuscript/document storage section 110.

At that time, the number of sheets of old electronic manuscripts located from the start position to the end position of substitution range may be equal to the number of sheets of the substitution manuscripts that substitutes that part. Alternatively, these numbers of sheets may differ from each other by any number. Further, as displayed so, placing of the old manuscript at the end position of substitution range (the old end manuscript) may be omitted.

For example, when the part from page 101 to page 200 in the edit electronic document is to be substituted by manuscripts of the same number of sheets, old manuscripts corresponding to the old electronic manuscript at page 101 and the old electronic manuscript at page 200 in the edit electronic document as well as substitution manuscripts of 100 sheets are placed. Here, in the description given above, the concept of "page position" such as page 101 and page 200 is used. However, the page positions, in the edit electronic document, of the old manuscript at the start position of substitution range (the old start manuscript) and the old manuscript at the end position of substitution range (the old end manuscript) are automatically identified by the edit control section 130. Thus, it is sufficient that the user merely recognizes which manuscripts are located at the start position and the end position of the desired substitution processing. That is, the user oneself need not recognize the page positions.

Further, when merely one sheet of old electronic manuscript is to be substituted by one sheet or plural sheets of substitution manuscripts, the old end manuscript is identical to the old start manuscript. Thus, placing of the old manuscript at the end position (may be regarded as the start position) of substitution range may be omitted. Obviously, two copies of the old manuscript may be prepared by photocopying, and then placed as the old start manuscript and the old end manuscript.

When read of the old manuscript and the substitution manuscript and save of the corresponding electronic manuscripts are completed, based on the individual electronic manuscripts of the old manuscripts and the substitution manuscripts having been read, the edit control section 130 deletes the old electronic manuscripts within the substitution range from the start position to the end position in the edit electronic document, then inserts the electronic manuscripts of the substitution manuscripts into that part, thereby generates a new electronic document having been substitution-edited, and then saves the obtained document into the manuscript/document storage section 110.

When the manuscript substitution processing and the save of the new electronic document performed by the edit control section 130 are completed, the main control section of the document management apparatus 2B presents to the user the edit completion screen G92_RP1 shown in FIG. 6C. This display example shows a case that the old file of the edit electronic document is to be deleted while the new electronic document having been substitution-edited is to be saved by another file name. Thus, the file name, the registration date and time, and the number of pages (Img-x16217893 2007/02/16 657) of the edit electronic document are deleted (indicated as outline characters in the figure), while the file name, the registration date and time, and the number of pages (Img-x16217896 2007/02/18 657) of the newly generated new electronic document having been substitution-edited are displayed. In order that the user can easily recognize the newly generated new electronic document having been substitution-edited and the other documents among the browsing-displayed files, the new electronic document is shown in a state shaded with a halftone dot pattern.

Here, the old file of the edit electronic document may be maintained, while the new electronic document having been substitution-edited may be saved by another file name. Alternatively, the old file of the edit electronic document may be deleted, and the new electronic document having been substitution-edited may be saved by the same file name as the old file (a so-called file update mode).

<Manuscript Substitution Function: Operating Procedure in Case that Plural Specification is Available>

Figure 6D:
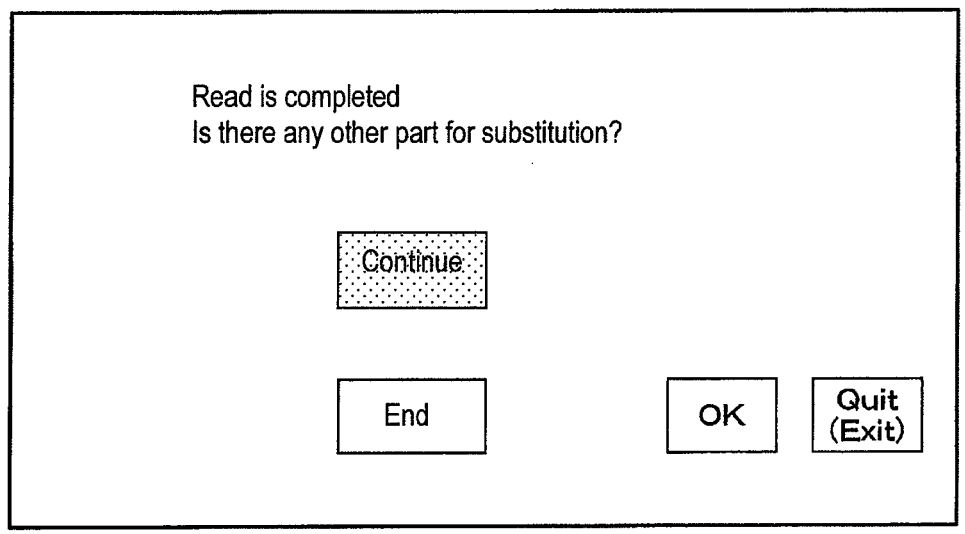
FIG. 6D is a diagram showing an example of repetition confirmation screens G82_RP1 and G82_RP2 used in performing the manuscript substitution function.
Figure 6D:
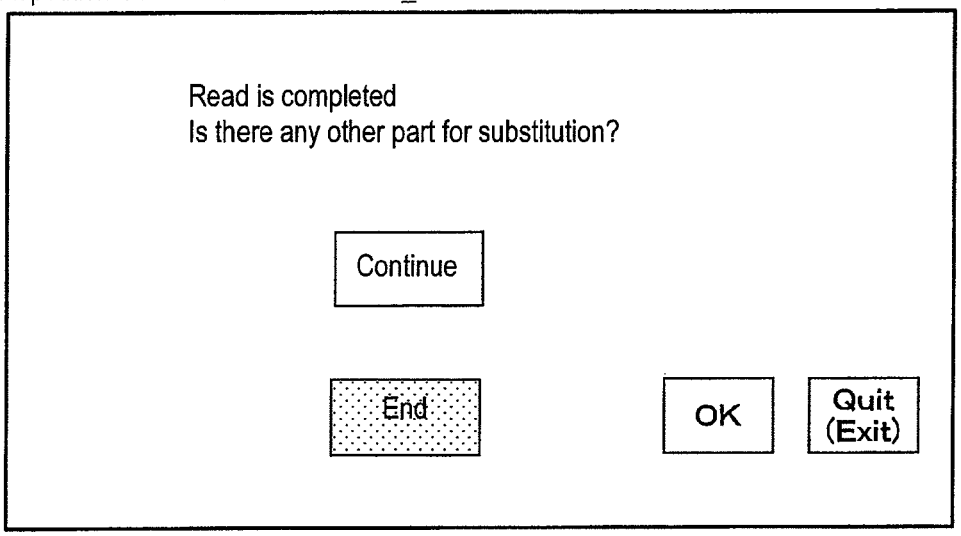

FIGS. 6D and 6E are diagrams describing the operating procedure and the processing procedure of executing a manuscript substitution function, and show examples of screens in a case that plural specification for substitution parts is available. The following description is given for a case that manuscript substitution is to be performed in two locations. Here, screens similar to those shown in FIGS. 6 to 6C are also used.

In a case that plural specification for substitution parts is available, when read of the old manuscripts and the substitution manuscripts and save of the corresponding electronic manuscripts are completed for the first part of substitution object, the repetition confirmation screen G82_RP1 shown in FIG. 6D (1) is presented to the user. In this example, substitution is to be performed also for another part. Thus, the user double-clicks the continuation button on the repetition confirmation screen G82_RP1 so as to start work for the second part. In order that, between the continuation button and the end button, the user can easily recognize the continuation button selected by the user and the end button not selected, it is preferable that emphasized displaying is employed like highlighted (high luminance) displaying and displaying in another color. In the figure, the selected continuation button is shaded with a halftone dot pattern.

When the processing operation information reception section 136 receives the work instruction for the second part, the main control section of the document management apparatus 2B returns to step S72 and then presents to the user the read condition selection screen G72_RP1 as shown in FIG. 6B given above. For example, in a case that the second part is from page 401 to page 500 in the edit electronic document and that the part is to be substituted by new electronic manuscripts of a different number instead of the same number, old manuscripts corresponding to the old electronic manuscript at page 401 and the old electronic manuscript at page 500 in the edit electronic document as well as, for example, 102 sheets of substitution manuscripts are placed. Here, in the description given above, the concept of "page position" such as page 401 and page 500 is used. However, as described above, the user oneself need not recognize the page positions.

When read of the old manuscripts and the substitution manuscripts and save of the corresponding electronic manuscripts are completed for the second part, the repetition confirmation screen G82_RP2 shown in FIG. 6D (2) is presented to the user. In this example, the user double-clicks the end button on the repetition confirmation screen G82_RP2 so as to start the automatic editing processing performed by the edit control section 130 based on the individual electronic manuscripts of the key manuscripts for the two parts and the new manuscripts necessary in the substitution processing which have been read and saved at step S74. In order that, between the continuation button and the end button, the user can easily recognize the end button selected by the user and the continuation button not selected, it is preferable that emphasized displaying is employed like highlighted (high luminance) displaying and displaying in another color. In the figure, the selected end button is shaded with a halftone dot pattern.

For each of the first and the second parts, based on the individual electronic manuscripts of the old manuscripts and the substitution manuscripts having been read, the edit control section 130 deletes the old electronic manuscripts within the substitution range from the start position to the end position in the edit electronic document, then inserts the electronic manuscripts of the substitution manuscripts into that part, thereby generates a new electronic document having been substitution-edited, and then saves the obtained document into the manuscript/document storage section 110.

When the manuscript substitution processing and the save of the new electronic document performed by the edit control section 130 are completed for the first and the second parts, the main control section of the document management apparatus 2B presents to the user the edit completion screen G92_RP2 shown in FIG. 6E. This display example shows a case that the old file of the edit electronic document is to be deleted while the new electronic document having been substitution-edited is to be saved by another file name. Thus, the file name, the registration date and time, and the number of pages (Img-x16217893 2007/02/16 657) of the edit electronic document are deleted (indicated as outline characters in the figure), while the file name, the registration date and time, and the number of pages (Img-x16217896 2007/02/18 659) of the newly generated new electronic document having been substitution-edited are displayed. In order that the user can easily recognize the newly generated new electronic document having been substitution-edited and the other documents among the browsing-displayed files, the new electronic document is shown in a state shaded with a halftone dot pattern.

Here, in this example, in the first part, the number of sheets in the substitution range and the number of sheets of substitution manuscripts are the same 100 sheets. In contrast, in the second part, the number of sheets (100 sheets) in the substitution range and the number of sheets (102 sheets) of substitution manuscripts are different from each other. Thus, the number of pages in the new electronic document is greater than the number of pages in the edit electronic document by "2".

Here, as described above, the old file of the edit electronic document may be maintained, while the new electronic document having been substitution-edited may be saved by another file name. Alternatively, the old file of the edit electronic document may be deleted, and the new electronic document having been substitution-edited may be saved by the same file name as the old file (a so-called file update mode).

<Manuscript Substitution Function: Automatic Processing Procedure>

Figure 7:
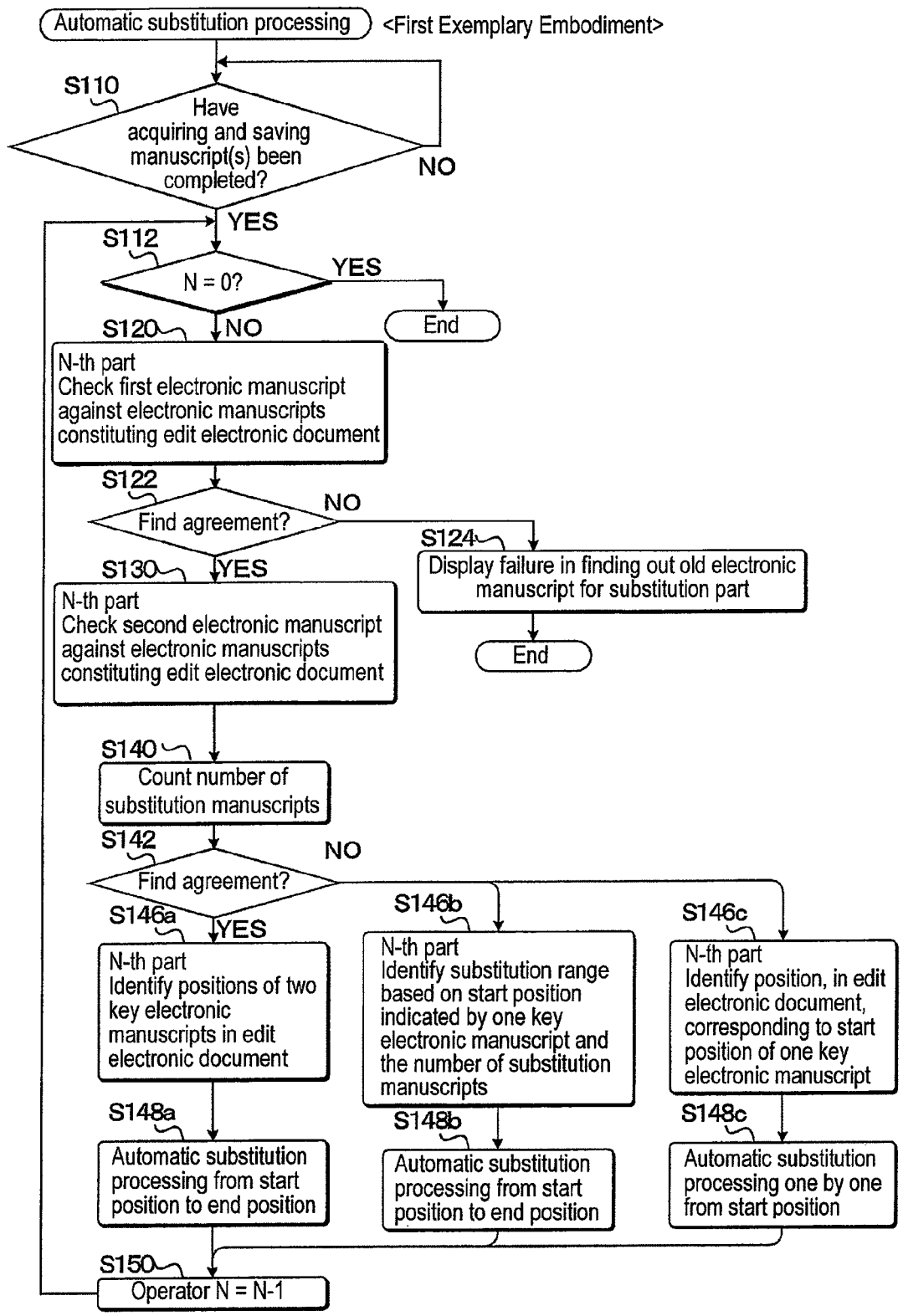
FIG. 7 is a flow chart showing an example of a procedure of automatic substitution processing in the configuration of the first exemplary embodiment.

FIG. 7 is a flow chart showing an example of a procedure of automatic substitution processing in the configuration of the first exemplary embodiment, which is performed based on the manuscript substitution processing in the edit control section 130 when the processing operation information reception section 136 is notified that the user has selected the manuscript substitution mode. In this example, plural specification for substitution parts is available. Further, in the image check performed by the manuscript comparison section 144, the thumbnail image of the key electronic manuscript is compared with the thumbnail image of each old electronic manuscript that constitutes the edit electronic document. This situation is similar also in other flow charts described later.

When the processing operation information reception section 136 is notified that acquisition and save of a key manuscript and a new electronic manuscript have been completed for all edit parts (substitution parts, in this example) (S110—YES), the edit control section 130 starts substitution processing for each substitution part with monitoring the operator N that indicates the number of substitution parts (S112). For example, when the operator N is equal to "0", it is indicated that the substitution processing has been completed for all substitution parts. Thus, the processing is terminated (S112—YES). When the operator N is not equal to "0", the substitution processing is started for the N-th part (S112—NO).

When the substitution processing is started for the N-th part, first, in the edit part identification section 140 of the edit control section 130, the manuscript comparison section 144 compares (checks) the thumbnail image of the first sheet (basically expected as the old start manuscript) acquired at steps S70 to S74 or the like with (against) the thumbnail images of the electronic manuscripts constituting the edit electronic document received at steps S20 and S22 (S120). Then, based on the comparison result of the manuscript comparison section 144, the edit reference manuscript extraction section 146 finds out in the edit electronic document an electronic manuscript that agrees with the old start manuscript (S122). When the edit reference manuscript extraction section 146 fails to find out an electronic manuscript that agrees with the old start manuscript, the edit control section 130 displays the failure in finding out an electronic manuscript of the substitution part (i.e., the old start manuscript), and then terminates the processing (S122—NO, S124).

On the other hand, in the edit part identification section 140, when the edit reference manuscript extraction section 146 has found out an electronic manuscript (key electronic manuscript) that agrees with the old start manuscript, the manuscript comparison section 144 compares (checks) the thumbnail image of the second sheet (the old end manuscript or the first sheet of substitution manuscripts) acquired at steps S70 to S74 or the like with (against) the thumbnail image of each electronic manuscript that constitutes the edit electronic document received at step S20 and S22 (S130). At that time, the document editing processing section 150 counts the number of sheets of substitution electronic manuscripts (S140).

At that time, in order that the substitution range should be identified in a case that the second image acquired at steps S70 to S74 is not the old end manuscript before the substitution but is the first sheet of substitution manuscript, the document editing processing section 150 counts the number of sheets of substitution electronic manuscripts (S140).

Then, when the second sheet is the old end manuscript (key electronic manuscript), the edit reference manuscript extraction section 146 finds out in the edit electronic document a manuscript that agrees with the old end manuscript. Then, based on the comparison result of the manuscript comparison section 144, the edit reference manuscript extraction section 146 finds out in the edit electronic document an electronic manuscript that agrees with the old end manuscript (S142).

The edit part identification section 140 identifies (i) a page position of the electronic manuscript, in the edit electronic document, that agrees with the old start manuscript found out by the edit reference manuscript extraction section 146 and (ii) a page position of the electronic manuscript, in the edit electronic document, that agrees with the old end electronic manuscript found out by the edit reference manuscript extraction section 146, so that the edit part identification section 140 identifies the substitution range. Then, the edit part identification section 140 notifies the information concerning the substitution range (e.g., the substitution start page and the substitution end page) to the document editing processing section 150 (S146a).

When the substitution electronic manuscripts are present, as shown in FIG. 5B, based on the information concerning the substitution range notified from the edit part identification section 140, the substitution processing section 152 substitutes the part of the specified edit electronic document from the substitution start page to the substitution end page by using one sheet or plural sheets of substitution electronic manuscripts (S148a).

On the other hand, when the old end manuscript is absent and the second sheet is the first sheet of substitution electronic manuscript, no manuscript in the edit electronic document agrees with the old end manuscript. Thus, in the edit part identification section 140, the edit reference manuscript extraction section 146 fails to find out an electronic manuscript that agrees with the old end manuscript (S142a—NO).

In this case, in a first technique, the edit part identification section 140 identifies the substitution range based on the page position, in the edit electronic document, of the electronic manuscript that agrees with the old start manuscript and is found out by the edit reference manuscript extraction section 146 and the number of sheets of substitution electronic manuscripts. Then, the edit part identification section 140 notifies the information concerning the substitution range (e.g., the substitution start page and the substitution end page) to the document editing processing section 150 (S146b). Specifically, it is determined that the position advancing from the substitution start page (toward the backside) by the number of sheets of substitution electronic manuscripts is the substitution end page. As shown in FIG. 5B, based on the information concerning the substitution range notified from the edit part identification section 140, the substitution processing section 152 substitutes the part of the specified edit electronic document from the substitution start page to the substitution end page by using the substitution electronic manuscripts (S148b).

Alternatively, in a second technique, the edit part identification section 140, may notify only the page position, in the edit electronic document, of the electronic manuscript that agrees with the old start manuscript found out by the edit reference manuscript extraction section 146 to the document editing processing section 150 (S146c). In this case, as shown in FIGS. 5 and 5A, with adopting as the start point of substitution processing the substitution start page notified from the edit part identification section 140, the substitution processing section 152 performs substitution using the substitution electronic manuscripts sheet by sheet (S148c).

When the processing for the N-th part performed by the document editing processing section 150 is completed, the edit control section 130 decrements the operator N by "1" (S150), and then returns to step S112 so as to repeat processing similar to the above-mentioned one.

As a result of the above-mentioned processing, when substitution processing is to be performed with adopting as the edit electronic document an electronic document in which the substitution part is difficult to be found out immediately like in a document including a plurality of pages having similar formats and a document having an extremely large number of pages, the necessity is avoided that the user oneself need identify the substitution part in the edit electronic document. That is, the document editing processing section 150 (specifically, the edit part identification section 140) automatically identifies the substitution part by means of image check with a searching key electronic manuscript specified by the user. Then, the document editing processing section 150 performs automatic substitution processing for the identified substitution part.

<Manuscript Addition Function>

Figure 8:
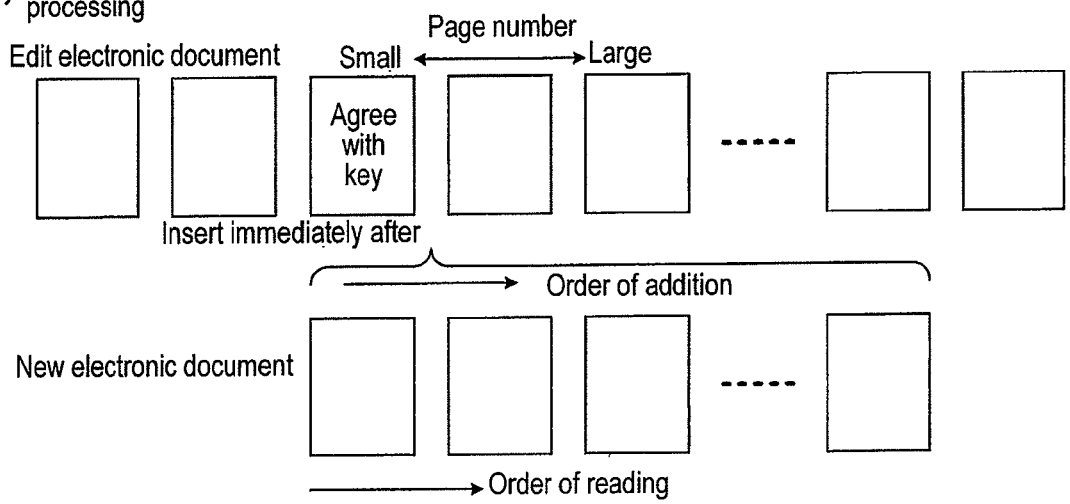
FIG. 8 is a diagram (part 1) describing an outline of manuscript addition processing performed by the edit part identification section and by an addition processing section of the document editing processing section.
Figure 8:
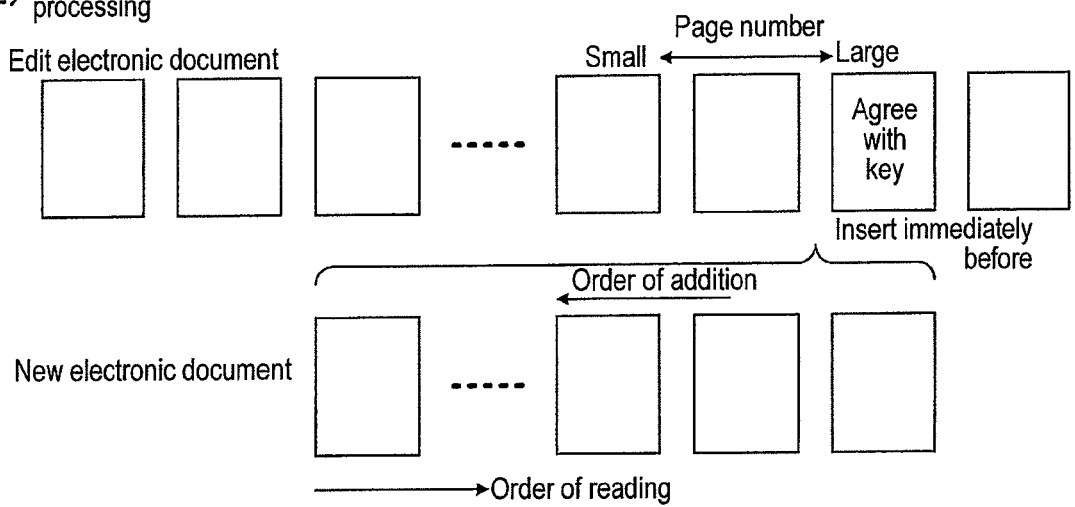
Figure 8A:
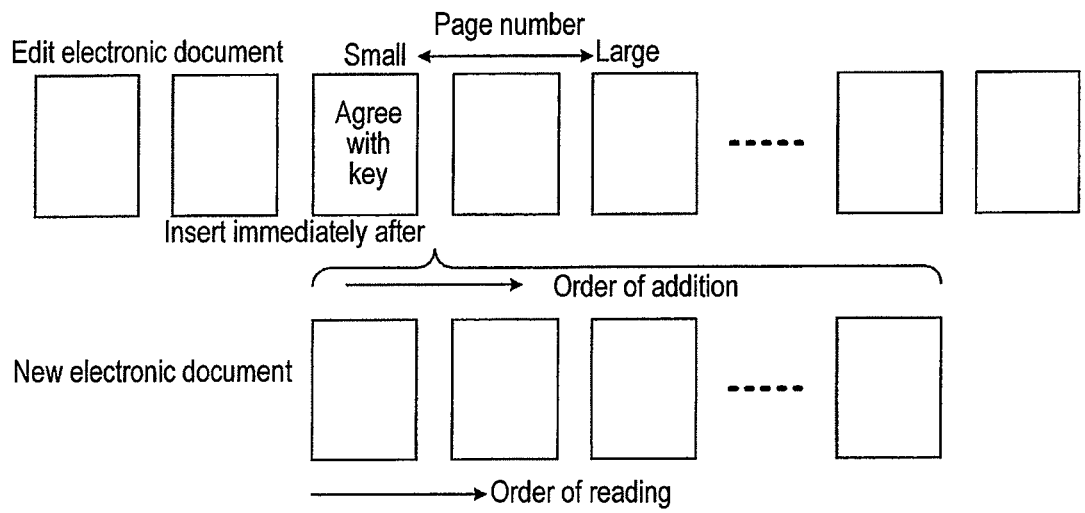
FIG. 8A is a diagram (part 2) describing an outline of manuscript addition processing performed by the edit part identification section and by the addition processing section of the document editing processing section.
Figure 8A:
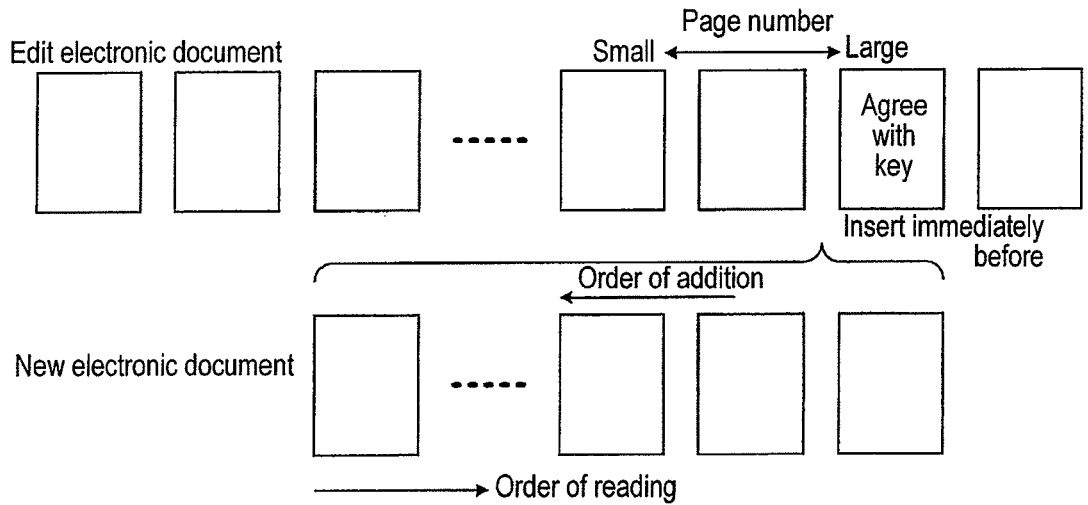

FIGS. 8 and 8A are diagrams describing the outline of manuscript addition processing performed by the edit part identification section 140 and by the addition processing section 154 of the document editing processing section 150. The manuscript addition function indicates a document editing function of inserting another electronic manuscript into an edit electronic document at predetermined position. This function is started when the user selects a manuscript addition mode on the operation panel or the like. In particular, this exemplary embodiment is characterized in that an electronic manuscript generated by the electronic manuscript generating section 120 is inserted.

Specifically, in this manuscript addition function, in a manuscript addition mode, for an edit electronic document, based on one sheet of electronic manuscript that is generated by the electronic manuscript generating section 120 and then received as a manuscript defining the reference position of editing processing range by the electronic manuscript reception section 132, the edit part identification section 140 identifies a position (the addition start position) where addition (insertion) is to be performed. Then, one sheet or plural sheets of new electronic manuscripts that are generated by the electronic manuscript generating section 120 and then received as the edit target by the electronic manuscript reception section 132 are inserted at a position before the identified addition start position (toward the front side) or at a position after the start position (toward the backside).

For example, an addition object is specified from among the saved electronic documents. Then, a paper document (paper document at the position of addition) indicating the position where addition is to be performed in the edit electronic document and a paper document (may be including a single page or a plurality of pages) to be added at the position are read by successive scan (stacked and scanned by the auto document feeder ADF), so that an electronic manuscript that agrees with the electronic manuscript at the start old position obtained by scanning of the first sheet is found out in the edit electronic document. Then, the electronic manuscripts of the addition manuscripts obtained by scanning at and after the second sheet are inserted immediately after (or immediately before) the electronic manuscript.

The reference position indicated by the key electronic manuscript for addition processing can be any one of three consisting of the start position of addition processing, the start position of addition range, and the end position of addition range. In each case, in addition processing, new electronic manuscripts are inserted without deleting the old electronic manuscripts. The meaning of the reference position is specified by the user through the operation panel, or alternatively set up in advance by the apparatus and presented to the user.

FIG. 8 shows a situation that under the condition that one key electronic manuscript indicating the reference position of addition is provided, a key electronic manuscript defines the start position of addition processing. The edit part identification section 140 determines that an old electronic manuscript in the edit electronic document determined as identical or best similar to the key electronic manuscript indicating the reference position indicates the start position of addition processing. In the figure, the old electronic manuscript indicated as "agreeing with key" in the edit electronic document indicates the start position of addition processing.

When the edit part identification section 140 determines the start position of addition processing, for example, as shown in FIG. 8 (1), with starting at a position immediately after the old electronic manuscript indicated as "agreeing with key" toward the backside (in the direction of increasing page number), the document editing processing section 150 inserts the one sheet or plural sheets of new electronic manuscripts that are received as the edit target by the electronic manuscript reception section 132 and that are arranged in the order of having been read (in ascending order). Alternatively, When the edit part identification section 140 determines the start position of addition processing, as shown in FIG. 8 (2), with starting at a position immediately before the old electronic manuscript indicated as "agreeing with key" toward the front side (in the direction of decreasing page number), the addition processing section 152 of the document editing processing section 150 inserts the one sheet or plural sheets of new electronic manuscripts that are received as the edit target by the electronic manuscript reception section 132 and that are arranged in the order opposite to the order of having been read (in descending order).

FIG. 8A (1) shows a case that under the condition that one key electronic manuscript indicating the reference position of addition is provided, the key electronic manuscript defines the start position of addition range. The edit part identification section 140 determines that an old electronic manuscript in the edit electronic document determined as identical or best similar to the key electronic manuscript indicating the reference position indicates the start position of addition range. In practice, this situation is the same as the case that the start position of addition processing is define as shown in FIG. 8 (1).

In the figure, the old electronic manuscript indicated as "agreeing with key" in the edit electronic document indicates the start position of addition range. When the edit part identification section 140 determines the start position of addition range, with starting at a position immediately after the old electronic manuscript indicated as "agreeing with key" toward the backside (in the direction of increasing page number), the document editing processing section 150 inserts the one sheet or plural sheets of new electronic manuscripts that are received as the edit target by the electronic manuscript reception section 132 and that are arranged in the order of having been read (in ascending order).

FIG. 8A (2) shows a case that under the condition that one key electronic manuscript indicating the reference position of addition is provided, the key electronic manuscript defines the end position of addition range. The edit part identification section 140 determines that an old electronic manuscript in the edit electronic document determined as identical or best similar to the key electronic manuscript indicating the reference position indicates the end position of addition range. In practice, this situation is the same as the case that the start position of addition processing is define as shown in FIG. 8 (2).

In the figure, the old electronic manuscript indicated as "agreeing with key" in the edit electronic document indicates the end position of addition range. When the edit part identification section 140 determines the end position, with starting at a position immediately before the old electronic manuscript indicated as "agreeing with key" toward the front side (in the direction of decreasing page number), the addition processing section 154 of the document editing processing section 150 inserts the one sheet or plural sheets of new electronic manuscripts that are received as the edit target by the electronic manuscript reception section 132 and that are arranged in the order opposite to the order of having been read (in descending order).

Substitution is not performed on the electronic manuscripts (electronic manuscripts at the start position and the end position) identical to the two key electronic manuscripts that define the edit part. However, all electronic manuscripts located from a position immediately after the start position to a position immediately before the end position are substituted. Thus, in practice, in this manuscript addition mode, editing processing similar to the manuscript substitution processing is performed. In this case, similarly to the manuscript substitution mode, the number of sheets of manuscripts in the added part is not necessarily equal to the number of sheets of the original electronic manuscripts located from a position immediately after the addition start position to a position immediately before the addition end position. That is, the former may be smaller or greater than the latter, depending on the case.

<Manuscript Addition Function: Operating Procedure in Case that Plural Specification is Available>

Figure 9A:
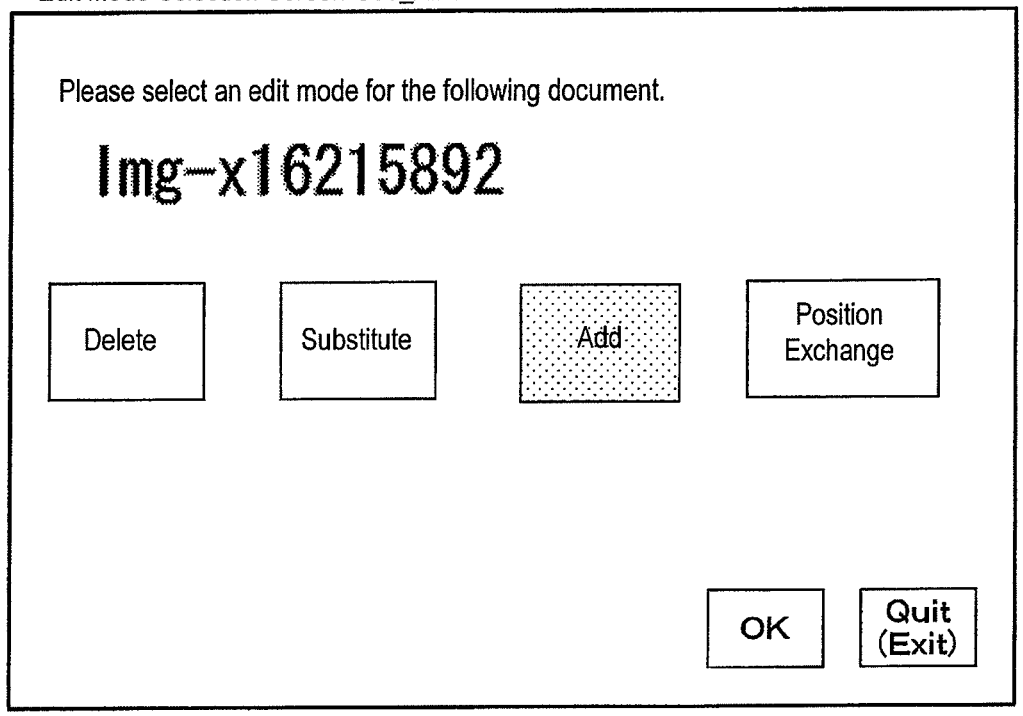
FIG. 9A is a diagram showing an example of an edit mode selection screen G30_AD1 used in performing the manuscript addition function.
Figure 9C:
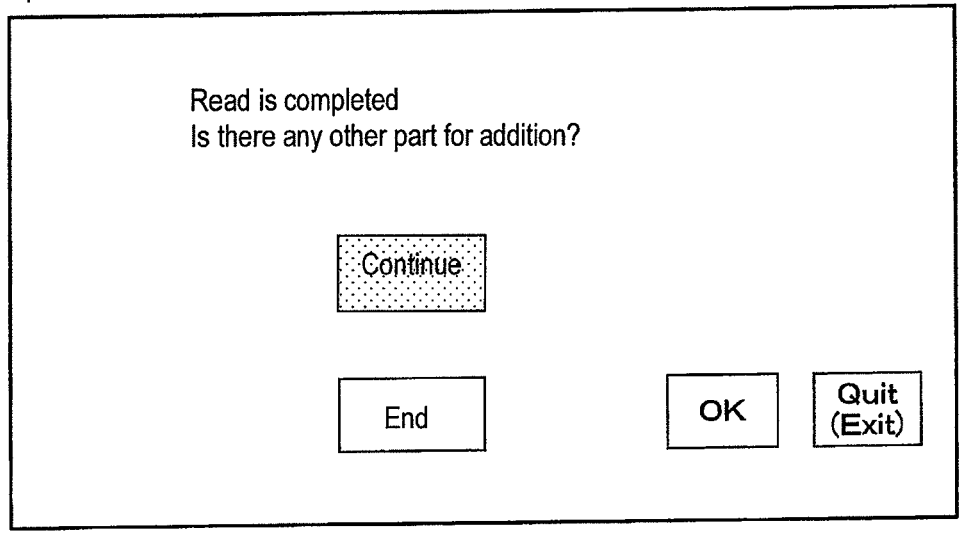
FIG. 9C is a diagram showing an example of repetition confirmation screens G82_AD1 and G82_AD2 used in performing the manuscript addition function.
Figure 9C:
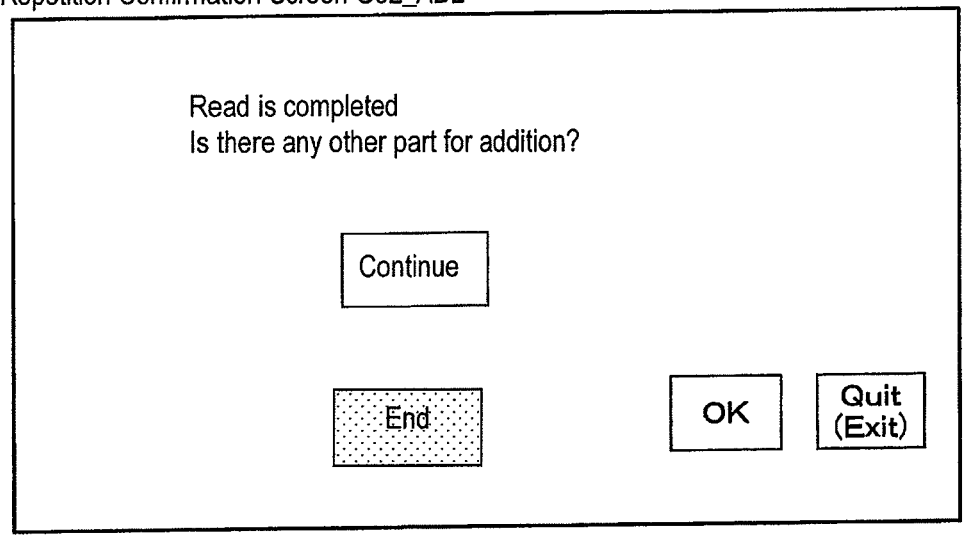
Figure 9D:
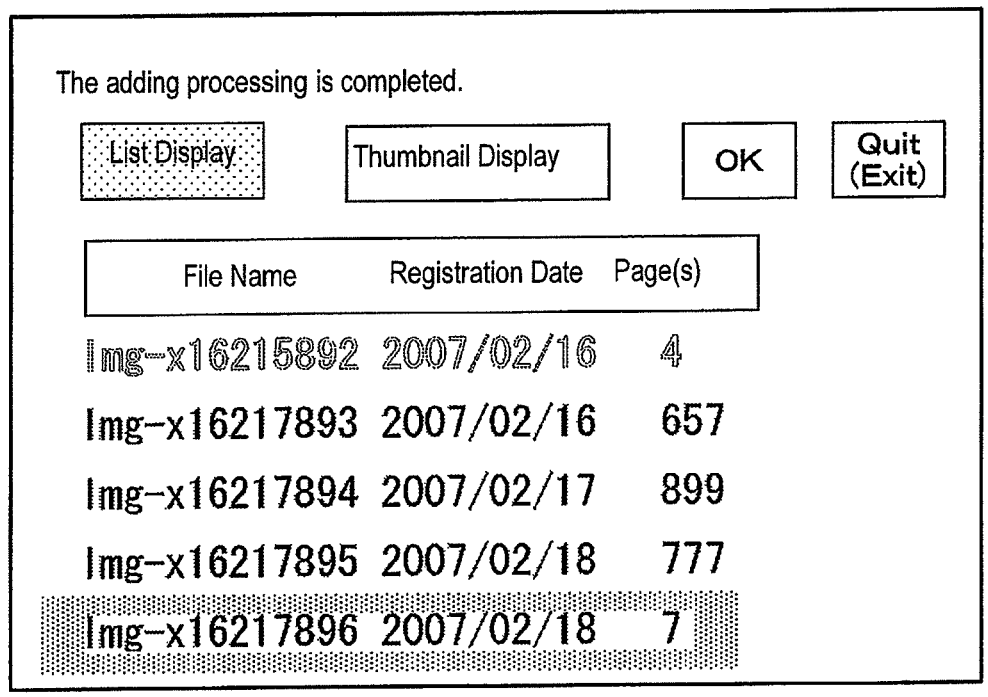
FIG. 9D is a diagram showing an example of an edit completion screen G92_AD2 used in performing the manuscript addition function.

FIGS. 9 to 9D are diagrams describing the operating procedure and the processing procedure of executing a manuscript addition function, and show examples of screens in a case that plural specification for addition parts is available.

At step S20, the main control section of the document management apparatus 2B presents the edit mode selection screen G30 to the user. Through the user interface (such as an operation panel) of the apparatus to be operated, the user issues instruction for displaying of stored documents in the user's own confidential box. Then, the edit document selection screen G20_AD1 shown in FIG. 9 is displayed.

On the illustrated edit document selection screen G20_AD1 for the document list, the file name, the registration date and time, and the total number of pages are displayed for each of four electronic documents. In the browsing display on the edit document selection screen G20_AD1, the user finds out the file name of a document in which new manuscripts are to be added. For example, the user selects (in emphasized displaying) and double-clicks the "Img-x16215892". Here, the total number of pages in the selected document is 4 pages. Thus, this document does not have an extremely large number of pages. However, the individual pages have similar formats to each other, and further have similar description contents. Thus, it is difficult for the user to recognize their mutual difference immediately.

Then, at step S30, the main control section of the document management apparatus 2B presents to the user the edit mode selection screen G30_AD1 shown in FIG. 9A. On the edit mode selection screen G30_AD1, the file name "Img-x16215892" of the edit electronic document selected at step S20 and four mode selection buttons for specifying the contents of editing processing to be performed on the edit electronic document are displayed. In this example, the user double-clicks the addition button (in emphasized displaying) on the edit mode selection screen G30_AD1 so as to select the "addition mode".

Then, at step S72, the main control section of the document management apparatus 2B presents to the user the read condition selection screen G72_AD1 suitable for an addition mode as shown in FIG. 9B. In this display example, it is premised that the electronic manuscript generating section 120 has an auto document feeder ADF. The presented "procedure of reading manuscripts" is the procedure of reading a key manuscript that defines the start position serving as the reference of addition processing (the old start manuscript: a manuscript located immediate before the addition part) in the edit electronic document and new manuscripts (addition manuscripts) necessary in the addition processing. As for the addition manuscripts, it is presented that reading is to be performed in order of pages after addition.

In accordance with the "procedure of reading manuscripts" presented on the read condition selection screen G72_AD1, from among the electronic manuscripts that constitute the edit electronic document, the user places onto the auto document feeder ADF the old manuscript at the start position of addition range (the old start manuscript) and one sheet or plural sheets of new manuscripts (addition manuscripts) to be added immediately after that. Then, the user presses the start button so as to start reading. When read of the old manuscript and the addition manuscripts is completed, the corresponding electronic manuscripts are saved into the manuscript/document storage section 110.

For example, when one sheet is to be added between page 3 and page 4 in the edit electronic document, the old electronic manuscript at page 3 in the edit electronic document and one sheet of addition manuscript to be added are placed. Here, in the description given above, the concept of "page position" such as page 3 and page 4 is used. However, the page position, in the edit electronic document, of the old manuscript at the start position of addition range (the old start manuscript) is automatically identified by the edit control section 130. Thus, it is sufficient that the user merely recognizes which manuscript is located at the start position of the desired addition processing. That is, the user oneself need not recognize the page positions.

In a case that plural specification for addition parts is available, when read of the old manuscripts and the addition manuscripts and save of the corresponding electronic manuscripts are completed for the first part of addition object, the repetition confirmation screen G82_AD1 shown in FIG. 9C (1) is presented to the user. In this example, addition is to be performed also for another part. Thus, the user double-clicks the continuation button (in emphasized displaying) on the repetition confirmation screen G82_AD1 so as to start work for the second part.

When the processing operation information reception section 136 receives the work instruction for the second part, the main control section of the document management apparatus 2B returns to step S72 and then presents to the user the read condition selection screen G72_AD1 as shown in FIG. 9B given above. For example, in a case that the second part is a position between page 4 and page 5 in the edit electronic document and that two sheets of new manuscripts are to be added at the position, the old electronic manuscript at page 4 in the edit electronic document and two sheets of addition manuscripts are placed. Here, in the description given above, the concept of "page position" such as page 4 and page 5 is used. However, as described above, the user oneself need not recognize the page positions.

When read of the old manuscripts and the addition manuscripts and save of the corresponding electronic manuscripts are completed for the second part, the repetition confirmation screen G82_AD2 shown in FIG. 9C (2) is presented to the user. In this example, the user double-clicks the end button (in emphasized displaying) on the repetition confirmation screen G82_AD2 so as to start the automatic editing processing performed by the edit control section 130 based on the individual electronic manuscripts of the key manuscripts for the two parts and the new manuscripts necessary in the addition processing which have been read and saved at step S74.

For the first and the second parts, based on the individual electronic manuscripts of the old manuscripts and the addition manuscripts having been read, the edit control section 130 inserts the electronic manuscripts of the addition manuscripts immediately after the start position of addition range in the edit electronic document so as to generate a new electronic document having been addition-edited, and then saves the obtained document into the manuscript/document storage section 110.

When the manuscript addition processing and the save of the new electronic document performed by the edit control section 130 are completed for the first and the second parts, the main control section of the document management apparatus 2B presents to the user the edit completion screen G92_AD2 shown in FIG. 9D. This display example shows a case that the old file of the edit electronic document is to be deleted while the new electronic document having been addition-edited is to be saved by another file name. Thus, the file name, the registration date and time, and the number of pages (Img-x16215892 2006/02/16 4) of the edit electronic document are deleted (indicated as outline characters in the figure), while the file name, the registration date and time, and the number of pages (Img-x16217896 2007/02/18 7) of the newly generated new electronic document having been addition-edited are emphasized and displayed. Here, in this example, one sheet is added in the first part and two sheets are added in the second part. Thus, the number of pages in the new electronic document is greater than the number of pages in the edit electronic document by "3".

Here, similarly to the substitution processing, the old file of the edit electronic document may be maintained, while the new electronic document having been addition-edited may be saved by another file name. Alternatively, the old file of the edit electronic document may be deleted, and the new electronic document having been addition-edited may be saved by the same file name as the old file (a so-called file update mode).

<Manuscript Addition Function: Automatic Processing Procedure>

Figure 10:
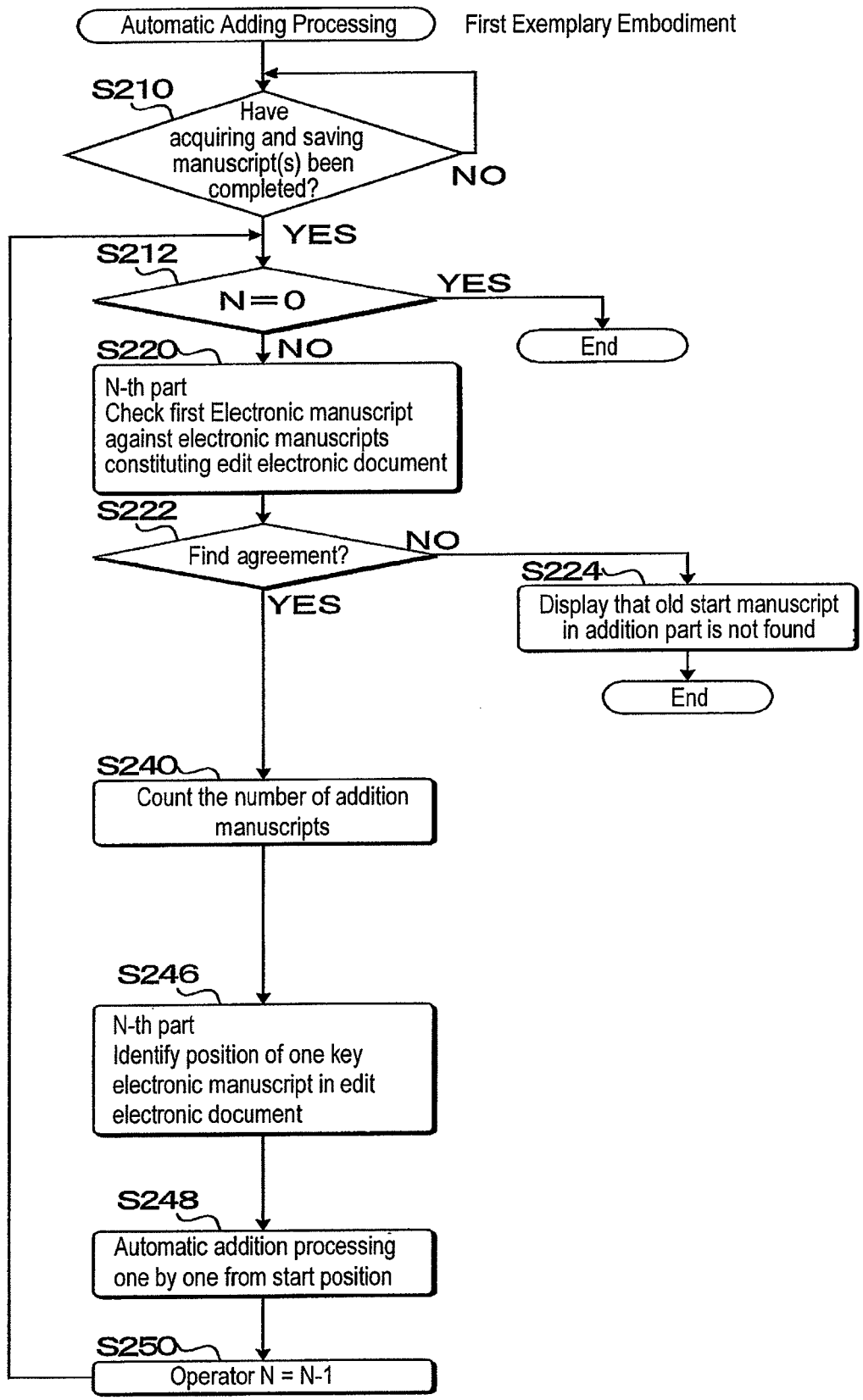
FIG. 10 is a flow chart showing an example of a procedure of automatic addition processing in the configuration of the first exemplary embodiment.

FIG. 10 is a flow chart showing an example of a procedure of automatic addition processing in the configuration of the first exemplary embodiment performed based on the manuscript addition processing in the edit control section 130 when the processing operation information reception section 136 is notified that the user has selected a manuscript addition mode. In general, steps are designated by reference numerals of 200s. However, processing steps similar to those in FIG. 7 are designated by reference numerals of 10s and 1s. In this example, plural specification for addition parts is available.

A change is made in the point that addition processing is performed at a step of editing processing. However, basically, this processing is similar to the automatic processing procedure of the manuscript substitution function shown in FIG. 7. A major difference is that the confirmation processing for the end position of processing range is omitted.

When the processing operation information reception section 136 is notified that read and save of a key manuscript and a new electronic manuscript have been completed for all edit parts (addition parts, in this example) (S210—YES), the edit control section 130 starts addition processing for each addition part with monitoring the operator N (S212). For example, when the operator N is "0", it is indicated that the addition processing has been completed for all addition parts. Thus, the processing is terminated (S212—YES). When the operator N is not "0", the addition processing is started for the N-th part (S212—NO).

When the addition processing is started for the N-th part, first, in the edit part identification section 140 of the edit control section 130, the manuscript comparison section 144 compares (checks) the thumbnail image of the first sheet (basically expected as the old start manuscript) acquired at steps S70 to S74 or the like with the thumbnail images of the electronic manuscripts constituting the edit electronic document received at steps S20 and S22 (S220). Then, based on the comparison result of the manuscript comparison section 144, the edit reference manuscript extraction section 146 finds out in the edit electronic document an electronic manuscript that agrees with the old start manuscript (S222). When the edit reference manuscript extraction section 146 fails to find out an electronic manuscript that agrees with the old start manuscript, the edit control section 130 displays the failure in finding out an electronic manuscript of the addition part, and then terminates the processing (S222—NO, S224).

On the other hand, when the edit reference manuscript extraction section 146 has found out an electronic manuscript that agrees with the old start manuscript, the document editing processing section 150 counts the number of sheets of addition electronic manuscripts (S240). The edit part identification section 140 identifies the page position, in the edit electronic document, of the electronic manuscript that agrees with the old start manuscript found out by the edit reference manuscript extraction section 146, and then notifies the information to the document editing processing section 150 (S246). Then, as shown in FIGS. 8 and 8A, with adopting as the start point of addition processing a position immediately after the addition start page notified from the edit part identification section 140, the addition processing section 154 inserts the addition electronic manuscripts (S248).

When the processing for the N-th part performed by the document editing processing section 150 is completed, the edit control section 130 decrements the operator N by "1" and then returns to step S212 (S250) so as to repeat processing similar to the above-mentioned one.

As a result of the above-mentioned processing, when addition processing is to be performed with adopting as the edit electronic document an electronic document in which the addition part is difficult to be found out immediately like in a document including a plurality of pages having similar formats and a document having an extremely large number of pages, the necessity is avoided that the user oneself need identify the addition part in the edit electronic document. That is, the document editing processing section 150 (specifically, the edit part identification section 140) automatically identifies the addition part by means of image check with a searching key electronic manuscript specified by the user. Then, the document editing processing section 150 performs automatic addition processing for the identified addition part.

<Manuscript Deletion Function>

Figure 11:
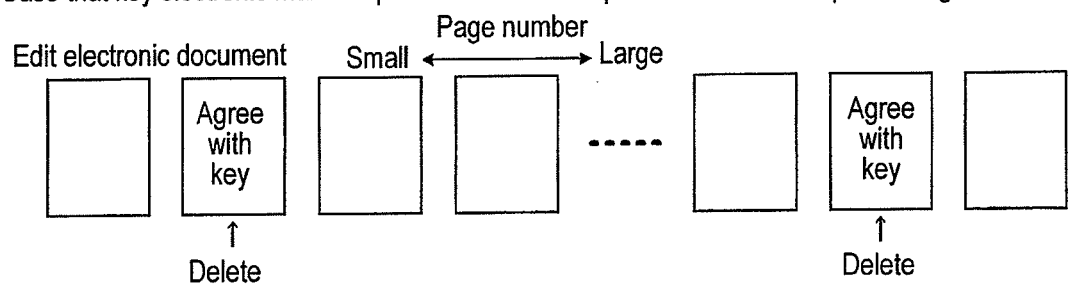
FIG. 11 is a diagram (part 1) describing an outline of manuscript deletion processing performed by the edit part identification section and by a deletion processing section of the document editing processing section.
Figure 11A:
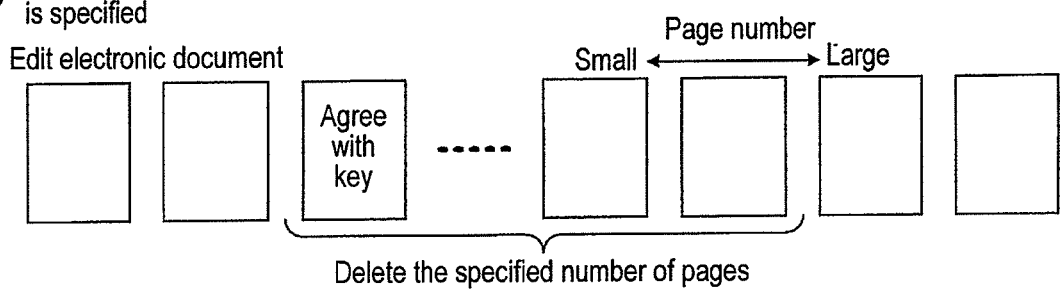
FIG. 11A is a diagram (part 2) describing an outline of manuscript deletion processing performed by the edit part identification section and by the deletion processing section of the document editing processing section.
Figure 11A:
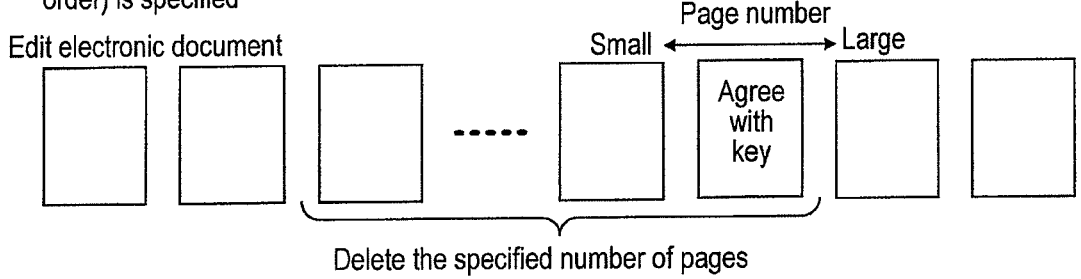
Figure 11B:
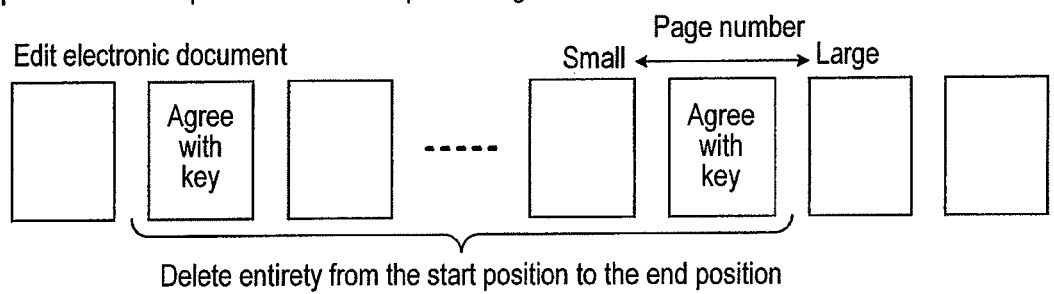
FIG. 11B is a diagram (part 3) describing an outline of manuscript deletion processing performed by the edit part identification section and by the deletion processing section of the document editing processing section.

FIGS. 11 to 11B are diagrams describing the outline of manuscript deletion processing performed by the edit part identification section 140 and by the deletion processing section 156 of the document editing processing section 150. The manuscript deletion function is a document editing function of deleting an electronic manuscript at a predetermined position in the edit electronic document. This function is started when the user selects a manuscript deletion mode on the operation panel or the like. This function according to this exemplary embodiment is characterized in that old electronic manuscripts are deleted in a deletion range identified based on electronic manuscripts generated by the electronic manuscript generating section 120.

Specifically, in this manuscript deletion function, in a manuscript deletion mode, for the edit electronic document, based on one sheet or plural sheets (specifically, two sheets) of electronic manuscripts that are generated by the electronic manuscript generating section 120 and then received as a manuscript defining the reference position of editing processing range by the electronic manuscript reception section 132, the edit part identification section 140 identifies the electronic manuscript at the positions of deletion (the deletion start position and the deletion end position). Then, electronic manuscripts in the deletion range identified based on the deletion positions are deleted.

For example, an electronic document serving as the deletion object is specified from among the saved electronic documents. Then, paper documents (may be one sheet or plural sheets) at the position of deletion in the edit electronic document are read by successive scan (stacked and scanned by the auto document feeder ADF). Then, electronic manuscripts that agree with the scanned old manuscripts are found out one by one in the edit electronic document and deleted sequentially. That is, each page that agrees with a read-out paper document is deleted. Alternatively, paper documents at the positions (the start position and the end position) that define a part (may be one part or a plurality of parts) where deletion is to be performed in the edit electronic document are read by successive scan (stacked and scanned by the auto document feeder ADF). Then, electronic manuscripts that agree with the old manuscripts at the start position and the end position obtained by scanning are found out in the edit electronic document. After that, all electronic manuscripts in that part are deleted.

The reference positions indicated by the key electronic manuscripts for deletion processing have three possibilities consisting of an individual deletion processing position, a start position of deletion processing (this case requires input of the number of pages to be deleted), and a pair of a start position and an end position of deletion range. In each case, in the deletion processing, electronic manuscripts in the part of deletion object are deleted in the old electronic manuscript. The meaning of the reference position is specified by the user through the operation panel, or alternatively set up in advance by the apparatus and presented to the user.

FIG. 11 shows a situation that key electronic manuscripts indicating the reference positions of deletion define the individual deletion processing positions. The edit part identification section 140 determines that an old electronic manuscript in the edit electronic document determined as identical or best similar to the key electronic manuscript indicating the reference position indicates the object of deletion processing. In the figure, the old electronic manuscript indicated as "agreeing with key" in the edit electronic document indicates the position itself of deletion processing. When the edit part identification section 140 determines the deletion processing position, for example, as shown in FIG. 11, the document editing processing section 150 deletes one by one the old electronic manuscripts indicated as "agreeing with key".

FIG. 11A shows a situation that the key electronic manuscript indicating the reference position of deletion defines the start position of deletion processing and that the number of pages to be deleted is input. In the figure, the old electronic manuscript indicated as "agreeing with key" in the edit electronic document indicates the start position of deletion processing. In a case that the number of pages to be deleted is not input, the end position of deletion range cannot be identified. Thus, similarly to the case shown FIG. 11, manuscripts that agree with the key electronic manuscripts are solely deleted.

For example, in a case that deletion instruction has been issued with specifying the number of to-be-deleted pages and an ascending order, when the edit part identification section 140 determines the start position of deletion processing, as shown in FIG. 11A (1), with adopting as the start position the old electronic manuscript indicated as "agreeing with key", that is, with adopting this position as the start point toward the backside (in the direction of increasing page number), the deletion processing section 156 of the document editing processing section 150 deletes the specified number of pages of the manuscripts. Alternatively, in a case that deletion instruction has been issued with specifying the number of to-be-deleted pages and a descending order, when the edit part identification section 140 determines the start position of deletion processing, as shown in FIG. 11A (2), with adopting as the start position the old electronic manuscript indicated as "agreeing with key", that is, with adopting this position as the start point toward the front side (in the direction of decreasing page number), the deletion processing section 156 of the document editing processing section 150 deletes the specified number of pages of the manuscripts.

FIG. 11B shows a situation that under the condition that two key electronic manuscripts indicating the reference positions of deletion are to be provided (i.e., two old manuscripts indicating the start position and the end position of deletion range are to be acquired), two sheets of key electronic manuscripts are acquired normally and one of the two defines the start position of deletion part (may be one part or a plurality of parts) while the other defines the end position of deletion part. When two sheets of key electronic manuscripts that form a pair are acquired normally, the deletion range cannot be identified. Thus, similarly to the case as shown in FIG. 11, manuscripts that agree with the key electronic manuscripts are solely deleted.

For example, among the two old electronic manuscripts in the electronic document determined as identical or best similar to the key electronic manuscripts indicating the reference positions, the edit part identification section 140 determines that one (e.g., an odd-number-th sheet) of the two indicates the start position of deletion range and that the other one (e.g., an even-number-th sheet) indicates the end position of deletion range, then identify the deletion range as being from the start position to the end position, and then notifies the information concerning the deletion range to the document editing processing section 150. In the figure, the two old electronic manuscripts indicated as "agreeing with key" in the edit electronic document indicate the start position and the end position of deletion range. When the information concerning the deletion range is notified, the document editing processing section 150 deletes the old electronic manuscripts within the deletion range (from the deletion start position to the deletion end position) in the edit electronic document.

<Manuscript Deletion Function: Operating Procedure in Case that Plural Specification is Available>

FIGS. 12 to 12D are diagrams describing the operating procedure and the processing procedure of executing a manuscript deletion function, and show examples of screens in a case that plural specification for deletion parts is available.

At step S20, the main control section of the document management apparatus 2B presents the edit document selection screen G20 to the user. Through the user interface (such as an operation panel) of the apparatus to be operated, the user issues instruction for displaying of stored documents in the user's own confidential box. Then, the edit document selection screen G20_DL1 shown in FIG. 12 is displayed.

On the illustrated edit document selection screen G20_DL1 for the document list, the file name, the registration date and time, and the total number of pages are displayed for each of four electronic documents. In the browsing display on the edit document selection screen G20_DL1, the user finds out the file name of a document in which a part or all of manuscripts are to be deleted. For example, the user selects (in emphasized displaying) and double-clicks the "Img-x16217893". Here, it is assumed that the selected document has a total number of pages of 657 and hence is a document having an extremely large number of pages. Thus, it is difficult for the user to find out the substitution part immediately.

Figure 12A:
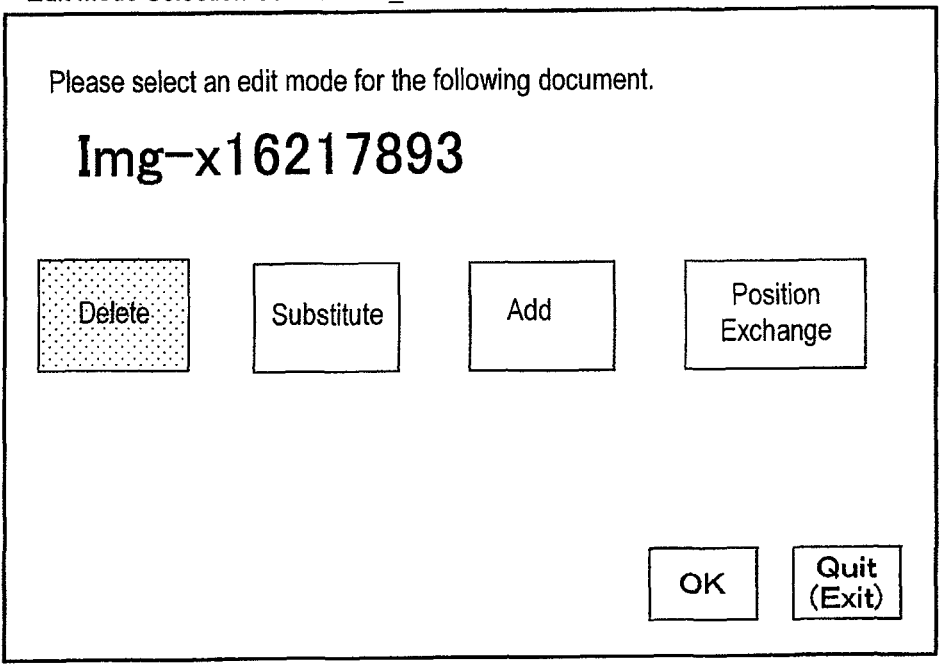
FIG. 12A is a diagram showing an example of an edit mode selection screen G30_DL1 used in performing the manuscript deletion function.

Then, at step S30, the main control section of the document management apparatus 2B presents to the user the edit mode selection screen G30_DL1 shown in FIG. 12A. On the edit mode selection screen G30_DL1, the file name "Img-x16217893" of the edit electronic document selected at step S20 and four mode selection buttons for specifying the contents of editing processing to be performed on the edit electronic document are displayed. In this example, the user double-clicks the deletion button (in emphasized displaying) on the edit mode selection screen G30_DL1 so as to select the "deletion mode".

Figure 12B:
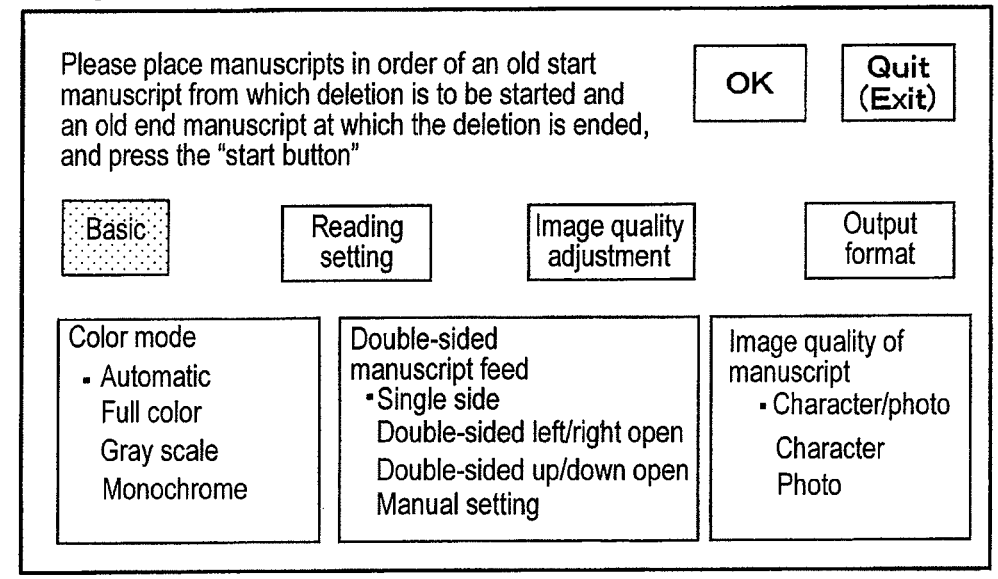
FIG. 12B is a diagram showing an example of a read condition selection screen G72_DL1 used in performing the manuscript deletion function.

Then, at step S72, the main control section of the document management apparatus 2B presents to the user the read condition selection screen G72_DL1 suitable for a deletion mode as shown in FIG. 12B. In this display example, it is premised that the electronic manuscript generating section 120 has an auto document feeder ADF. Then, the presented "procedure of reading manuscripts" is the procedure of reading: a key manuscript that defines the start position serving as the reference of deletion processing (the old start manuscript: the manuscript at the start position of deletion) in the edit electronic document; and a key manuscript that defines the end position (the old end manuscript: the manuscript at the end position of deletion).

In accordance with the "procedure of reading manuscripts" presented on the read condition selection screen G72_DL1, the user places onto the auto document feeder ADF the old manuscript at the start position of deletion range (the old start manuscript) and the old manuscript at the end position (the old end manuscript) among the electronic manuscripts that constitute the edit electronic document, and then presses the start button so as to start reading. In a case that a plurality of deletion parts are to be processed, the individual manuscripts are placed on the auto document feeder ADF in a state that the old manuscript at the start position of deletion range (the old start manuscript) and the old manuscript at its end position (the old end manuscript) are paired with each other. Then, read is performed.

For example, the part from page 101 to page 200 is to be deleted in the edit electronic document, old manuscripts corresponding to the old electronic manuscript at page 101 and the old electronic manuscript at page 200 in the edit electronic document are placed. Here, in the description given above, the concept of "page position" such as page 101 and page 200 is used. However, the page positions, in the edit electronic document, of the old manuscript at the start position of deletion range (the old start manuscript) and the old manuscript at the end position (the old end manuscript) are automatically identified by the edit control section 130. Thus, it is sufficient that the user merely recognizes which manuscripts are located at the start position and the end position of the desired deletion processing. That is, the user oneself need not recognize the page positions.

Figure 12C:
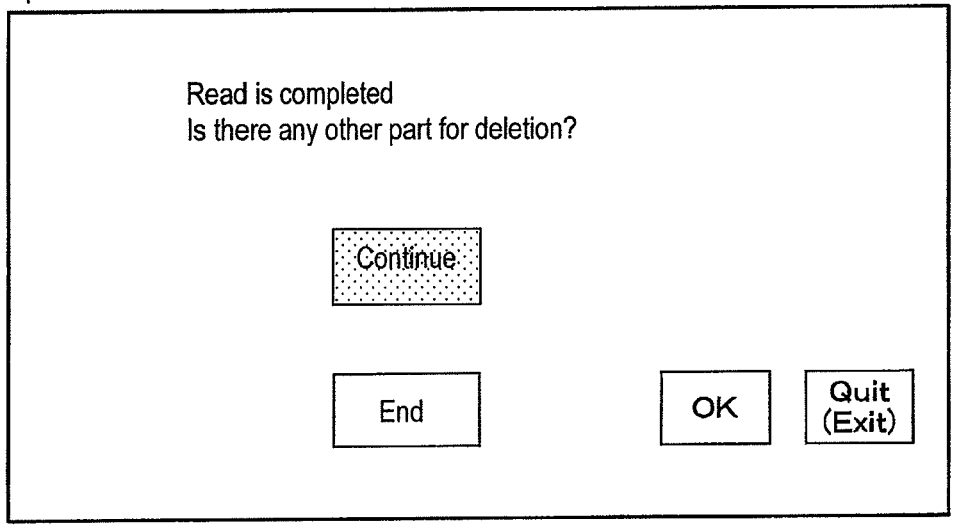
FIG. 12C is a diagram showing an example of repetition confirmation screens G82_DL1 and G82_DL2 used in performing the manuscript deletion function.
Figure 12C:
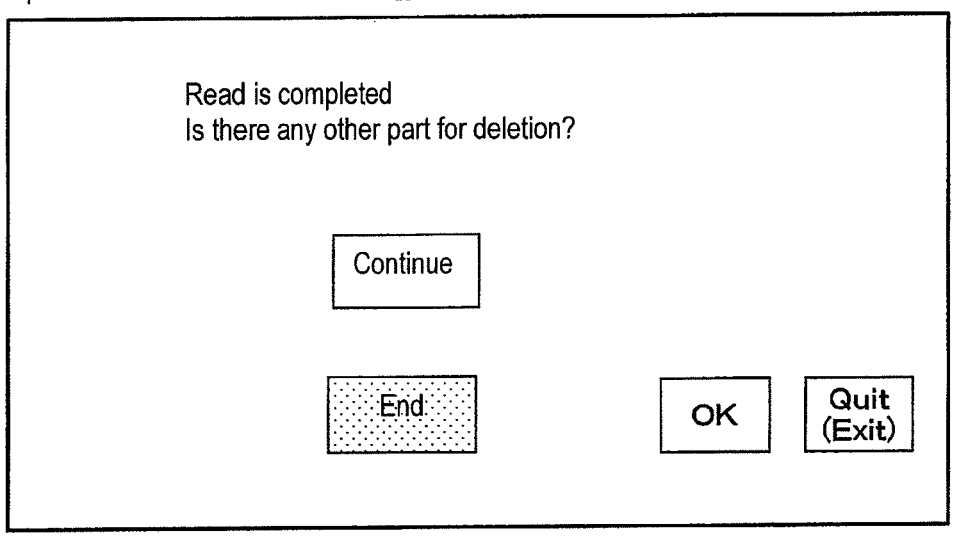

In a case that plural specification for deletion parts is available, when read of the old manuscripts and save of the corresponding electronic manuscripts are completed for the first part of deletion object, the repetition confirmation screen G82_DL1 shown in FIG. 12C (1) is presented to the user. In this example, deletion is to be performed also for another part. Thus, the user double-clicks the continuation button (in emphasized displaying) on the repetition confirmation screen G82_DL1 so as to start work for the second part.

When the processing operation information reception section 136 receives the work instruction for the second part, the main control section of the document management apparatus 2B returns to step S72 and then presents to the user the read condition selection screen G72_DL1 as shown in FIG. 12B given above. For example, when the part from page 401 to page 500 in the edit electronic document is to be deleted, old manuscripts corresponding to the old electronic manuscripts at page 401 and page 500 in the edit electronic document are placed. Here, in the description given above, the concept of "page position" such as page 401 and page 500 is used. However, as described above, the user oneself need not recognize the page positions.

When read of the old manuscripts and save of the corresponding electronic manuscripts are completed for the second part, the repetition confirmation screen G82_DL2 shown in FIG. 12C (2) is presented to the user. In this example, the user double-clicks the end button (in emphasized displaying) on the repetition confirmation screen G82_DL2 so as to start the automatic editing processing performed by the edit control section 130 based on the individual key electronic manuscripts of the key manuscripts for the two parts which have been read and saved at step S74.

For each of the first and the second parts, based on the individual key electronic manuscripts of the old manuscripts having been read, the edit control section 130 deletes the electronic manuscripts located from the start position to the end position of deletion range in the edit electronic document, thereby generates a new electronic document having been deletion-edited, and then saves the obtained document into the manuscript/document storage section 110.

When the manuscript deletion processing and the save of the new electronic document performed by the edit control section 130 are completed for the first and the second parts, the main control section of the document management apparatus 2B presents to the user the edit completion screen G92_DL2 shown in FIG. 12D. This display example shows a case that the old file of the edit electronic document is to be deleted while the new electronic document having been deletion-edited is to be saved by another file name. Thus, the file name, the registration date and time, and the number of pages (Img-x16217893 2007/02/16 657) of the edit electronic document are deleted (indicated as outline characters in the figure), while the file name, the registration date and time, and the number of pages (Img-x16217896 2007/02/18 457) of the newly generated new electronic document having been deletion-edited are emphasized and displayed. Here, in this example, 100 sheets are deleted in the first part and 100 sheets are deleted in the second part. Thus, the number of pages in the new electronic document is smaller than the number of pages in the edit electronic document by "200".

Here, similarly to the substitution processing and addition processing, the old file of the edit electronic document may be maintained, while the new electronic document having been deletion-edited may be saved by another file name. Alternatively, the old file of the edit electronic document may be deleted, and the new electronic document having been deletion-edited may be saved by the same file name as the old file (a so-called file update mode).

<Manuscript Deletion Function: Automatic Processing Procedure>

Figure 13:
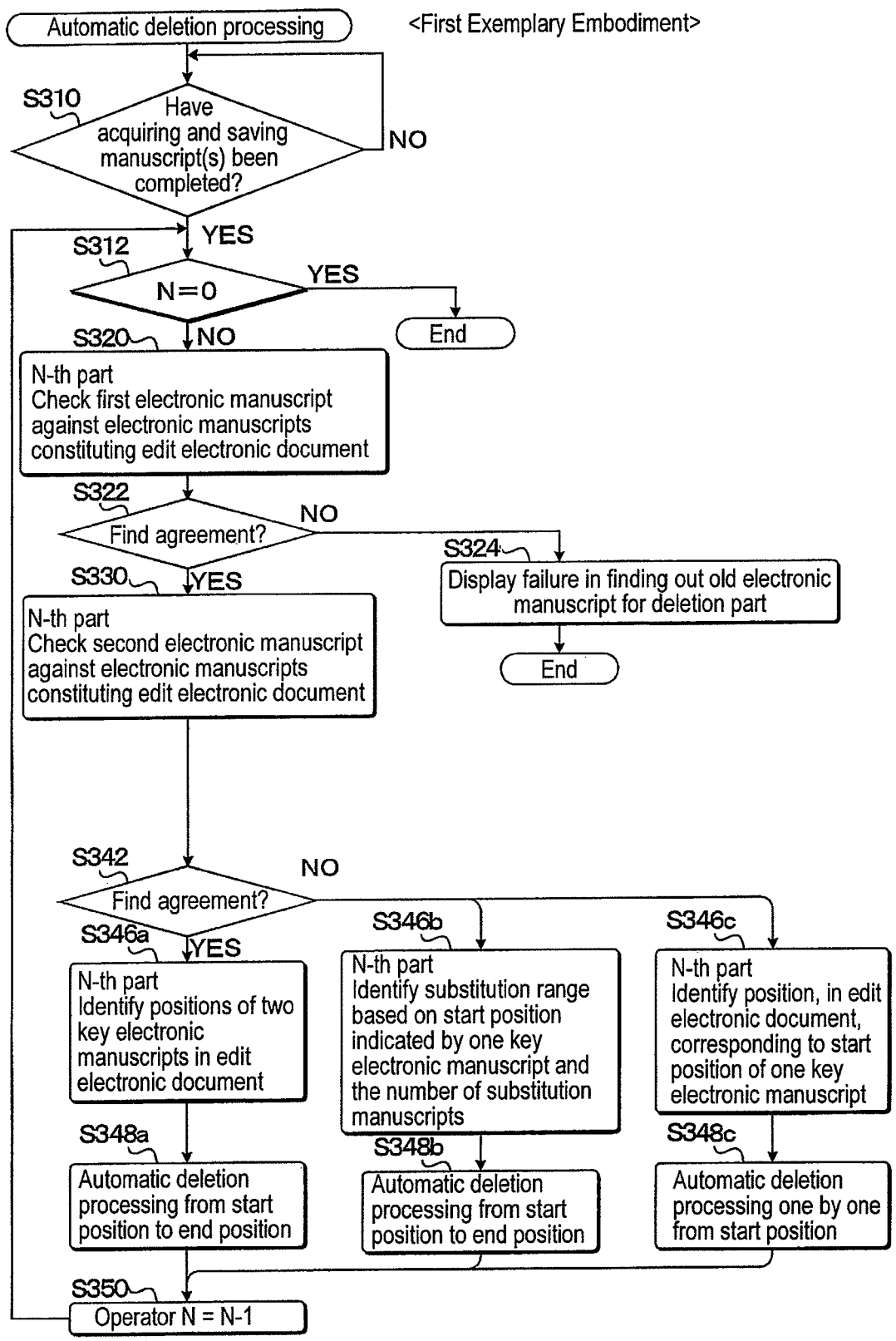
FIG. 13 is a flow chart showing an example of a procedure of automatic deletion processing in the configuration of the first exemplary embodiment.

FIG. 13 is a flow chart showing an example of a procedure of automatic deletion processing in the configuration of the first exemplary embodiment performed based on the manuscript deletion processing in the edit control section 130 when the processing operation information reception section 136 is notified that the user has selected a manuscript deletion mode. In general, steps are designated by reference numerals of 300s. However, processing steps similar to those in FIG. 7 are designated by reference numerals of 10s and 1s. In this example, plural specification for deletion parts is available.

A change is made in the point that deletion processing is performed at a step of editing processing. However, basically, this processing is similar to the automatic processing procedure of the manuscript substitution function shown in FIG. 7. A major difference is that in the deletion processing, since edit electronic manuscripts are unnecessary, step S140 for counting the number of sheets of edit electronic manuscripts is omitted. Description for the individual processing steps is omitted.

As a result of the above-mentioned processing, when deletion processing is to be performed with adopting as the edit electronic document an electronic document in which the deletion part is difficult to be found out immediately like in a document including a plurality of pages having similar formats and a document having an extremely large number of pages, the necessity is avoided that the user oneself need identify the deletion part in the edit electronic document. That is, the document editing processing section 150 (specifically, the edit part identification section 140) automatically identifies the deletion part by means of image check with a searching key electronic manuscript specified by the user. Then, the document editing processing section 150 performs automatic deletion processing for the identified deletion part.

<Manuscript Exchange Function>

Figure 14:
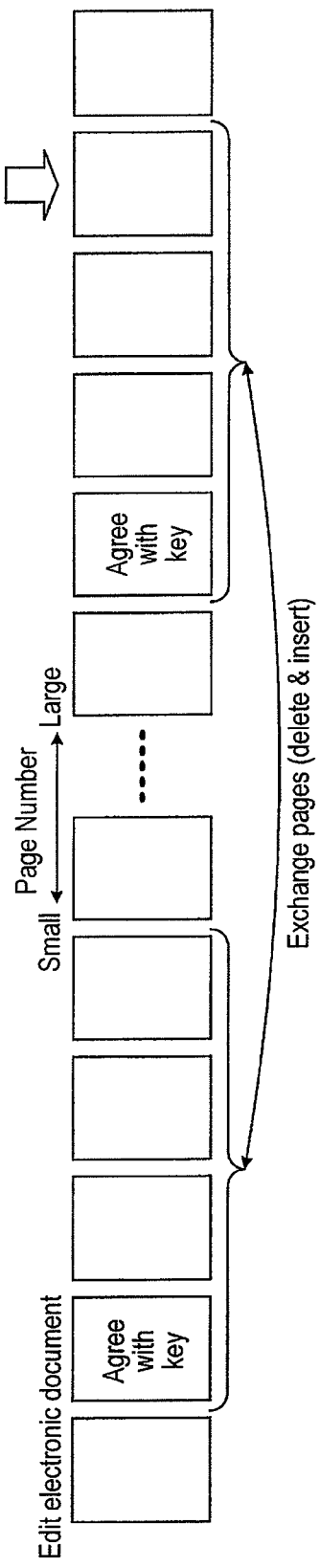
FIG. 14 is a diagram (part 1) describing an outline of manuscript exchange processing performed by the edit part identification section and by an exchange processing section of the document editing processing section.
Figure 14:
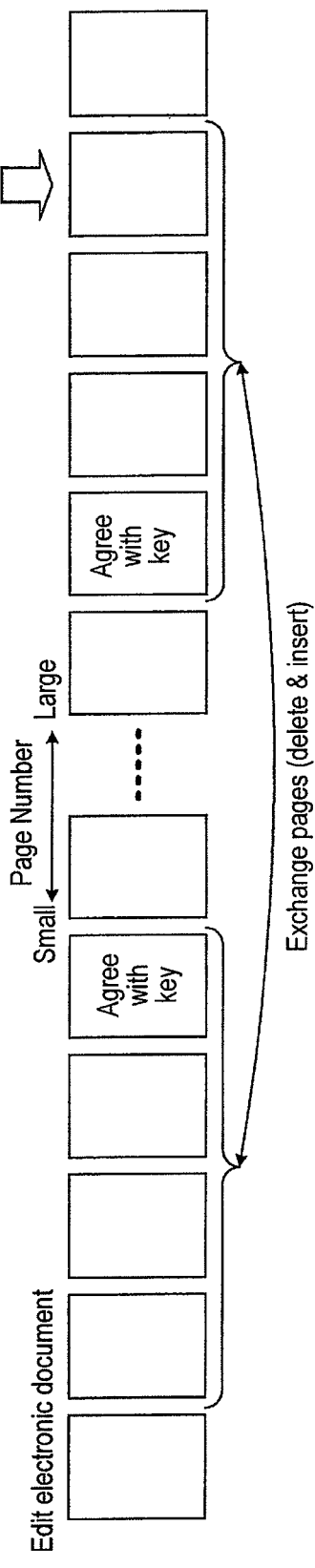

FIGS. 14 to 14C are diagrams describing the outline of manuscript exchange processing performed by the edit part identification section 140 and by the exchange processing section 158 of the document editing processing section 150. The manuscript exchange function is a document editing function of exchanging plural parts of electronic manuscripts constituting the edit electronic document, that is, exchanging page positions within the same document. This function is started when the user selects a manuscript exchange mode on the operation panel or the like. In particular, this function according to this exemplary embodiment is characterized in that electronic manuscripts are exchanged in exchange ranges identified based on electronic manuscripts generated by the electronic manuscript generating section 120.

This manuscript exchange function may be, for example, implemented as a combination of addition processing and deletion processing. At that time, it is sufficient that the processing is performed with recognizing that addition manuscripts to be inserted into an addition range in the edit electronic document are present in another part of the edit electronic document. Alternatively, the present function may be recognized as a modified mode of substitution processing which can intrinsically be recognized as a combination of deletion processing and addition processing. Then, it is sufficient that the processing is performed with recognizing that substitution manuscripts to be substituted into a substitution range in the edit electronic document are present in another part of the edit electronic document. In each case, any one of the addition processing and the deletion processing may be performed first.

Specifically, in the manuscript exchange mode, for the edit electronic document, based on one sheet or plural sheets (specifically, two sheets) of electronic manuscripts that are generated by the electronic manuscript generating section 120 and received by the electronic manuscript reception section 132 as manuscripts defining the reference positions of exchange processing range for one exchange part, the edit part identification section 140 identifies the position of an electronic manuscript at one position of exchange (the exchange start position or the exchange end position). Further, for the same edit electronic document, based on one sheet or plural sheets (specifically, two sheets) of electronic manuscripts received as manuscripts defining the reference positions of exchange processing range for the other exchange part, the edit part identification section 140 identifies the position of an electronic manuscript at the other position of exchange (the exchange start position or the exchange end position). Then, the positions of the individual electronic manuscripts are exchanged between the one of the identified exchange ranges and the other exchange range. In the present description, the terms "one" and "the other" have been used. However, the number of exchange parts is not limited to two. That is, three or more parts may be specified. In this case, the terms "one" and "the other" may be used within each pair of position exchange objects.

As for the reference positions indicated by the key electronic manuscripts for exchange processing, one exchange range serves also as a deletion range as well as the range of addition manuscripts for the other exchange range. Similarly, the other exchange range serves also as a deletion range as well as the range of addition manuscripts for the one exchange range. It is sufficient that two parts to be position-exchanged with each other are specified unambiguously. Thus, for example, the reference position can be an individual exchange processing position, a start position of exchange processing (this case requires input of the number of pages to be exchanged), a start position of exchange range, an end position of exchange range, and a pair of a start position and an end position of exchange range.

Here, when a start position of exchange range and an end position of exchange range are specified alone, any of one part and the other part need be specified in a mode that at least the exchange range can be define. This is because, otherwise, two parts to be position-exchanged with each other cannot be specified. The meaning of the reference position is specified by the user through the operation panel, or alternatively set up in advance by the apparatus and presented to the user.

FIG. 14 shows a case that only the start position in the key electronic manuscript is identified for one exchange part while the exchange range of the other exchange part can be identified by key electronic manuscripts. The cases that the exchange range of the other exchange part can be identified by key electronic manuscripts include: a case that specification of the number of pages in the substitution range is input and hence one key electronic manuscript is sufficient for identifying the start position; and a case that two key electronic manuscripts identify n the start position and the end position.

For one exchange part, the edit part identification section 140 determines that an old electronic manuscript in the edit electronic document determined as identical or best similar to the key electronic manuscript indicating the reference position indicates the start position of exchange processing. Further, for the other exchange part, the edit part identification section 140 identifies the exchange range based on the positions of old electronic manuscripts in the edit electronic document determined as identical or best similar to one sheet or two sheets of key electronic manuscripts. In the figure, the old electronic manuscripts indicated as "agreeing with key" in the edit electronic document indicate the start position and the end position of exchange part.

In a case that a key electronic manuscript indicating the processing start position and an ascending order are specified for one exchange range, when each position of exchange processing is identified by the edit part identification section 140, for example, as shown in FIG. 14 (1), with starting at the start position of the one exchange range toward the backside (in the direction of increasing page number), the document editing processing section 150 substitutes one sheet or plural sheets of electronic manuscripts within the other exchange range, in the same order as the page order (in ascending order). Alternatively, in a case that a key electronic manuscript indicating the processing start position and a descending order are specified for one exchange range, as shown in FIG. 14 (2), with starting at the start position of the one exchange range toward the front side (in the direction of decreasing page number), one sheet or plural sheets of electronic manuscripts within the other exchange range are substituted in the order opposite to the page order (in descending order). In any case, the number of sheets of manuscripts is identical in the two exchange parts. In practice, this processing is recognized as a mode that two exchange ranges are mutually substituted in a state that the page order is maintained.

FIG. 14A shows a case that while the exchange range of one exchange part can be identified by key electronic manuscripts while the exchange range of the other exchange part can also be identified by the key electronic manuscripts. For the one exchange part, the edit part identification section 140 identifies the exchange range based on the positions of old electronic manuscripts in the edit electronic document determined as identical or best similar to one sheet or two sheets of key electronic manuscripts. Further, for the other exchange part, the edit part identification section 140 identifies the exchange range based on the positions of old electronic manuscripts in the edit electronic document determined as identical or best similar to one sheet or two sheets of key electronic manuscripts. In the figure, the old electronic manuscripts indicated as "agreeing with key" in the edit electronic document indicate the start position and the end position of exchange part.

When each position of exchange processing is identified by the edit part identification section 140, for example, as shown in FIG. 14A, the document editing processing section 150 deletes the electronic manuscripts in one exchange range and inserts into that part the electronic manuscripts of the other exchange range. Further, the document editing processing section 150 deletes the electronic manuscripts in the other exchange range and inserts into that part the electronic manuscripts of the one exchange range. In each case, in the insertion, the page order within the exchange range is maintained.

In this case, all old electronic manuscripts located from the start position to the end position of one exchange range are deleted, and then all old electronic manuscripts located from the start position to the end position of the other exchange range are inserted into that part. Thus, as shown in FIG. 14A (1), the number of sheets of manuscripts is not necessarily identical in the two exchange parts. Hence, as shown in FIG. 14A (2), the number of sheets of manuscripts may be different between the two exchange parts. In each case, in practice, this processing is recognized as a mode that two exchange ranges are mutually substituted in a state that the page order is maintained.

Figure 14B:
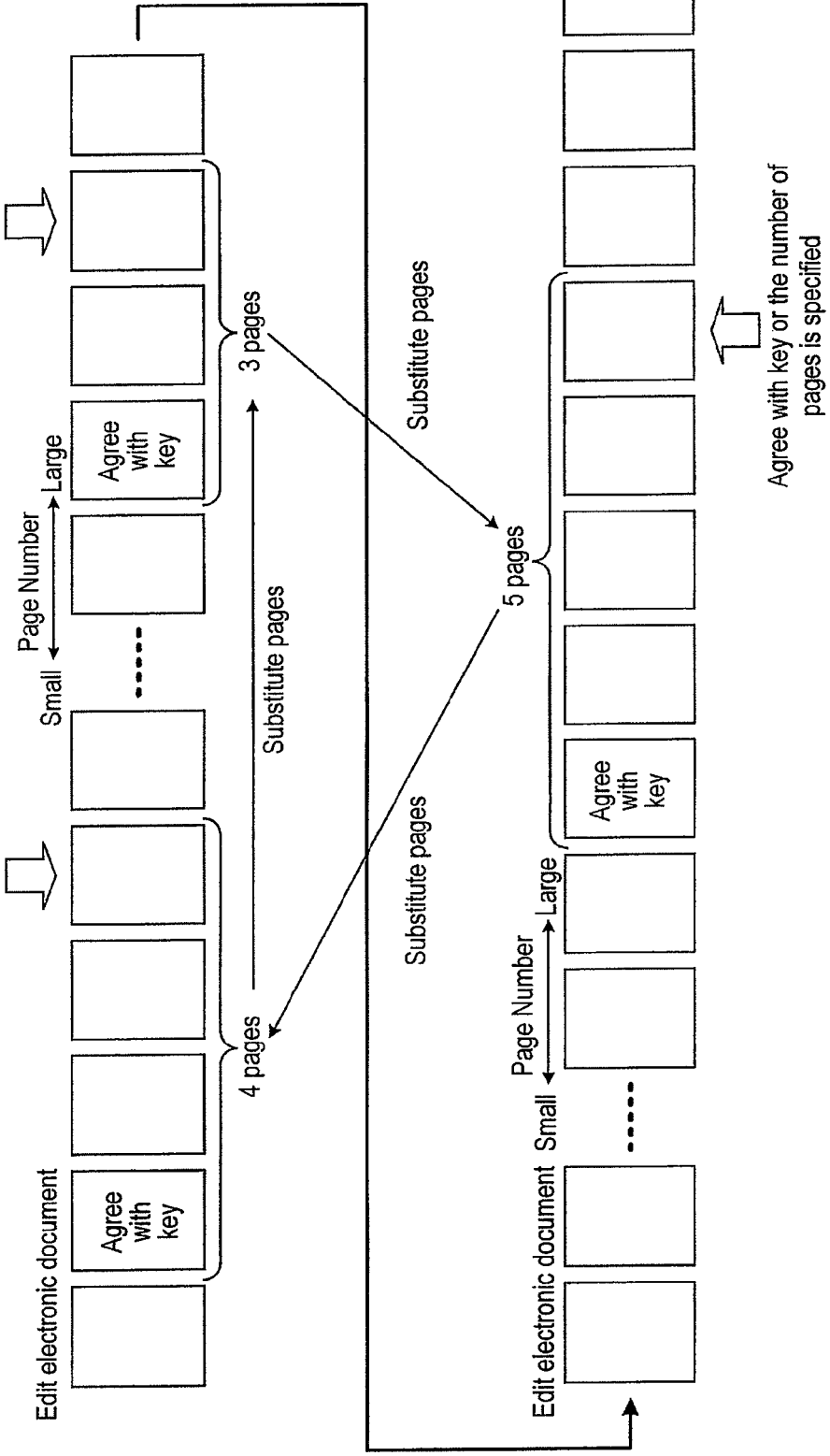
FIG. 14B is a diagram (part 3) describing an outline of manuscript exchange processing performed by the edit part identification section and by the exchange processing section of the document editing processing section.

FIG. 14B shows an example of a case that three or more exchange parts (three parts, in the figure) are specified. In the illustrated example, the exchange range can be identified by key electronic manuscripts in each of the three exchange parts. Further, the number of pages of manuscripts in each exchange range is different between these parts. All old electronic manuscripts (4 pages) from the start position to the end position of the first exchange range are deleted. Then, all old electronic manuscripts (5 pages) from the start position to the end position of the third exchange range are inserted into that part. Then, all old electronic manuscripts (3 pages) from the start position to the end position of the second exchange range are deleted. Then, all old electronic manuscripts (4 pages) from the start position to the end position of the first exchange range are inserted into that part. Then, all old electronic manuscripts (5 pages) from the start position to the end position of the third exchange range are deleted. Then, all old electronic manuscripts (3 pages) from the start position to the end position of the second exchange range are inserted into that part. In practice, this processing is recognized as a mode that the three exchange ranges are substituted with each other in a predetermined order.

<Manuscript Exchange Function: Operating Procedure in Case that Plural Specification is Available>

FIGS. 15 to 15E are diagrams describing the operating procedure and the processing procedure of executing a manuscript exchange function, and show examples of screens in a case that plural specification for exchange parts is available. The following description is given for a case that three chapters consisting of the part from page 101 to page 200, the part from page 401 to page 500, and the part from page 601 to page 650 are exchanged with each other.

At step S20, the main control section of the document management apparatus 2B presents the edit document selection screen G20 to the user. Through the user interface (such as an operation panel) of the apparatus to be operated, the user issues instruction for displaying of stored documents in the user's own confidential box. Then, the edit document selection screen G20_CH1 shown in FIG. 15 is displayed.

On the illustrated edit document selection screen G20_CH1 for the document list, the file name, the registration date and time, and the total number of pages are displayed for each of four electronic documents. Here, when some other documents cannot be displayed on the same single display screen for document browsing display, a publicly known mechanism such as a screen switching function and a scrolling function may be employed so that all electronic documents serving as displaying objects may be displayed. In the browsing display on the edit document selection screen G20_CH1, the user finds out the file name of a document in which exchange is to be performed. For example, the user selects (in emphasized displaying) and double-clicks the "Img-x16217893". Here, it is assumed that the selected document has a total number of pages of 657 and hence is a document having an extremely large number of pages. Thus, it is difficult for the user to find out the substitution part immediately.

Figure 15A:
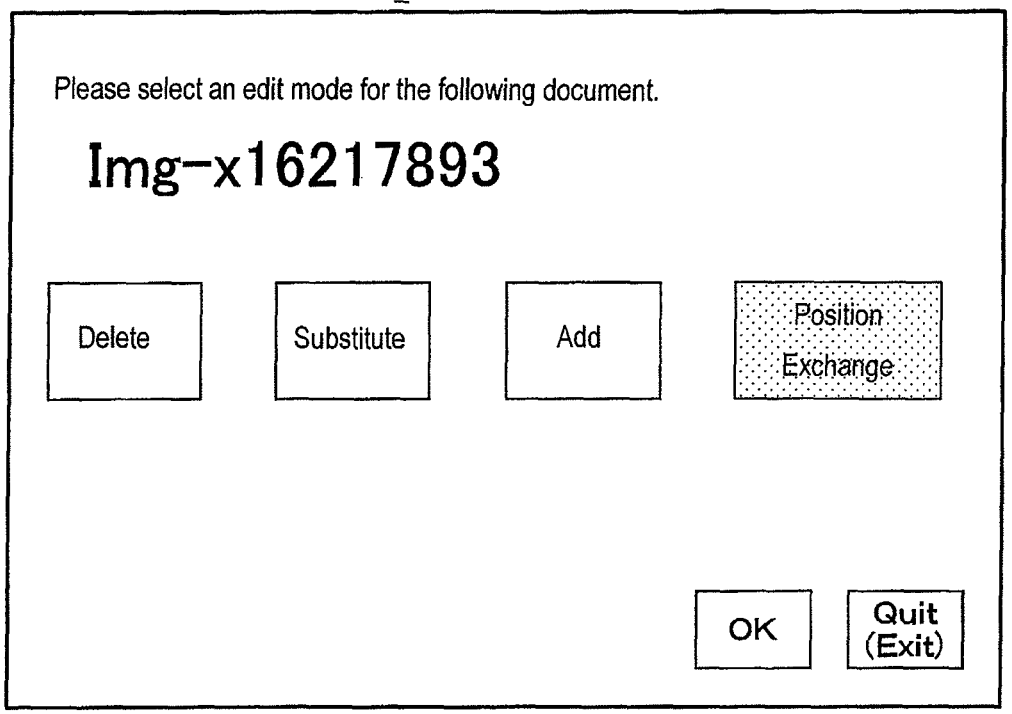
FIG. 15A is a diagram showing an example of an edit mode selection screen G30_CH1 used in performing the manuscript exchange function.

Then, at step S30, the main control section of the document management apparatus 2B presents to the user the edit mode selection screen G30_CH1 shown in FIG. 15A. On the edit mode selection screen G30_CH1, the file name "Imgx16217893" of the edit electronic document selected at step S20 and four mode selection buttons for specifying the contents of editing processing to be performed on the edit electronic document are displayed. In this example, the user double-clicks the position exchange (exchange) button (in emphasized displaying) on the edit mode selection screen G30_CH1 so as to select the "exchange mode".

Figure 15B:
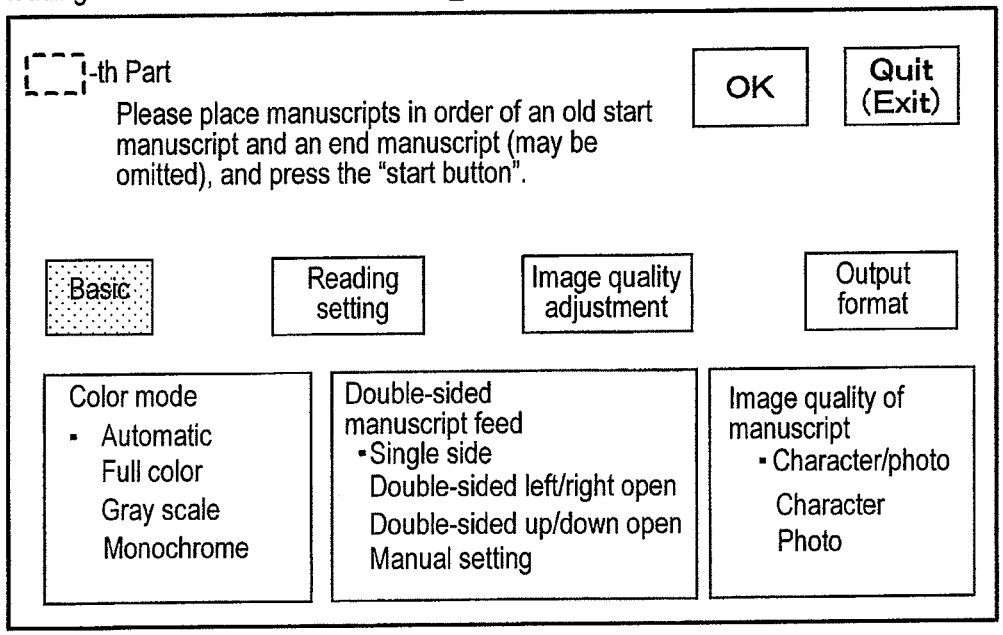
FIG. 15B is a diagram showing an example of a read condition selection screen G72_CH1 used in performing the manuscript exchange function.

Then, at step S72, the main control section of the document management apparatus 2B presents to the user the read condition selection screen G72_CH1 suitable for an exchange mode as shown in FIG. 15B. In this display example, it is premised that the electronic manuscript generating section 120 has an auto document feeder ADF. Then, information indicating which part is presently under the read processing and the "procedure of reading manuscripts" are presented. This presented procedure is the procedure of reading: a key manuscript that defines the start position serving as the reference of exchange processing in the edit electronic document (the old start manuscript: a manuscript at the start position of exchange); and a key manuscript that defines the end position (the old end manuscript: a manuscript at the end position of exchange). Here, as for the key manuscript (the old end manuscript) for determining the end position of exchange range, its reading may be skipped as presented as "may be omitted".

In accordance with the "procedure of reading manuscripts" presented on the read condition selection screen G72_CH1, the user places onto the auto document feeder ADF the old manuscript at the start position of exchange range (the old start manuscript) and the old manuscript at the end position (the old end manuscript) among the electronic manuscripts that constitute the edit electronic document, and then presses the start button so as to start reading. Basically, the individual manuscripts are placed on the auto document feeder ADF in a state that the old manuscript at the start position of exchange range (the old start manuscript) and the old manuscript at its end position (the old end manuscript) are paired with each other. Then, read is performed.

For example, the part from page 101 to page 200 in the edit electronic document is to be set up as the first part, old manuscripts corresponding to the old electronic manuscript at page 101 and the old electronic manuscript at page 200 in the edit electronic document are placed. Here, in the description given above, the concept of "page position" such as page 101 and page 200 is used. However, the page positions, in the edit electronic document, of the old manuscript at the start position of exchange range (the old start manuscript) and the old manuscript at the end position (the old end manuscript) are automatically identified by the edit control section 130. Thus, it is sufficient that the user merely recognizes which manuscripts are located at the start position and the end position of the desired exchange processing. That is, the user oneself need not recognize the page positions.

Figure 15C:
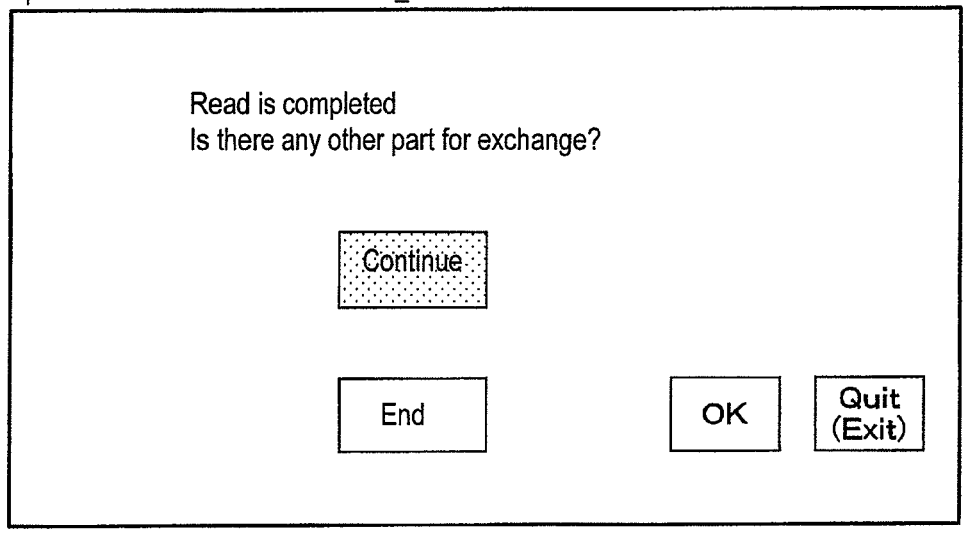
FIG. 15C is a diagram showing an example of repetition confirmation screens G82_CH1 and G82_CH2 used in performing the manuscript exchange function.
Figure 15C:
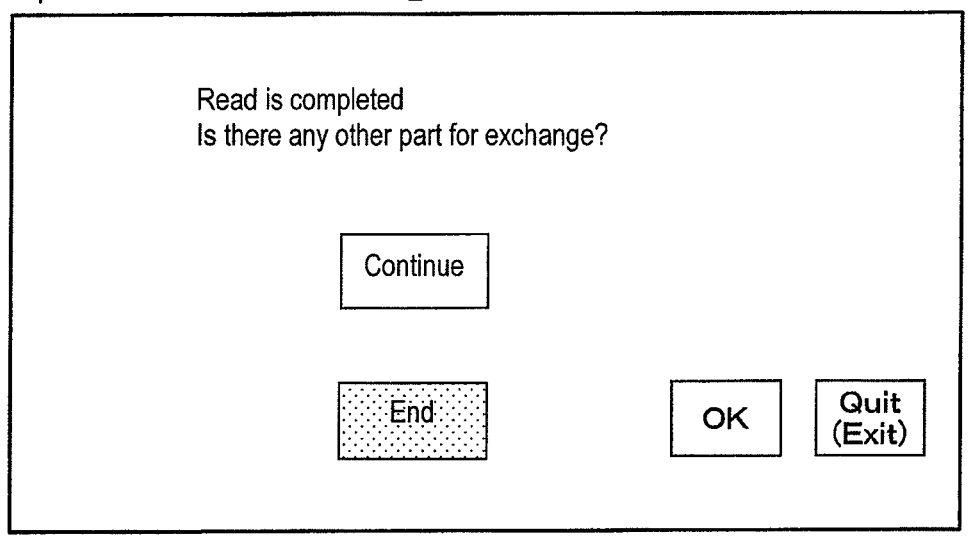

When read of the old manuscripts and save of the corresponding electronic manuscripts are completed for the first part of exchange object, the repetition confirmation screen G82_CH1 shown in FIG. 15C (1) is presented to the user. Then, the user double-clicks the continuation button (in emphasized displaying) on the repetition confirmation screen G82_CH1 so as to start work for the second part.

When the processing operation information reception section 136 receives the work instruction for the second part, the main control section of the document management apparatus 2B returns to step S72 and then presents to the user the read condition selection screen G72_CH1 as shown in FIG. 15B given above. For example, when the part from page 401 to page 500 in the edit electronic document is to be set up as the second part, old manuscripts corresponding to the old electronic manuscripts at page 401 and page 500 in the edit electronic document are placed. Here, in the description given above, the concept of "page position" such as page 401 and page 500 is used. However, as described above, the user oneself need not recognize the page positions.

When read of the old manuscripts and save of the corresponding electronic manuscripts are completed for the second part, the repetition confirmation screen G82_CH1 shown in FIG. 15C (1) is presented to the user. In this example, exchange is to be performed for three parts. Thus, the user double-clicks the continuation button (in emphasized displaying) on the repetition confirmation screen G82_CH1 so as to start work for the third part.

When the processing operation information reception section 136 receives the work instruction for the third part, the main control section of the document management apparatus 2B returns to step S72 and then presents to the user the read condition selection screen G72_CH1 as shown in FIG. 15B given above. For example, when the part from page 601 to page 650 in the edit electronic document is to be set up as the third part, old manuscripts corresponding to the old electronic manuscripts at page 601 and page 650 in the edit electronic document are placed. Here, in the description given above, the concept of "page position" such as page 601 and page 650 is used. However, as described above, the user oneself need not recognize the page positions.

When read of the old manuscripts and save of the corresponding electronic manuscripts are completed for the third part, the repetition confirmation screen G82_CH2 shown in FIG. 15C (2) is presented to the user. In this example, the user double-clicks the end button (in emphasized displaying) on the repetition confirmation screen G82_CH2 so as to terminate the read processing. When two exchange parts are set up, the procedure immediately goes to the automatic editing processing performed by the edit control section 130 based on the individual key electronic manuscripts of the key manuscripts for the two parts read and saved at step S74.

In this example, three exchange parts are set up. Thus, before the procedure goes to automatic editing processing, the main control section of the document management apparatus 2B presents to the user the exchange part setting screen G83_CH1 for receiving user specification of which part should be exchanged (position-exchanged) with which among the three exchange parts, as shown in FIG. 15D. On the exchange part setting screen G83, the part number of each set-up part is displayed on the left-hand side of the screen. Then, a field for inputting the part number of a part serving as the exchange object is displayed on the right-hand side. On the exchange part setting screen G83_CH1, for example, the user inputs the part number of each part serving as the exchange object as follows: the second part for the first part, the third part for the second part, and the first part for the third part. Then, the user clicks the OK button so as to start the automatic editing processing performed by the edit control section 130 based on the individual key electronic manuscripts of the key manuscripts for the three parts read and saved at step S74.

For each of the first, the second, and the third parts, based on the individual key electronic manuscripts of the old manuscripts having been read, the edit control section 130 identifies the exchange range of each part in the edit electronic document. Then, between the exchange parts that mutually form a pair specified on the exchange part setting screen G83_CH1, the edit control section 130 deletes the electronic manuscripts located from the start position to the end position of one exchange part in the edit electronic document, then inserts into that part the electronic manuscripts of the other exchange part, thereby generates a new electronic document having been exchange-edited, and then saves the obtained document into the manuscript/document storage section 110.

When the manuscript exchange processing for the three parts and the save of the new electronic document performed by the edit control section 130 are completed, the main control section of the document management apparatus 2B presents to the user the edit completion screen G92_CH2 shown in FIG. 15E. This display example shows a case that the old file of the edit electronic document is to be deleted while the new electronic document having been deletion-edited is to be saved by another file name. Thus, the file name, the registration date and time, and the number of pages (Img-x16217893 2007/02/16 657) of the edit electronic document are deleted (indicated as outline characters in the figure), while the file name, the registration date and time, and the number of pages (Img-x16217896 2007/02/18 657) of the newly generated new electronic document having been deletion-edited are emphasized and displayed. The exchange processing is exchanging of page positions within the same edit electronic document. Thus, no change occurs in the total number of pages.

Here, similarly to the substitution processing addition processing, and deletion processing, the old file of the edit electronic document may be maintained, while the new electronic document having been deletion-edited may be saved by another file name. Alternatively, the old file of the edit electronic document may be deleted, and the new electronic document having been deletion-edited may be saved by the same file name as the old file (a so-called file update mode).

<Manuscript Exchange Function: Automatic Processing Procedure>

Figure 16:
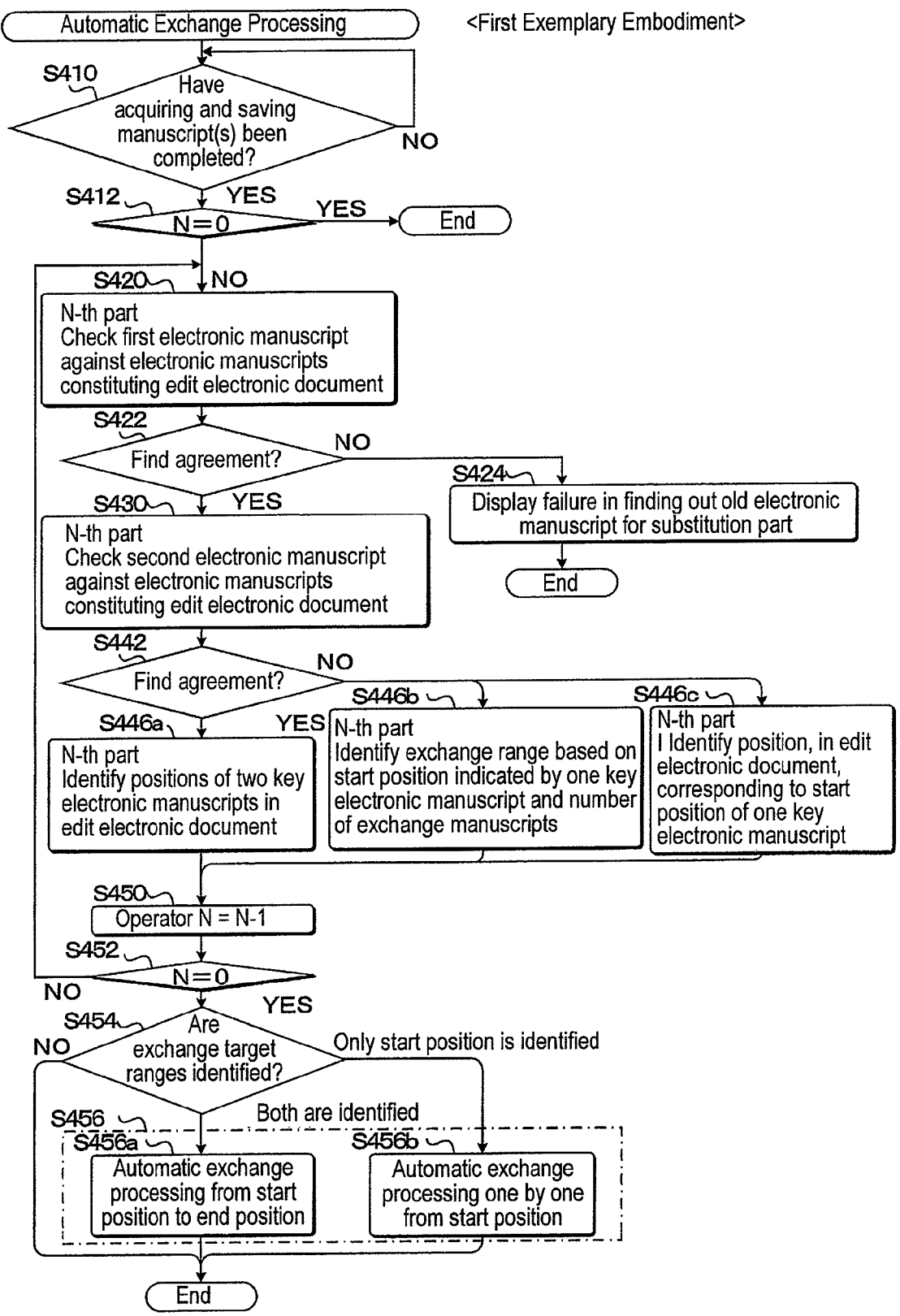
FIG. 16 is a flow chart showing an example of a procedure of automatic exchange processing in the configuration of the first exemplary embodiment.

FIG. 16 is a flow chart showing an example of a procedure of automatic exchange processing in the configuration of the first exemplary embodiment performed based on the manuscript exchange processing in the edit control section 130 when the processing operation information reception section 136 is notified that the user has selected a manuscript exchange mode. In general, steps are designated by reference numerals of 400s. However, processing steps similar to those in FIG. 7 are designated by reference numerals of 10s and 1s. In this example, plural specification for exchange parts is available.

At the step of editing processing, a modification is added in the point that exchange processing is performed in which between the exchange parts that mutually form a pair specified on the exchange part setting screen G83_CH1, electronic manuscripts located from the start position to the end position of one exchange part are deleted, and then electronic manuscripts of the other exchange part is inserted into that part. However, basically, this processing is similar to the automatic processing procedure of the manuscript substitution function shown in FIG. 7. Major differences are that: since the exchange processing does not require edit electronic manuscripts other than those in the edit electronic document, step S140 for counting the number of sheets of edit electronic manuscripts is omitted; while monitoring the operator N (S452—NO and return to S420), the exchange range is identified for all the plurality of parts before the exchange processing; and determination processing (S454) is added concerning whether when the operator N becomes "0" (S452—YES), in any one of the one part and the other part of the exchange object, at least the exchange range is already identified. Description for the individual processing steps is omitted.

Here, in the automatic exchange processing (S456), when in both of the one part and the other part of exchange object, the exchange range is already identified, as shown in FIG. 14A, by means of a combination of deletion processing and insertion processing, both exchange ranges from the start position to the end position are exchanged with each other (S456a). In contrast, in one exchange part, when only the start position is already identified and the exchange range is not yet identified, in place of the processing of step S456a, as shown in FIG. 14, by means of a combination of deletion processing and insertion processing, with adopting the start position of exchange range of the one part as the start point of exchange processing, in ascending order or descending order, the part from the start position to the end position of the other exchange range are exchanged sheet by sheet (S456b).

As a result of the above-mentioned processing, when exchange processing is to be performed with adopting as the edit electronic document an electronic document in which the exchange part is difficult to be found out immediately like in a document including a plurality of pages having similar formats and a document having an extremely large number of pages, the necessity is avoided that the user oneself need identify the exchange part in the edit electronic document. That is, the document editing processing section 150 (specifically, the edit part identification section 140) automatically identifies the exchange part by means of image check with a searching key electronic manuscript specified by the user. Then, the document editing processing section 150 performs automatic exchange processing for the identified exchange part.

Document Management Apparatus; Functional Blocks: Second Exemplary Embodiment

Figure 17:
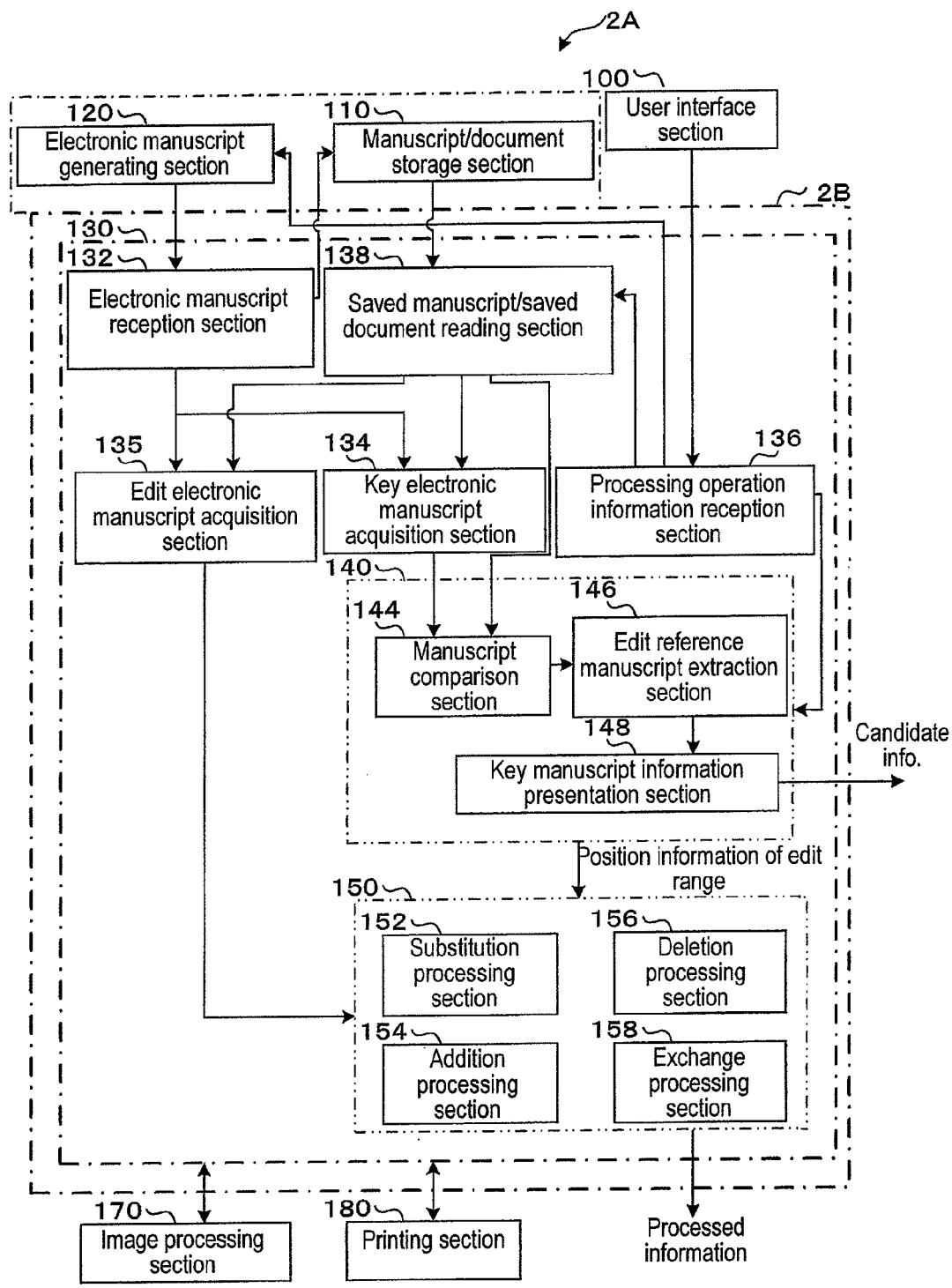
FIG. 17 is a block diagram showing a functional outline of a document management system and a document management apparatus, which constitutes main parts of a document editing function in a document processing system, according to a second exemplary embodiment.

FIG. 17 is a block diagram showing the functional outline of the document management system 2A or the document management apparatus 2B according to the second exemplary embodiment that constitutes main parts of the document editing function in the document processing system 1.

The document management system 2A and the document management apparatus 2B according to the second exemplary embodiment is based on the structure of the first exemplary embodiment, and characterized by employing a mechanism in which an old electronic manuscript that is automatically extracted by the edit part identification section 140 based on a read-in searching key manuscript and that serves as the reference position in the edit electronic document in the editing processing is presented to the user through the display device, so that user confirmation is requested concerning whether the automatically extracted old electronic manuscript is appropriate as an electronic manuscript at the reference position of editing processing.

For this purpose, the edit part identification section 140 has a key manuscript information presentation section 148 for presenting to the user the information of the electronic manuscript that agrees with the key manuscript (the old start manuscript or the old end manuscript) found out by the edit reference manuscript extraction section 146. The key manuscript information presentation section 148 displays, for example, the key electronic manuscript itself that has been found out in the edit electronic document and agrees with the key manuscript (the old start manuscript or the old end manuscript), or alternatively its thumbnail image, onto a display medium such as the operation panel.

The user checks whether the displayed key manuscript (i.e., the key electronic manuscript automatically extracted by the edit reference manuscript extraction section 146) is appropriate as the electronic manuscript at the reference position in the edit electronic document in the editing processing, and then inputs information concerning the check result through the user interface section 100. At that time, in addition to the presentation of the agreeing manuscript (identical or best similar one), the edit reference manuscript extraction section 146 may extract manuscripts (collectively referred to as candidate electronic manuscripts) determined as being similar, then may present the plurality of candidate electronic manuscripts to the user via the key manuscript information presentation section 148, and then may receive user specification of an optimal one among the manuscripts.

Here, when the candidate electronic manuscripts are to be presented, a configuration is preferable that in addition to the candidate electronic manuscripts (may be in thumbnail images) in the edit electronic document, their neighbor electronic manuscripts (one or a few manuscripts before and after each candidate electronic manuscript) can be presented. In a case that a plurality of mutually similar candidate electronic manuscripts are difficult to be distinguished from each other, when neighbor electronic manuscripts are referred to, an appropriate key electronic manuscript can easily be identified. Further, a configuration is preferable that the page position in the edit electronic document can be presented. With referring to the page position, an appropriate key electronic manuscript can easily be identified. A configuration is more preferable that neighbor electronic manuscripts and page positions can be presented simultaneously.

<Manuscript Substitution Function: Automatic Processing Procedure: with Confirmation of Key Manuscripts>

Figure 18A:
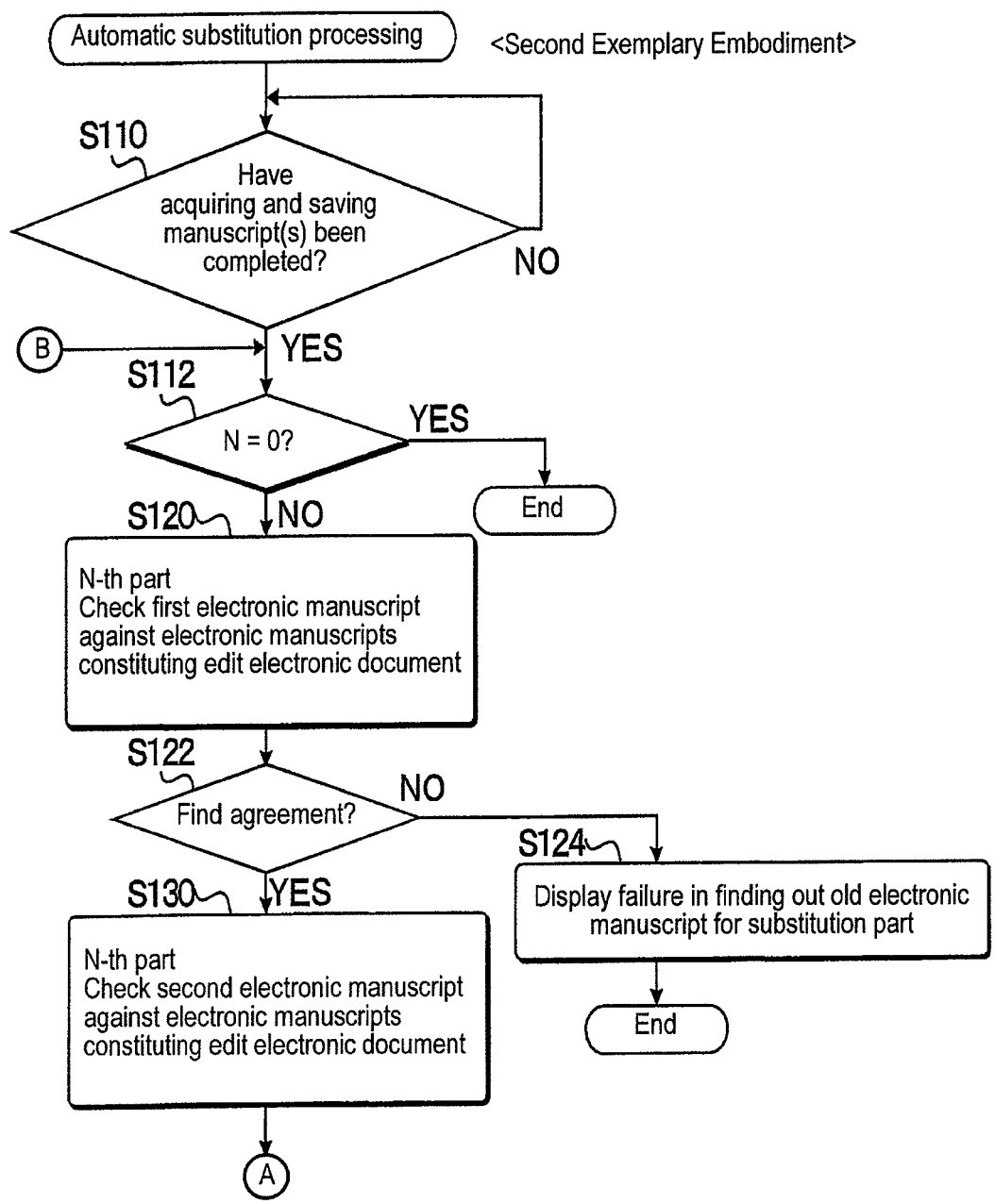
FIGS. 18A and 18B are a flow chart showing an example of a procedure of automatic substitution processing in the configuration of the second exemplary embodiment.
Figure 18B:
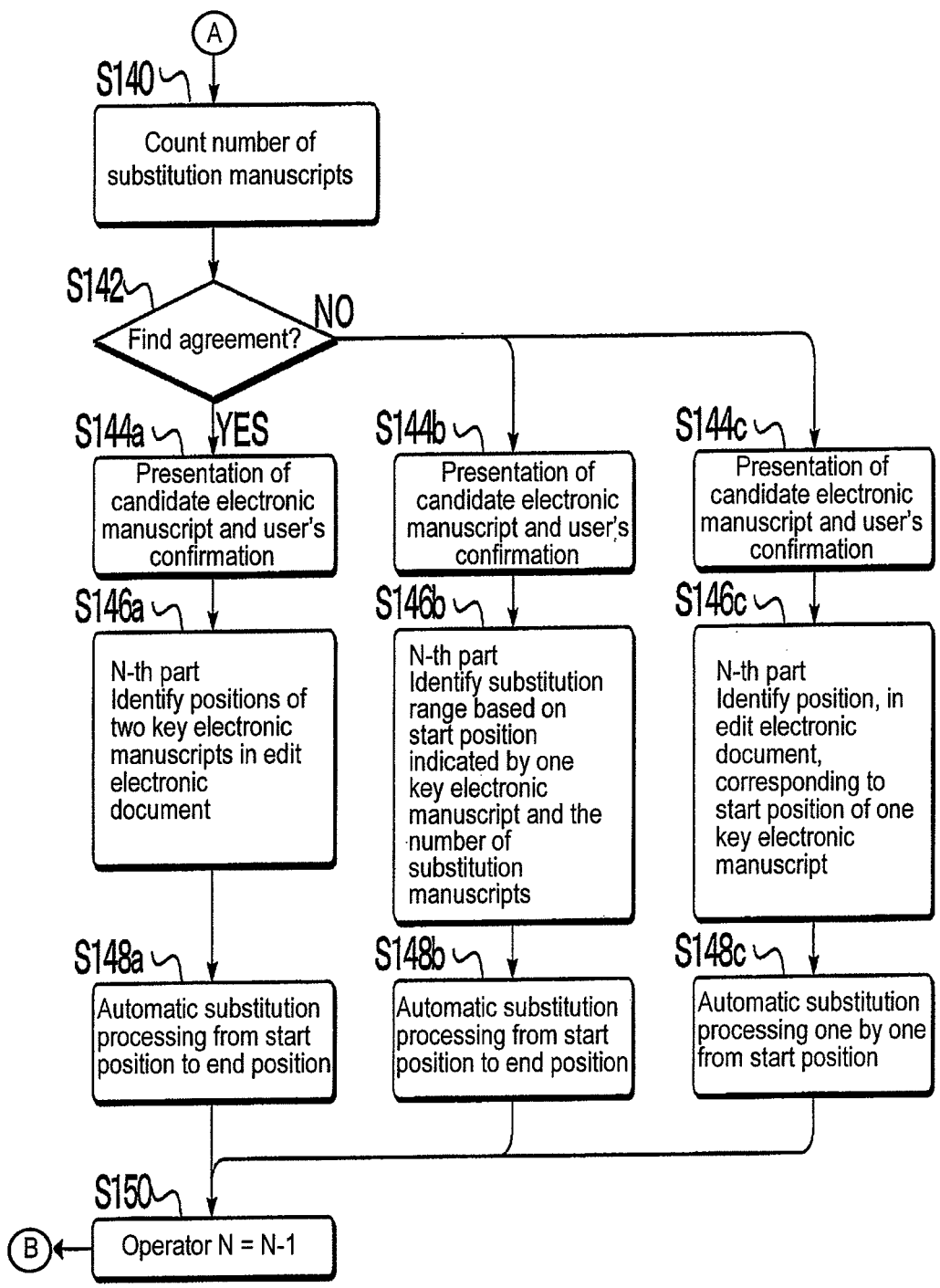

FIGS. 18A and 18B are a flow chart showing an example of a procedure of automatic substitution processing in the configuration of the second exemplary embodiment performed based on the manuscript substitution processing in the edit control section 130 when the processing operation information reception section 136 is notified that the user has selected a manuscript substitution mode. Processing steps similar to those in FIG. 7 are designated by like reference numerals.

The procedure up to step S142 is similar to that shown in FIG. 7. In the configuration of the second exemplary embodiment, before the procedure goes to step S146 (specifically, any one of S146a, S146b, and S146c), the edit reference manuscript extraction section 146 extracts a plurality of candidate electronic manuscripts, then presents to the user the plurality of candidate electronic manuscripts via the key manuscript information presentation section 148, and then receives user specification of an optimal one among the manuscripts (S144a, S144b, S144c). When selection specification is received that is based on the presentation of the plurality of candidate electronic manuscripts to the user performed by the key manuscript information presentation section 148, the page positions of the candidate electronic manuscripts confirmed by the user (electronic manuscripts that agree with the old start manuscript and the old end manuscript in the edit electronic document) are identified in the edit electronic document so that the edit part is identified. Then, the information concerning the edit part (e.g., the editing start page and the editing end page) is notified to the document editing processing section 150 (S144a, S144b, S144c). The subsequent procedure is similar to that shown in FIG. 7.

<Manuscript Addition Function: Automatic Processing Procedure: with Confirmation of Key Manuscripts>

Figure 19:
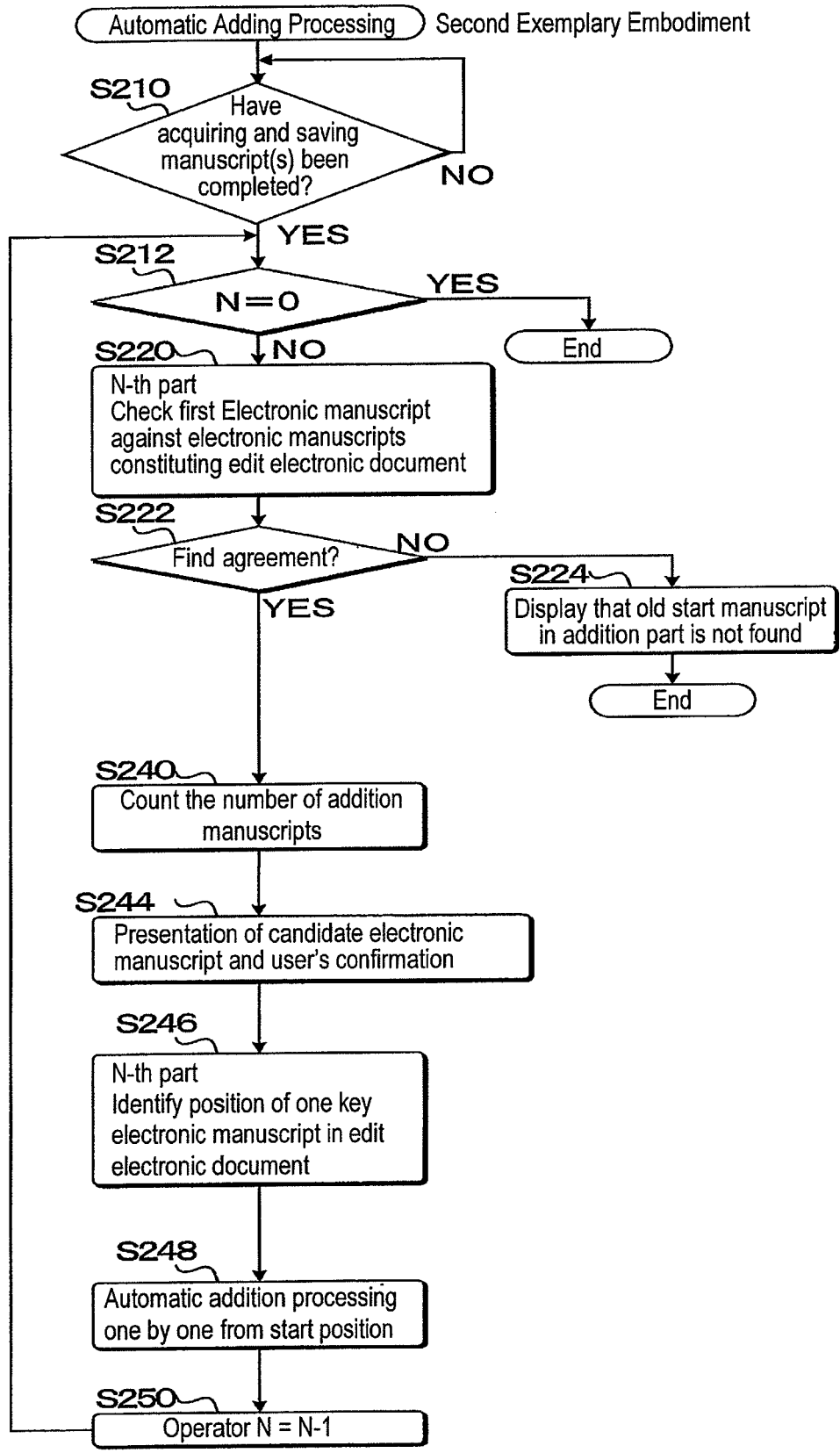
FIG. 19 is a flow chart showing an example of a procedure of automatic addition processing in the configuration of the second exemplary embodiment.

FIG. 19 is a flow chart showing an example of a procedure of automatic addition processing in the configuration of the second exemplary embodiment performed based on the manuscript addition processing in the edit control section 130 when the processing operation information reception section 136 is notified that the user has selected a manuscript addition mode. Processing steps similar to those in FIG. 10 are designated by like reference numerals.

The procedure up to step S240 is similar to that shown in FIG. 10. In the configuration of the second exemplary embodiment, before the procedure goes to step S246, the edit reference manuscript extraction section 146 extracts a plurality of candidate electronic manuscripts, then presents to the user the plurality of candidate electronic manuscripts via the key manuscript information presentation section 148, and then receives user specification of an optimal one among the manuscripts (S244). When selection specification is received that is based on the presentation of the plurality of candidate electronic manuscripts to the user performed by the key manuscript information presentation section 148, the page position, in the edit electronic document, of the candidate electronic manuscript (electronic manuscript that agrees with the rice field start manuscript in the edit electronic document) having passed the user confirmation is identified. Then, the information concerning the page position is notified to the document editing processing section 150 (S246). The subsequent procedure is similar to that shown in FIG. 30.

<Manuscript Deletion Function: Automatic Processing Procedure: with Confirmation of Key Manuscripts>

Figure 20:
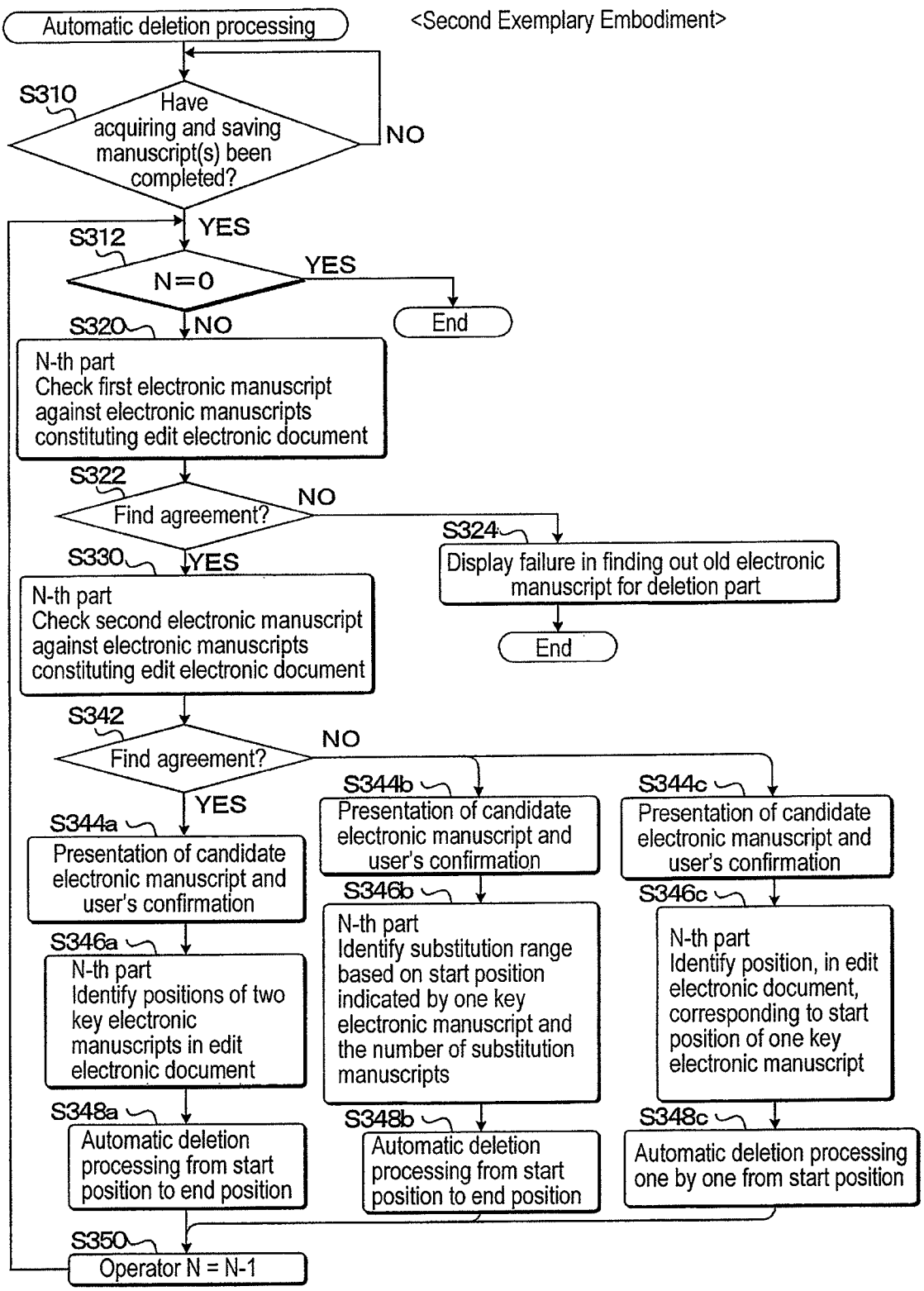
FIG. 20 is a flow chart showing an example of a procedure of automatic deletion processing in the configuration of the second exemplary embodiment.

FIG. 20 is a flow chart showing an example of a procedure of automatic deletion processing in the configuration of the second exemplary embodiment performed based on the manuscript deletion processing in the edit control section 130 when the processing operation information reception section 136 is notified that the user has selected a manuscript deletion mode. Processing steps similar to those in FIG. 13 are designated by like reference numerals.

The procedure up to step S342 is similar to that shown in FIG. 13. In the configuration of the second exemplary embodiment, before the procedure goes to step S346 (specifically, any one of S346a, S346b, and S346c), the edit reference manuscript extraction section 146 extracts a plurality of candidate electronic manuscripts, then presents to the user the plurality of candidate electronic manuscripts via the key manuscript information presentation section 148, and then receives user specification of an optimal one among the manuscripts (S344a, S344b, S344c). When selection specification is received that is based on the presentation of the plurality of candidate electronic manuscripts to the user performed by the key manuscript information presentation section 148, the page positions of the candidate electronic manuscripts confirmed by the user (electronic manuscripts that agree with the old start manuscript and the old end manuscript in the edit electronic document) are identified in the edit electronic document so that the edit part is identified. Then, the information concerning the edit part (e.g., the editing start page and the editing end page) is notified to the document editing processing section 150 (S344a, S344b, S344c). The subsequent procedure is similar to that shown in FIG. 13.

<Manuscript Exchange Function: Automatic Processing Procedure: with Confirmation of Key Manuscripts>

Figure 21B:
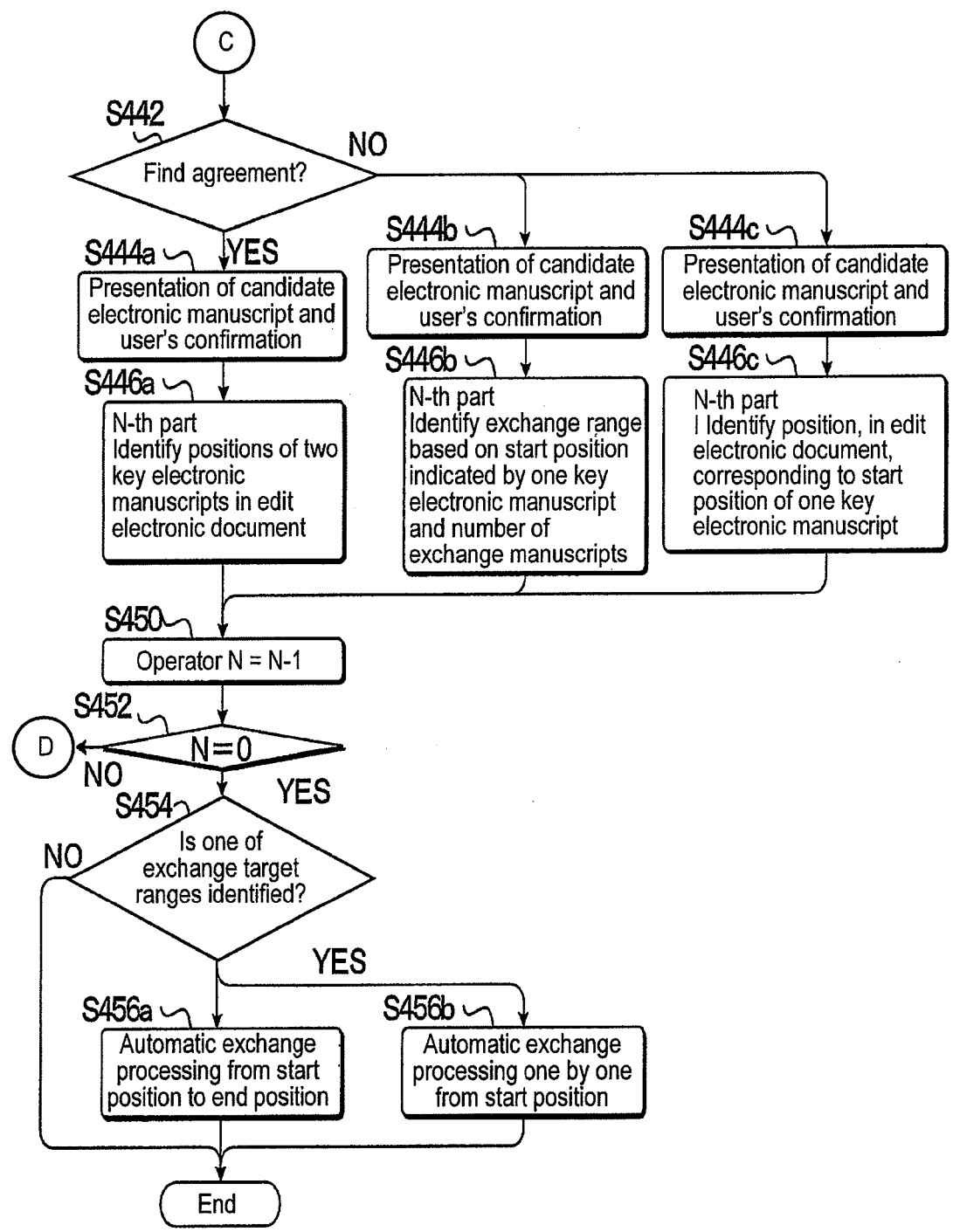

FIGS. 21A and 21B are a flow chart showing an example of a procedure of automatic exchange processing in the configuration of the second exemplary embodiment performed based on the manuscript exchange processing in the edit control section 130 when the processing operation information reception section 136 is notified that the user has selected a manuscript exchange mode. Processing steps similar to those in FIG. 16 are designated by like reference numerals.

The procedure up to step S442 is similar to that shown in FIG. 16. In the configuration of the second exemplary embodiment, before the procedure goes to step S446 (specifically, any one of S446a, S446b, and S446c), the edit reference manuscript extraction section 146 extracts a plurality of candidate electronic manuscripts, then presents to the user the plurality of candidate electronic manuscripts via the key manuscript information presentation section 148, and then receives user specification of an optimal one among the manuscripts (S444a, S444b, S444c). When selection specification is received that is based on the presentation of the plurality of candidate electronic manuscripts to the user performed by the key manuscript information presentation section 148, the page positions of the candidate electronic manuscripts confirmed by the user (electronic manuscripts that agree with the old start manuscript and the old end manuscript in the edit electronic document) are identified in the edit electronic document so that the edit part is identified. Then, the information concerning the edit part (e.g., the editing start page and the editing end page) is notified to the document editing processing section 150 (S444a, S444b, S444c). The subsequent procedure is similar to that shown in FIG. 16.

<Document Management Apparatus; Computer Configuration>

Figure 22:
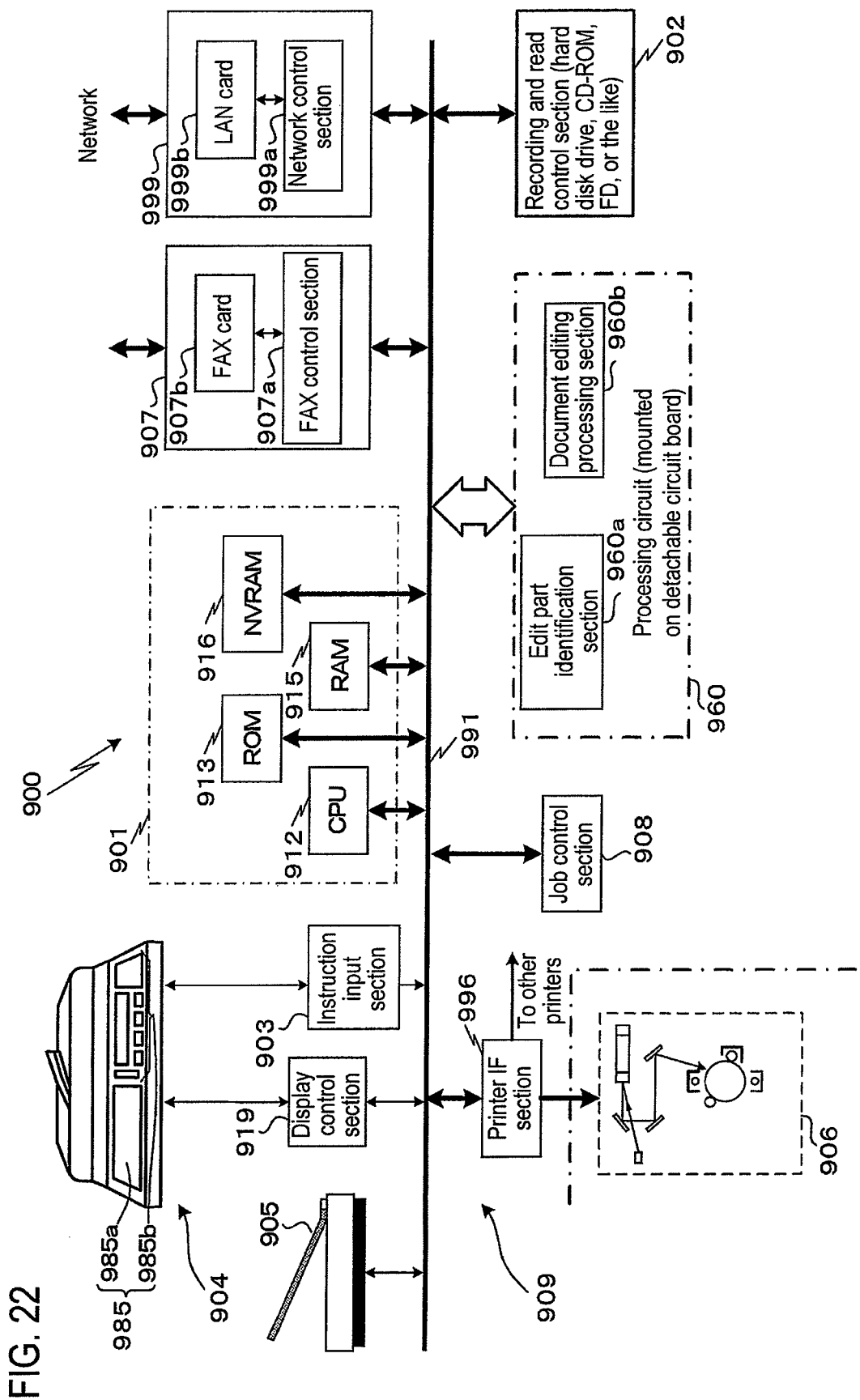
FIG. 22 is a diagram showing an example of the hardware configuration in the case that a document management apparatus is implemented by a computer.

FIG. 22 is a block diagram showing another exemplary configuration of a document management apparatus 2B. This figure shows a more practical hardware configuration that employs a computer such as a personal computer so as to be implemented by a microprocessor or the like for executing software for automatic editing processing.

That is, in this exemplary embodiment, a mechanism that, based on an electronic manuscript (key electronic manuscript) of a key manuscript specified by a user, automatically identifies an edit part in the edit electronic document specified as the edit target by the user, and then automatically performs editing processing specified by the user onto the identified edit part is not limited to be implemented by a hardware processing circuit, and may be implemented by software by using a computer according to a program code for realizing the function.

That is, in this exemplary embodiment, the mechanism of the edit control section 130 that realizes the central functions of automatic identification processing for an edit part and automatic editing processing for the identified edit part is not limited to be implemented by a hardware processing circuit, and may be implemented by software by using a computer according to a program code for realizing the function.

Thus, a program suitable for implementing the mechanism of performing automatic identification processing for an edit part and automatic editing processing for the identified edit part by means of software by employing a computer or alternatively a computer-readable storage medium that stores this program can also be extracted as an invention. When the functions are executed by software, an advantage is obtained that a processing procedure and the like can easily be changed without the necessity of hardware change.

When the functions of performing automatic identification processing for an edit part and automatic editing processing for the identified edit part are to be executed by a computer according to software, a program constituting the software is installed from a recording medium into: a computer built into dedicated hardware (e.g., a built-in microcomputer); an SOC (System On a Chip) in which functional units such as a CPU, a logical circuit, and a storage device are mounted on one chip so that a desired system is realized; or a general-purpose personal computer that can execute various kinds of functions when various kinds of programs are installed.

In accordance with the contents of description of a program, the recording medium causes a change in the state of energy such as magnetism, light, electricity in a reading apparatus provided in a hardware resource of a computer. In this way, the contents of description of the program can be transmitted to the reading apparatus in the form of a signal corresponding to the change. For example, the recording medium may be implemented by a magnetic disk (including a flexible disk FD), an optical disk (including a CD-ROM (Compact Disc-Read Only Memory) and a DVD (Digital Versatile Disc)), a magneto optical disk (including an MO (Magneto Optical Disk)), or a packaged medium (portable storage medium) including a semiconductor memory or the like that stores a program in a manner separated from a computer and is distributed for the purpose of providing the program to a user. Alternatively, the recording medium may be implemented by a ROM, a hard disk, or the like that stores a program and is provided to a user in a state built into a computer. Further, instead of being provided via such a recording medium, the program constituting the software may be provided via a communication network such as a cable network and a wireless network.

For example, even when a storage medium that stores a program code of the software for realizing the automatic identification processing function for an edit part and the automatic editing processing function for the identified edit part is provided to a system or an apparatus and then a computer (alternatively, a CPU or an MPU) in the system or the apparatus reads and executes the program code stored in the storage medium, an effect is obtained that is similar to that achieved in the case of construction by a hardware processing circuit. In this case, the program code itself having been read from the storage medium realizes the automatic identification processing function for an edit part and the automatic editing processing function for the identified edit part.

Further, in place of a configuration that when a computer executes a read-out program code, the automatic identification processing function for an edit part and the automatic editing processing function for the identified edit part are realized, a configuration may be implemented that an OS (Operating Systems; operating system) that operates on the computer performs a part or the entirety of actual processing in accordance with the instructions of the program code so that the processing realizes the automatic identification processing function for an edit part and the automatic editing processing function for the identified edit part.

Further, a configuration may be implemented that a program code read from a storage medium is written into a memory provided in an extension function card inserted into the computer or an extension function unit connected to the computer and then a CPU or the like provided in the extension function card or the extension function unit performs a part or the entirety of actual processing based on the instructions of the program code so that the processing realizes the automatic identification processing function for an edit part and the automatic editing processing function for the identified edit part.

Here, a program is provided in the form of a file that describes the program code for realizing the automatic identification processing function for an edit part and the automatic editing processing function for the identified edit part. At that time, the program need not be provided in the form of an integrated program file, and may be provided in the form of individual program modules in accordance with the hardware configuration of the system implemented by computers.

For example, a computer system 900 has: a controller section 901; and a recording and read control section 902 that is including a hard disk drive, a flexible disk (FD) drive, a CD-ROM (Compact Disk ROM) drive, a semiconductor memory controller, or the like and that reads or writes data from or into a predetermined storage medium.

The controller section 901 has: a CPU (Central Processing Unit) 912; a ROM (Read Only Memory) 913 serving as a read-only storage section; a RAM (Random Access Memory) 915 in which random read and write are available and which serves as an example of a volatile storage section; and a RAM (referred to as NVRAM) 916 serving as an example of a nonvolatile storage section. The ROM 913, the RAM 915, and the NVRAM 916 are controlled by a memory control section (not shown).

Here, in the description given above, the term "volatile storage section" indicates a storage section of a mode that when the power of the apparatus is turned off, its memory contents are lost. In contrast, the term "nonvolatile storage section" indicates a storage section of a mode that even when the main power of the apparatus is turned off, its memory contents are held permanently. It is sufficient that the memory contents are held permanently. That is, in place of a semiconductor memory device in which non-volatility is provided in itself, an intrinsically volatile memory device may be employed that has acquired "non-volatility" by means of a backup power supply.

Instead of being including a semiconductor memory device, the "nonvolatile storage section" may be implemented by a medium such as a magnetic disk and an optical disk. For example, a hard disk drive may serve as a nonvolatile storage section. Further, a configuration may be adopted that information is read from a recording medium such as a CD-ROM, so that the nonvolatile storage section may be implemented.

Further, the computer system 900 may have an image reading section 905 for reading the manuscripts of individual pages of a document so as to generate electronic manuscripts and an electronic document. The image reading section 905 is controlled by an image reading control section (not shown). Further, in order that the document should be printed and output so as to be presented to the user, an image forming section 906 may be provided that outputs a document onto a given output medium (e.g., printing paper). The image forming section 906 is controlled by a printing control section (not shown). The computer system 900 having the image reading section 905 and the image forming section 906 is constructed as the copying machine 3A.

Further, in order that a facsimile function should be provided, the computer system 900 may has a facsimile section 907 including a FAX control section 907a and a FAX card 907b. When the computer system 900 has the facsimile section 907 in addition to the image reading section 905 and the image forming section 906, the multifunction device 3D is realized.

When the computer system 900 is to be constructed as the copying machine 3A or the multifunction device 3D, a configuration is preferable that a job control section 908 is provided for performing job control of image reading, printout, and the like.

Further, the computer system 900 has: an instruction input section 903 constituting a functional section serving as a user interface; a display output section 904 for presenting to a user a guidance screen at the time of operation, predetermined information including a processing result, and the like; and an interface section (IF section) 909 for providing an interface function between the individual functional sections. The interface section 909 has a user interface control section.

The instruction input section 903 may be implemented, for example, by the operation key section 985b of the user interface section 985. Alternatively, a keyboard, a mouse, and the like may be employed. The display output section 904 has a display control section 919 and a display device. This display device may be implemented, for example, by the operation panel section 985a of the user interface section 985. Alternatively, another display section including a CRT (Cathode Ray Tube), an LCD (Liquid Crystal Display), or the like may be employed.

For example, the display control section 919 displays, for example, guidance information and an entire image acquired by the image reading section 905 onto the operation panel section 985a or the display section. Further, the display control section 919 is used also as a display device for notifying various kinds of information to the user. Here, the display section may have a touch panel thereon, so that the instruction input section 903 may be constructed such that predetermined information is input by using a fingertip, a pen, or the like.

The interface section 909 is implemented by a system bus 997 serving as a transfer path for processed data (including image data) and control data as well as from: a printer IF section 996 for providing an interface function between the image forming section 906 and other printers; a network control section 999a for intervening the exchange of communications data to and from the network; and a communication IF section 999 having a LAN card 999b. The printer IF section 996 has a printing control section (not shown) so as to control the image forming section 906.

In this configuration, the CPU 912 controls the entire system via the system bus 991. The ROM 913 stores a control program for the CPU 912 and the like. The RAM 915 is including an SRAM (Static Random Access Memory) or the like, and stores program control variables, data for various kinds of processing, and the like. Further, the RAM 915 has a region for temporarily storing data obtained by calculation in accordance with a predetermined application program and data acquired from the outside.

For example, a program for causing a computer to execute the automatic identification processing function for an edit part and the automatic editing processing function for the identified edit part is distributed in the form of a recording medium such as a CD-ROM. Alternatively, this program may be stored in an FD in place of a CD-ROM. Further, an MO drive may be provided, and then the program may be stored in the MO. Further, the program may be stored in another recording medium such as a nonvolatile semiconductor memory card like a flash memory. Further, the program may be acquired or updated by means of download from another server or the like via a network such as the Internet.

In addition to an FD and a CD-ROM, the recording medium for providing a program may be an optical recording medium such as a DVD, a magneto optical recording medium such as an MO, a tape medium, a magnetic recording medium, and a semiconductor memory such as an IC card and a Miniature Card. The FD or the CD-ROM serving as an example of a recording medium may store all or a part of the functions of realizing the automatic identification processing function for an edit part and the automatic editing processing function for the identified edit part.

Further, the hard disk drive has a region for storing data for various kinds of processing performed in accordance with the control program and for temporarily storing a large amount of data acquired by the own apparatus or acquired from the outside.

According to this configuration, in response to instruction issued by an operator through the operation key section 985*b*, a document editing program is installed into the RAM 915 from a computer-readable recording medium such as a CD-ROM that stores the document editing program for executing the automatic identification processing for an edit part and the automatic editing processing for the identified edit part. Then, in response to instruction from the operator through the operation key section 985*b*, or alternatively by means of automatic processing, the document editing program is started.

In accordance with the document editing program, the CPU 912 performs arithmetic operation associated with the automatic identification processing for an edit part and the automatic editing processing for the identified edit part, then stores the processing result into the storage device such as the RAM 915 and the hard disk, and then outputs data onto the operation panel section 985*a* or a display device such as a CRT and an LCD when necessary.

Here, the invention is not limited to such a configuration employing a computer. That is, the document management apparatus 2B for performing automatic identification processing for an edit part and automatic editing processing for the identified edit part may be implemented by a combination of dedicated hardware pieces that serve as the individual functional sections shown in FIGS. 2 and 17. For example, in place of a configuration that the entirety of the automatic identification processing function for an edit part and the automatic editing processing function for the identified edit part is performed by software, a processing circuit 960 may be provided in which a part of these functional sections are implemented by dedicated hardware.

For example, when the automatic identification processing function for an edit part and the automatic editing processing function for the identified edit part are to be realized, in the processing circuit 960, an edit part identification section 960*a* corresponding to the edit part identification section 140 that constitutes the document management apparatus 2B shown in FIGS. 2 and 17 and a document editing processing section 960*b* corresponding to the document editing processing section 150 may be implemented by hardware. Obviously, in place of the configuration that the entirety of the edit part identification section 140 and the document editing processing section 150 is implemented by hardware, a part of the functional sections constituting the edit part identification section 140 and the document editing processing section 150 may be implemented by hardware.

In a mechanism implemented by software, parallel processing and continuous processing can be treated flexibly. Nevertheless, with increasing complexity in the processing, the processing time increases. This causes a problem of degraded processing speed. In the document management apparatus 2B of this exemplary embodiment, the process of finding out in the edit electronic document a manuscript that agrees with searching key electronic manuscript is important. Thus, in a case that the edit part identification section 960*a* (especially, the part of the edit reference manuscript extraction section 146) is implemented by software, when a new advanced algorithm is developed, system improvement can be achieved flexibly. Nevertheless, its processing speed is degraded when the algorithm is complicated.

In contrast, in a case that a hardware processing circuit is employed, a high-speed accelerator system is obtained in which even when the processing is complicated, degradation in the processing speed is avoided and hence a high throughput is achieved. On the other hand, when the hardware processing circuit is mounted on the computer system 900 in a fixed manner, requirement of algorithm change becomes difficult to be satisfied. From this point of view, it is preferable that in place of a configuration that the edit part identification section 960*a* is merely constructed in the form of a hardware processing circuit, the edit part identification section 960*a* is constructed in the form of a circuit board (referred to as a card) that can be attached to and detached from the computer system 900. This permits high speed processing and provides readiness to algorithm change.

What is claimed is:

1. A document management system comprising: a storage section that stores at least one of an electronic manuscript and an electronic document generated by combining a plurality of pages of electronic manuscripts; a reference electronic manuscript acquisition section that acquires a reference electronic manuscript used for identifying a specified reference page, among the pages of the electronic manuscripts, of an edit part in an edit electronic document that is an electronic document to be edited and is read from the storage section; an edit part identification section that identifies the specified reference page of the edit part in the edit electronic document based on the reference electronic manuscript; a document editing processing section that performs editing processing for the specified reference page of the edit part identified by the edit part identification section, in units of electronic manuscripts; and an edit electronic manuscript acquisition section that acquires a given number of sheets of electronic manuscripts necessary in the editing processing, wherein the editing processing includes one of a manuscript deletion mode, a manuscript substitution mode, a manuscript addition mode, and a manuscript exchange mode, wherein the edit part identification section identifies at least one of a start position of the editing processing, a start position of the edit part, and an end position of the edit part based on the electronic manuscript, which is located at the specified reference page and is extracted by an edit reference manuscript extraction section, and with adopting, as a reference, the start position of the editing processing, the start position of the edit part, or the end position of the edit part identified by the edit part identification section, the document editing processing section performs the editing processing for the electronic manuscripts in the edit part of the edit electronic document, and wherein the edit part identification section identifies at least one of a start position of substitution processing, a start position of a substitution range, and an end position of the substitution range based on the electronic manuscript, which is located at the specified reference page and is extracted by the edit reference manuscript extraction section, and the document editing processing section includes a substitution processing section that, with adopting as a reference the start position of substitution processing, the start position of substitution range, or the end position of substitution range identified by the edit part identification section, substitutes electronic manuscripts within the substitution range in the edit electronic document with the given number of sheets of the electronic manuscripts acquired by the edit electronic manuscript acquisition section.

2. The document management system according to claim 1, further comprising:
an electronic manuscript generating section that reads a manuscript so as to generate a digitized electronic manuscript, wherein the reference electronic manuscript acquisition section adopts, as the reference electronic manuscript, the electronic manuscript generated by the electronic manuscript generating section.

3. The document management system according to claim 1, wherein
the reference electronic manuscript acquisition section adopts, as the reference electronic manuscript, (i) the electronic manuscript stored in the storage section or (ii) an electronic manuscript in the electronic document stored in the storage section.

4. The document management system according to claim 1, wherein the edit part identification section compares the reference electronic manuscript against each of the electronic manuscripts constituting the edit electronic documents and identifies the edit part based on a score indicating a level of similarity between the reference electronic manuscript and each of the electronic manuscripts.

5. A document management apparatus comprising: a reference electronic manuscript acquisition section that acquires a reference electronic manuscript used for identifying a specified reference page, among a plurality of pages of electronic manuscripts, of an edit part in an edit electronic document that is an electronic document to be edited; an edit part identification section that identifies the specified reference page of the edit part of the edit electronic document based on the reference electronic manuscript; a document editing processing section that performs the editing processing for the specified reference page of the edit part identified by the edit part identification section, in units of electronic manuscripts; and an edit electronic manuscript acquisition section that acquires a given number of sheets of electronic manuscripts necessary in the editing processing, wherein the editing processing includes one of a manuscript deletion mode, a manuscript substitution mode, a manuscript addition mode, and a manuscript exchange mode, wherein the edit part identification section identifies at least one of a start position of the editing processing, a start position of the edit part, and an end position of the edit part based on the electronic manuscript, which is located at the specified reference page and is extracted by an edit reference manuscript extraction section, and with adopting, as a reference, the start position of the editing processing, the start position of the edit part, or the end position of the edit part identified by the edit part identification section, the document editing processing section performs the editing processing for the electronic manuscripts in the edit part of the edit electronic document, and wherein the edit part identification section identifies at least one of a start position of substitution processing, a start position of a substitution range, and an end position of the substitution range based on the electronic manuscript, which is located at the specified reference page and is extracted by the edit reference manuscript extraction section, and the document editing processing section includes a substitution processing section that, with adopting as a reference the start position of substitution processing, the start position of substitution range, or the end position of substitution range identified by the edit part identification section, substitutes electronic manuscripts within the substitution range in the edit electronic document with the given number of sheets of the electronic manuscripts acquired by the edit electronic manuscript acquisition section.

6. The document management apparatus according to claim 5, wherein
the reference electronic manuscript acquisition section adopts, as the reference electronic manuscript, an electronic manuscript generated by a electronic manuscript generating section that reads a manuscript so as to generate a digitized electronic manuscript.

7. The document management apparatus according to claim 5, wherein
the reference electronic manuscript acquisition section adopts, as the reference electronic manuscript, (i) an electronic manuscript stored in a storage section or (ii) an electronic manuscript in an electronic document stored in the storage section.

8. The document management apparatus according to claim 5, wherein
the edit part identification section includes a reference manuscript information presentation section that presents, to a user, information concerning the electronic manuscript in the edit electronic document, which is extracted based on the reference electronic manuscript, and
the edit part identification section identifies the edit part based on a response to the presentation of the reference manuscript information presentation section.

9. The document management apparatus according to claim 5, wherein when two electronic manuscripts at the specified reference page are extracted by the edit reference manuscript extraction section and define the start position of the substitution range and the end position of the substitution range, with adopting one manuscript as indicating the start position of the substitution range and the other manuscript as indicating the end position of the substitution range, the substitution processing section deletes the electronic manuscripts located from the start position to the end position in the edit electronic document, and then inserts the given of sheets of electronic manuscripts into the part from the start position to the end position in the edit electronic document.

10. The document management apparatus according to claim 5, wherein the edit part identification section identifies at least one of a start position of addition processing, a start position of an addition range, and an end position of an addition range based on the electronic manuscript, which is located at the specified reference page and is extracted by the edit reference manuscript extraction section, and the document editing processing section includes an addition processing section that, with adopting as a reference the at least one of the start position of addition processing, the start position of the addition range, and the end position of the addition range identified by the edit part identification section, adds the given number of sheets of electronic manuscripts acquired by the edit electronic manuscript acquisition section to an addition range of the edit electronic document.

11. The document management apparatus according to claim 10, wherein
the addition processing section adds the given number of sheets of electronic manuscripts to a part immediately after or immediately before the start position.

12. The document management apparatus according to claim 10, wherein
when two electronic manuscripts at the specified reference page are extracted by the edit reference manuscript extraction section and define the start position of the addition range and the end position of the addition range, with adopting one manuscript as indicating the start position of addition range and the other manuscript as indicating the end position of addition range, the addition processing section deletes the electronic manuscripts located from a position immediately after the start position to a position immediately before the end position in the edit electronic document, and then inserts the given number of sheets of electronic manuscripts to a part from the position immediately after the start position to the position immediately before the end position in the edit electronic document.

13. The document management apparatus according to claim 5, wherein the edit part identification section identifies at least one of a position of deletion processing, a start position of deletion processing, a start position of a deletion range, and an end position of the deletion range based on the electronic manuscript, which is located at the specified reference page and is extracted by the edit reference manuscript extraction section, and the document editing processing section includes a deletion processing section that, with adopting as a reference the at least one of the position of the deletion processing, the start position of the deletion processing, the start position of the deletion range, and the end position of the deletion range identified by the edit part identification section, deletes a given number of sheets of electronic manuscripts in the electronic document stored in the storage section.

14. The document management apparatus according to claim 13, wherein
when the electronic manuscripts, which is located at the specified reference page and is extracted by the edit reference manuscript extraction section, indicate individual deletion positions, the deletion processing section deletes from the edit electronic document the electronic manuscripts at the specified reference page.

15. The document management apparatus according to claim 13, wherein
when the electronic manuscript, which is located at the specified reference page and is extracted by the edit reference manuscript extraction section, defines the start position of the deletion processing and when the number of sheets to be deleted is specified, the deletion processing section deletes from the edit electronic document electronic manuscripts in a range from the start position to a position determined by the specified number of sheets.

16. The document management apparatus according to claim 13, wherein
when two electronic manuscripts, which are located at the specified reference page and are extracted by the edit reference manuscript extraction section, define the start position of the deletion range and the end position of the deletion range, with adopting one manuscript as indicating the start position of the deletion range and the other manuscript as indicating the end position of the deletion range, the deletion processing section deletes from the edit electronic document electronic manuscripts located from the start position to the end position in the edit electronic document.

17. The document management apparatus according to claim 5, wherein the edit part identification section identifies two exchange parts by identifies at least one of a start position of exchange processing, a start position of an exchange range, and an end position of the exchange range based on the electronic manuscript, which is located at the specified reference page and is extracted by the edit reference manuscript extraction section, and the document editing processing section includes an exchange processing section that exchanges (i) positions, in the edit electronic document, of the electronic manuscripts in one part identified by the edit reference manuscript extraction section and (ii) positions, in the edit electronic document, of the electronic manuscripts in the other part for each other.

18. The document management apparatus according to claim 4, wherein the edit part identification section compares the reference electronic manuscript against each of the electronic manuscripts constituting the edit electronic documents and identifies the edit part based on a score indicating a level of similarity between the reference electronic manuscript and each of the electronic manuscripts.

19. A non-transitory computer-readable medium storing a program that causes a computer to execute a document management process, the document management process comprising: based on an electronic manuscript obtained by reading a manuscript through an image reading device or based on an electronic manuscript or an electronic manuscript in the electronic document that are read from a storage section, acquiring a reference electronic manuscript used for identifying a specified reference page, among a plurality of pages of electronic manuscripts, of an edit part of an edit electronic document; identifying the specified reference page of the edit part in the edit electronic document based on the reference electronic manuscript; performing given editing processing for the specified reference page of the edit part identified by the edit part identification section, in units of electronic manuscripts; and acquiring a given number of sheets of electronic manuscripts necessary in the editing processing, wherein performing the given editing processing includes one of a manuscript deletion mode, a manuscript substitution mode, a manuscript addition mode, and a manuscript exchange mode, wherein the identifying the specified reference page includes at least one of a start position of the editing processing, a start position of the edit part, and an end position of the edit part based on the electronic manuscript, which is located at the specified reference page and is extracted, and with adopting, as a reference, the start position of the editing processing, the start position of the edit part, or the end position of the edit part identified, performing the editing processing for the electronic manuscripts in the edit part of the edit electronic document, and wherein the identifying the specified reference page includes at least one of a start position of substitution processing, a start position of a substitution range, and an end position of the substitution range based on the electronic manuscript, which is located at the specified reference page and is extracted, and with adopting as a reference the start position of substitution processing, the start position of substitution range, or the end position of substitution range identified, substituting electronic manuscripts within the substitution range in the edit electronic document with the given number of sheets of electronic manuscripts acquired.

20. The non-transitory computer-readable medium according to claim 19, wherein the edit part identification section compares the reference electronic manuscript against each of the electronic manuscripts constituting the edit electronic documents and identifies the edit part based on a score indicating a level of similarity between the reference electronic manuscript and each of the electronic manuscripts.

* * * * *